United States Patent
Lakshmi Narayanan et al.

(10) Patent No.: US 11,034,357 B2
(45) Date of Patent: *Jun. 15, 2021

(54) SCENE CLASSIFICATION PREDICTION

(71) Applicant: Honda Motor Co., Ltd., Tokyo (JP)

(72) Inventors: Athmanarayanan Lakshmi Narayanan, Sunnyvale, CA (US); Isht Dwivedi, Santa Clara, CA (US); Behzad Dariush, San Ramon, CA (US)

(73) Assignee: Honda Motor Co., Ltd., Tokyo (JP)

(*) Notice: Subject to any disclaimer, the term of this patent is extended or adjusted under 35 U.S.C. 154(b) by 85 days.

This patent is subject to a terminal disclaimer.

(21) Appl. No.: 16/438,365

(22) Filed: Jun. 11, 2019

(65) Prior Publication Data

US 2020/0086879 A1 Mar. 19, 2020

Related U.S. Application Data

(63) Continuation-in-part of application No. 16/374,205, filed on Apr. 3, 2019, and a continuation-in-part of
(Continued)

(51) Int. Cl.
*G06K 9/62* (2006.01)
*B60W 40/06* (2012.01)
(Continued)

(52) U.S. Cl.
CPC ......... B60W 40/06 (2013.01); G06K 9/00684 (2013.01); G06N 3/049 (2013.01); G06N 3/08 (2013.01); G06T 7/11 (2017.01)

(58) Field of Classification Search
CPC ........... G06K 9/00684; G06K 9/00335; G06K 9/00724; G06K 9/4628; G06K 9/00845;
(Continued)

(56) References Cited

U.S. PATENT DOCUMENTS

2016/0267335 A1* 9/2016 Hampiholi ........... B60K 28/066
2018/0056850 A1* 3/2018 Schwaiger ............ F21S 41/255
(Continued)

FOREIGN PATENT DOCUMENTS

JP 2007329762 12/2007
JP 2014235605 12/2014
(Continued)

OTHER PUBLICATIONS

Office Acton of U.S. Appl. No. 16/132,950 dated Jul. 10, 2019, 22 pages.
(Continued)

*Primary Examiner* — Amara Abdi
(74) *Attorney, Agent, or Firm* — Rankin, Hill & Clark LLP

(57) ABSTRACT

Systems and techniques for scene classification and prediction is provided herein. A first series of image frames of an environment from a moving vehicle may be captured. Traffic participants within the environment may be identified and masked based on a first convolutional neural network (CNN). Temporal classification may be performed to generate a series of image frames associated with temporal predictions based on a scene classification model based on CNNs and a long short-term memory (LSTM) network. Additionally, scene classification may occur based on global average pooling. Feature vectors may be generated based on different series of image frames and a fusion feature vector may be obtained by performing data fusion based on a first feature vector, a second feature vector, a third feature vector, etc. In this way, a behavior predictor may generate a predicted driver behavior based on the fusion feature.

20 Claims, 26 Drawing Sheets

Related U.S. Application Data application No. 16/438,119, filed on Jun. 11, 2019, now Pat. No. 10,860,873, which is a continuation-in-part of application No. 16/132,950, filed on Sep. 17, 2018, now Pat. No. 10,482,334.

(60) Provisional application No. 62/731,158, filed on Sep. 14, 2018.

(51) Int. Cl.
| | | |
|---|---|---|
| *G06N 3/08* | (2006.01) | |
| *G06T 7/11* | (2017.01) | |
| *G06K 9/00* | (2006.01) | |
| *G06N 3/04* | (2006.01) | |

(58) Field of Classification Search
CPC .... G06K 9/00791; G06K 2009/00738; B60W 40/08; B60W 40/02; B60W 40/06; B60W 2420/42; B60W 50/0097; G06N 3/0445; G06N 3/0454; G06N 3/084; G06N 3/08; G06N 3/049; G06T 7/11
See application file for complete search history.

(56) References Cited

U.S. PATENT DOCUMENTS

| | | | | |
|---|---|---|---|---|
| 2018/0122033 | A1* | 5/2018 | Mayuzumi | G06T 11/001 |
| 2018/0165554 | A1 | 6/2018 | Zhang et al. | |
| 2019/0012574 | A1* | 1/2019 | Anthony | G06K 9/00718 |
| 2019/0065872 | A1 | 2/2019 | Yamanaka et al. | |
| 2019/0228224 | A1 | 7/2019 | Guo et al. | |
| 2019/0303682 | A1* | 10/2019 | Trim | G06K 9/623 |
| 2020/0079374 | A1* | 3/2020 | Duan | G06K 9/00825 |
| 2020/0117959 | A1 | 4/2020 | Sargent et al. | |

FOREIGN PATENT DOCUMENTS

| | | |
|---|---|---|
| JP | 2018022234 | 2/2018 |
| JP | 2018066712 | 4/2018 |

OTHER PUBLICATIONS

Notice of Allowance of U.S. Appl. No. 16/132,950 dated Sep. 11, 2019, 16 pages.
Pulkit Agrawal, Joao Carreira, and Jitendra Malik. Learning to See by Moving. In ICCV; 2015.
Ioan Andrei Barsan, Peidong Liu, Marc Pollefeys, and Andreas Geiger. Robust Dense Mapping for Large-Scale Dynamic Environments. In ICRA, 2018.
Bijelic, M., Mannan, F., Gruber, T., Ritter, W., Dietmayer, K., Heide, F., "Seeing Through Fog Without Seeing Fog: Deep Sensor Fusion in the Absence of Labeled Training Data," arXiv:1902.08913v1, Feb. 24, 2019. https://arxiv.org/pdf/1902.08913.pdf.
A. Bolovinou, C. Kotsiourou, and A. Amditis, "Dynamic road scene classification: Combining motion with a visual vocabulary model," in Information Fusion (FUSION), 2013 16th International Conference on, pp. 1151-1158, IEEE, 2013.
H. Brugman, A. Russel, and X. Nijmegen, "Annotating Multimedia/Multi-modal Resources with ELAN," in LREC, 2004.
Y.-W. Chao, S. Vijayanarasimhan, B. Seybold, D. A. Ross, J. Deng, and R. Sukthankar, "Rethinking the Faster R-CNN Architecture for Temporal Action Localization," in Proceedings of the IEEE Conference on Computer Vision and Pattern Recognition, pp. 1130-1139, 2018.
L.-C. Chen, G. Papandreou, I. Kokkinos, K. Murphy, and A. L. Yuille, "Deeplab: Semantic image segmentation with deep convolutional nets, atrous convolution, and fully connected crfs," IEEE transactions on pattern analysis and machine intelligence, vol. 40, No. 4, pp. 834-848, 2018.
Y. Chen, J. Wang, J. Li, C. Lu, Z. Luo, H. Xue, and C. Wang, "LiDAR—Video Driving Dataset: Learning Driving Policies Effectively," in Proceedings of the IEEE Conference on Computer Vision and Pattern Recognition, pp. 5870-5878, 2018.
M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proceedings of the IEEE conference on computer vision and pattern recognition, pp. 3213-3223, 2016.
Roeland De Geest, Efstratios Gavves, Amir Ghodrati, Zhenyang Li, Cees Snoek, and Tinne Tuytelaars. Online Action Detection. In ECCV, 2016.
J. Deng, W. Dong, R. Socher, L.-J. Li, K. Li, and L. Fei-Fei, "Imagenet: A large-scale hierarchical image database," in Computer Vision and Pattern Recognition, 2009. CVPR 2009. IEEE Conference on, pp. 248-255, Ieee, 2009.
Nachiket Deo and Mohan Trivedi. Learning and Predicting On-road Pedestrian Behavior Around Vehicles. In ITSC, 2017.
Anup Doshi and Mohan M. Trivedi. Tactical Driver Behavior Prediction and Intent Inference: A Review. In ITSC, 2011.
Kiana Ehsani, Hessam Bagherinezhad, Joseph Redmon, Roozbeh Mottaghi, and Ali Farhadi. Who Let The Dogs Out? Modeling Dog Behavior From Visual Data. CVPR, 2018.
C. Feichtenhofer, A. Pinz, and R. P. Wildes, "Dynamic scene recognition with complementary spatiotemporal features," IEEE transactions on pattern analysis and machine intelligence, vol. 38, No. 12, pp. 2389-2401, 2016.
C. Feichtenhofer, A. Pinz, and A. Zisserman, "Convolutional two-stream network fusion for video action recognition," in Proceedings of the IEEE Conference on Computer Vision and Pattern Recognition, pp. 1933-1941, 2016.
G. Floros, B. van der Zander, and B. Leibe, "Openstreetslam: Global vehicle localization using openstreetmaps," in ICRA, vol. 13, pp. 1054-1059, 2013.
S. Garg, N. Suenderhauf, and M. Milford, "Don't Look Back: Robustifying Place Categorization for Viewpoint- and Condition-Invariant Place Recognition," in IEEE International Conference on Robotics and Automation (ICRA), 2018.
A. Geiger, P. Lenz, and R. Urtasun, "Are we ready for autonomous driving? the kitti vision benchmark suite," in Computer Vision and Pattern Recognition (CVPR), 2012 IEEE Conference on, pp. 3354-3361, IEEE, 2012.
Caner Hazirbas, Lingni Ma, Csaba Domokos, and Daniel Cremers. FuseNet: Incorporating Depth into Semantic Segmentation via Fusion-based CNN Architecture. In ACCV, 2016.
He, Kaiming; Zhang, Xiangyu; Ren, Shaoqing; and Sun, Jian, "Deep residual learning for image recognition," in Proceedings of the IEEE conference on computer vision and pattern recognition, pp. 770-778, 2016.
Held and Hein, "Movement-produced stimulation in the development of visually guided behavior," Journal of comparative and physiological phychology, 1963.
S. Hochreiter and J. Schmidhuber, "Long short-term memory," Neural computation, vol. 9, No. 8, pp. 1735-1780, 1997.
J. Hu, L. Shen, and G. Sun, "Squeeze-and-excitation networks," arXiv preprint arXiv:1709.01507, vol. 7, 2017.
X. Huang, X. Cheng, Q. Geng, B. Cao, D. Zhou, P. Wang, Y. Lin, and R. Yang, "The apolloscape dataset for autonomous driving," arXiv preprint arXiv:1803.06184, 2018.
"The Ultimate Sensor Battle: Lidar vs. Radar," Intellias—Intelligent Software Engineering, Aug. 9, 2018. https://www.intellias.com/the-ultimate-sensor-battle-lidar-vs-radad.
A. Jain, H. S. Koppula, B. Raghavan, S. Soh, and A. Saxena, "Car that knows before you do: Anticipating maneuvers via learning temporal driving models," in Proceedings of the IEEE International Conference on Computer Vision, pp. 3182-3190, 2015.
Ashesh Jain, Amir R. Zamir, Silvio Savarese, and Ashutosh Saxena. Structural-RNN: Deep Learning on Spatio-Temporal Graphs. In CVPR, 2016.
Dinesh Jayaraman and Kristen Grauman. Learning Image Representations Tied to Ego-motion. In ICCV, 2015.
P. Jonsson, "Road condition discrimination using weather data and camera images," in Intelligent Transportation Systems (ITSC), 2011 14th International IEEE Conference on, pp. 1616-1621, IEEE, 2011.

(56) References Cited

OTHER PUBLICATIONS

P. Jonsson, J. Casselgren, and B. Thörnberg, "Road surface status classification using spectral analysis of NIR camera images," IEEE Sensors Journal, vol. 15, No. 3, pp. 1641-1656, 2015.
A. Karpathy, G. Toderici, S. Shetty, T. Leung, R. Sukthankar, and L. Fei-Fei, "Large-scale video classification with convolutional neural networks," in Proceedings of the IEEE conference on Computer Vision and Pattern Recognition, pp. 1725-1732, 2014.
Diederik Kingma and Jimmy Ba. Adam: A Method for Stochastic Optimization. In ICLR, 2014.
Alex Krizhevsky and Sutskever, Ilya and Hinton, Geoffrey E, "Imagenet classification with deep convolutional neural networks," in Advances in Neural Information Processing Systems 25 (F. Pereira, C. J. C. Burges, L. Bottou, and K. Q. Weinberger, eds.), pp. 1097-1105, Curran Associates, Inc., 2012.
Namhoon Lee, Wongun Choi, Paul Vernaza, Chistopher B. Choy, Philip H. S. Torr, and Manmohan Chandraker. DESIRE: Distant Future Prediction in Dynamic Scenes with Interacting Agents. In CVPR, 2017.
J. Levinson, M. Montemerlo, and S. Thrun, "Map-Based Precision Vehicle Localization in Urban Environments," in Robotics: Science and Systems, vol. 4, p. 1, Citeseer, 2007.
F. F. Li, R. VanRullen, C. Koch, and P. Perona, "Rapid natural scene categorization in the near absence of attention," Proceedings of the National Academy of Sciences, vol. 99, No. 14, pp. 9596-9601, 2002.
Ruiyu Li, Makarand Tapaswi, Renjie Liao, Jiaya Jia, Raquel Urtasun, and Sanja Fidler. Situation Recognition with Graph Neural Networks. In ICCV, 2017.
X. Li, Z. Wang, and X. Lu, "A Multi-Task Framework for Weather Recognition," in Proceedings of the 2017 ACM on Multimedia Conference, pp. 1318-1326, ACM, 2017.
D. Lin, C. Lu, H. Huang, and J. Jia, "RSCM: Region Selection and Concurrency Model for Multi-Class Weather Recognition," IEEE Transactions on Image Processing, vol. 26, No. 9, pp. 4154-4167, 2017.
T.-Y. Lin, M. Maire, S. Belongie, J. Hays, P. Perona, D. Ramanan, P. Dollár, and C. L. Zitnick, "Microsoft coco: Common objects in context," in European conference on computer vision, pp. 740-755, Springer, 2014.
Tsung-Yi Lin, Piotr Dollar, Ross Girshick, Kaiming He, Bharath Hariharan, and Serge Belongie. Feature Pyramid Networks for Object Detection. In CVPR, 2017.
Tsung-Yi Lin, Priya Goyal, Ross Girshick, Kaiming He, and Piotr Dollar. Focal Loss for Dense Object Detection. In ICCV, 2017.
Shugao Ma, Leonid Sigal, and Stan Sclaroff. Learning Activity Progression in LSTMs for Activity Detection and Early Detection. In CVPR, 2016.
W. Maddern, G. Pascoe, C. Linegar, and P. Newman, "1 year, 1000 km: The oxford robotcar dataset," The International Journal of Robotics Research, vol. 36, No. 1, pp. 3-15, 2017.
V. Madhavan and T. Darrell, The BDD-Nexar Collective: A Large-Scale, Crowsourced, Dataset of Driving Scenes. PhD thesis, Masters thesis, EECS Department, University of California, Berkeley, 2017.
Marmanis, Dimitrios; Wegner, Jan D; Galliani, Silvano; Schindler, Konrad; Datcu, Mihai; and Stilla, Uwe, "Semantic segmentation of aerial images with an ensemble of CNNs," ISPRS Annals of the Photogrammetry, Remote Sensing and Spatial Information Sciences, vol. 3, p. 473, 2016.
J. A. Montoya-Zegarra, J. D. Wegner, L. Ladický, and K. Schindler, "Semantic segmentation of aerial images in urban areas with class-specific higher-order cliques," ISPRS Annals of the Photogrammetry, Remote Sensing and Spatial Information Sciences, vol. 2, No. 3, p. 127, 2015.
Katsuyuki Nakamaura, Serena Yeung, Alexandre Alahi, and Li Fei-Fei. Jointly Learning Energy Expenditures and Activities using Egocentric Multimodal Signals. In CVPR, 2017.
Ann Neal. "LiDAR vs. RADAR," Sensors Online, Apr. 24, 2018. https://www.sensorsmag.com/components/lidar-vs-radar.

Office Action of U.S. Appl. No. 16/438,119 dated May 28, 2020, 28 pages.
Notice of Allowance of U.S. Appl. No. 16/438,119 dated Aug. 7, 2020, 10 pages.
G. Neuhold, T. Ollmann, S. R. Bulò, and P. Kontschieder, "The Mapillary Vistas Dataset for Semantic Understanding of Street Scenes," in ICCV, pp. 5000-5009, 2017.
Newcomb, D., "New Technology May Prevent Accidents by Reading Drivers' Body Language," https://www.forbes.com/sites/dougnewcomb/2015/04/22/new-technology-looks-inward-to-prevents-accidents-by-reading-drivers-body-language/#4a1c560d28b5.
J. Yue-Hei Ng, M. Hausknecht, S. Vijayanarasimhan, O. Vinyals, R. Monga, and G. Toderici, "Beyond short snippets: Deep networkds for video classification," in Proceedings of the IEEE conference on computer vision and pattern recognition, pp. 4694-4702, 2015.
Nuria Oliver and Alex Pentand. Graphical Models for Driver Behavior Recognition in a SmartCar. In IV, 2000.
A. Palazzi, D. Abati, S. Calderara, F. Solera, and R. Cucchiara, "Predicting the Driver's Focus of Attention: the DR(eye) VE Project," IEEE Transactions on Pattern Analysis and Machine Intelligence, 2018.
Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in PyTorch. In NIPS-W, 2017.
M. C. Potter and E. I. Levy, "Recognition memory for a rapid sequence of pictures," Journal of experimental psychology, vol. 81, No. 1, p. 10, 1969.
Siyuan Qi and Song-Chun Zhu. Intent-aware Multi-agent Reinfocement Learning. In ICRA, 2018.
Y. Qian, E. J. Almazan, and J. H. Elder, "Evaluating features and classifiers for road weather condition analysis," in Image Processing (ICIP), 2016 IEEE International Conference on, pp. 4403-4407, IEEE, 2016.
V. Ramanishka, Y.-T. Chen, T. Misu, and K. Saenko, "Toward driving scene understanding: A dataset for learning driver behavior and causal reasoning," in Proceedings of the IEEE Conference on Computer Vision and Pattern Recognition, pp. 7699-7707, 2018.
M. Schmidt. U. Hofmann, and M. Bouzouraa. A Novel Goal Oriented Concept for Situation Representation for ADAS and Automated Driving. In ITSC, 2014.
H. G. Seif and X. Hu, "Autonomous driving in the iCityHD maps as a key challenge of the automotive industry," Engineering, vol. 2, No. 2, pp. 159-162, 2016.
R. R. Selvaraju, M. Cogswell, A. Das, R. Vedantam, D. Parikh, and D. Batra, "Grad-cam: Visual explanations from deep networks via gradient-based localization," in ICCV, pp. 618-626, 2017.
Zheng Shou, Junting Pan, Jonathan Chan, Kazuyuki Miyazawa, Hassan Mansour, Anthony Vetro, Xavier Giro-i Nieto, and Shih-Fu Chang. Online Action Detection in Untrimmed, Streaming Videos-Modeling and Evaluation. arXiv:1802.06822, 2018.
N. Shroff, P. Turaga, and R. Chellappa, "Moving vistas: Exploiting motion for describing scenes," in Computer Vision and Pattern Recognition (CVPR), 2010 IEEE Conference on, pp. 1911-1918, IEEE, 2010.
I. Sikirić, K. Brkić, J. Krapac, and S. Šegvić, "Image representations on a budget: Traffic scene classification in a restricted bandwidth scenario," in 2014 IEEE Intelligent Vehicles Symposium Proceedings, pp. 845-852, IEEE, 2014.
Christian Szegedy, Sergey Ioffe, and Vincent Vanhoucke. Inception-v4, Inception-ResNet and the Impact of Residual Connections on Learning. CoRR, 2016.
D. Tran, L. Bourdev, R. Fergus, L. Torresani, and M. Paluri, "Learning spatiotemporal features with 3d convolutional networks," in Proceedings of the IEEE international conference on computer vision, pp. 4489-4497, 2015.
D. Tran, H. Wang, L. Torresani, J. Ray, Y. LeCun, and M. Paluri, "A Closer Look at Spatiotemporal Convolutions for Action Recognition," in CVPR, 2018.
Chien-Yi Wang, Athma Narayanan, Abhisek Patil, and Yi-Ting Chen. A 3D Dynamic Scene Analysis framework for Development of Intelligent Transportation Systems. In IV, 2018.

(56) References Cited

OTHER PUBLICATIONS

L. Wang, S. Guo, W. Huang, Y. Xiong, and Y. Qiao, "Knowledge guided disambiguation for large-scale scene classification with multiresolution CNNs," IEEE Transactions on Image Processing, vol. 26, No. 4, pp. 2055-2068, 2017.
F.-Y. Wu, S.-Y. Yan, J. S. Smith, and B.-L. Zhang, "Traffic scene recognition based on deep CNN and VLAD spatial pyramids," in Machine Learning and Cybernetics (ICMLC), 2017 International Conference on, vol. 1, pp. 156-161, IEEE, 2017.
H. Xu, A. Das, and K. Saenko, "R-C3D: region convolutional 3d network for temporal activity detection," in IEEE Int. Conf. on Computer Vision (ICCV), pp. 5794-5803, 2017.
H. Xu, Y. Gao, F. Yu, and T. Darrell, "End-to-end learning of driving models from large-scale video datasets," arXiv preprint, 2017.
J. Yao, S. Fidler, and R. Urtasun, "Describing the scene as a whole: Joint object detection, scene classification and semantic segmentation," in Computer Vision and Pattern Recognition (CVPR), 2012 IEEE Conference on, pp. 702-709, IEEE, 2012.
F. Yu, A. Seff, Y. Zhang, S. Song, T. Funkhouser, and J. Xiao, "Lsun: Construction of a large-scale image dataset using deep learning with humans in the loop," arXiv preprint arXiv:1506.03365, 2015.
F. Yu, W. Xian, Y. Chen, F. Liu, M. Liao, V. Madhavan, and T. Darrell, "Bdd100k: A diverse driving video database with scalable annotation tooling," arXiv preprint arXiv:1805.04687, 2018.
Wei Zhan, Changliu Liu, Ching-Yao Chan, and Masayoshi Tomizuka. A Non-conservatively Defensive Strategy for Urban Autonomous Driving. In ITSC, 2016.
J. Zhang, S. A. Bargal, Z. Lin, J. Brandt, X. Shen, and S. Sclaroff, "Top-down neural attention by excitation backprop," International Journal of Computer Vision, vol. 126, No. 10, pp. 1084-1102, 2018.
B. Zhou, A. Khosla, A. Lapedriza, A. Oliva, and A. Torralba, "Learning deep features for discriminative localization," in Proceedings of the IEEE Conference on Computer Vision and Pattern Recognition, pp. 2921-2929, 2016.
B. Zhou, A. Lapedriza, A. Khosla, A. Oliva, and A. Torralba, "Places: A 10 million image database for scene recognition," IEEE transactions on pattern analysis and machine intelligence, 2017.
Tinghui Zhou, Matthew Brown, Noah Snavely, and David G. Lowe. Unsupervised Learning of Depth and Ego-Motion from Video. In CVPR, 2017.
Office Action of U.S. Appl. No. 16/374,205 dated Sep. 28, 2020, 20 pages.
Office Action of U.S. Appl. No. 16/374205 dated Feb. 23, 2021, 13 pages.

* cited by examiner

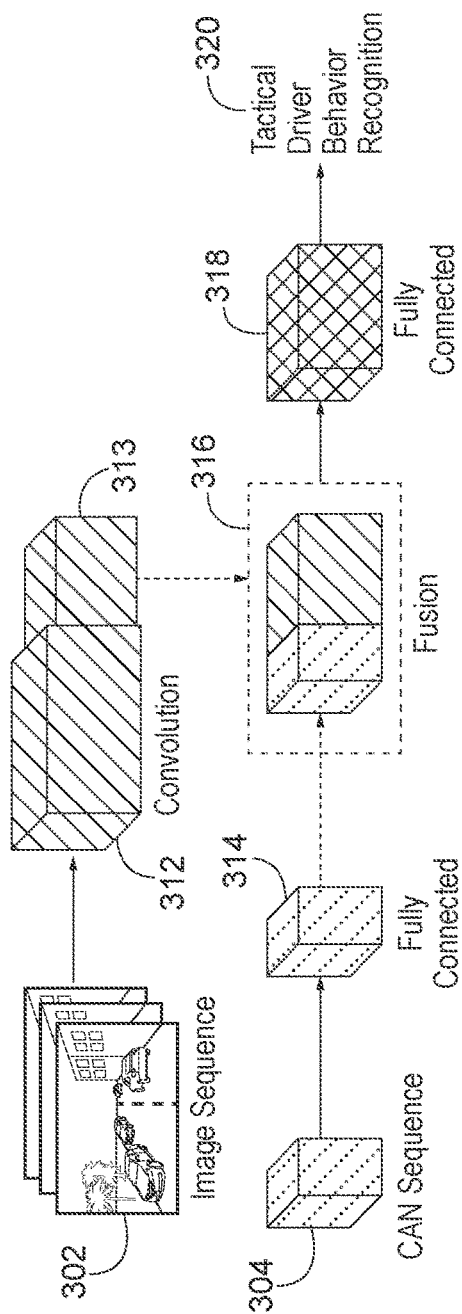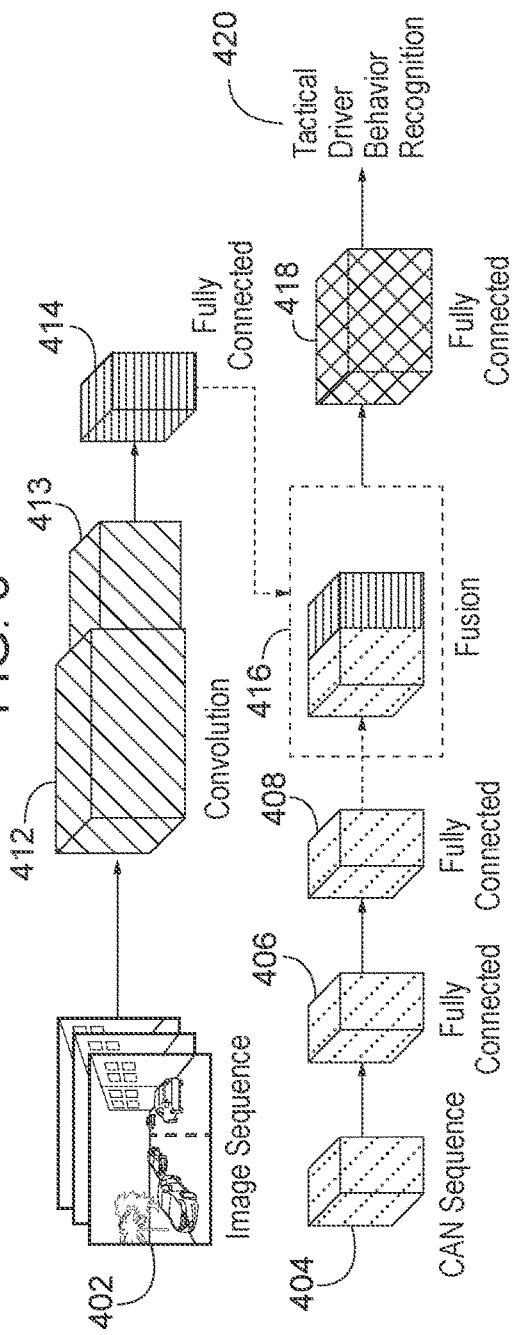
FIG. 3 (a) Early CNN Architecture
FIG. 4 (b) Late CNN Architecture

SCENE CLASSIFICATION PREDICTION

CROSS-REFERENCE TO RELATED APPLICATIONS

This application is a continuation-in-part of and claims priority to U.S. Non-Provisional patent application Ser. No. 16/438,119 entitled "DRIVER BEHAVIOR RECOGNITION AND PREDICTION", filed on Jun. 11, 2019, which is a continuation-in-part of and claims priority to U.S. Non-Provisional patent application Ser. No. 16/132,950 entitled "DRIVER BEHAVIOR RECOGNITION", filed on Sep. 17, 2018; this application is also a continuation-in-part of and also claims priority to U.S. Non-Provisional patent application Ser. No. 16/374,205 entitled "SCENE CLASSIFICATION", filed on Apr. 3, 2019, which claims the benefit of U.S. Provisional Patent Application Ser. No. 62/731,158, filed on Sep. 14, 2018; the entirety of the above-noted application(s) is incorporated by reference herein.

BACKGROUND

It is still far from understood how human drivers interact with road users in complicated driving scenarios. Automated driving or autonomous vehicles may operate in highly interactive, challenging scenarios. While learning based algorithms may be used to search data sequences in association with these driving scenarios, these algorithms may not be able to perform optimally when labelled data is not provided.

Additionally, in driving scenarios, scene understanding by a human involves answering questions about a place, environmental conditions, and traffic participant behavior. Interestingly, humans are able to perform dynamic scene recognition rapidly and accurately with little attention to objects in the scene. Human drivers have the remarkable ability to classify complex traffic scenes and adapt their driving behavior based on their environment. In this regard, automated human level dynamic scene recognition may thus be an attractive goal to achieve.

BRIEF DESCRIPTION

According to one aspect, a system for scene classification and prediction may include a forward-facing image capture device, an image segmentation module, an image masker, a temporal classifier, and a scene classifier. The forward-facing image capture device may capture a first series of image frames of an environment from a moving vehicle. The forward-facing image capture device may be aligned with a direction of travel of the moving vehicle. The image segmentation module may identify one or more traffic participants within the environment based on a first convolutional neural network (CNN). The image masker may generate a second series of image frames by masking one or more of the traffic participants from the environment. The temporal classifier may classify one or more image frames of the second series of image frames with one or more temporal predictions and generate a third series of image frames associated with respective temporal predictions based on a scene classification model. The classification may be based on a second CNN, a long short-term memory (LSTM) network, and a first fully connected layer. The scene classifier may classify one or more image frames of the third series of image frames based on a third CNN, global average pooling, and a second fully connected layer and generate an associated scene prediction based on the scene classification model and respective temporal predictions.

One or more of the temporal predictions may include an approaching annotation, an entering annotation, or a passing annotation. The system for scene classification and prediction may be implemented in a vehicle and the vehicle may include a controller activating or deactivating one or more sensors or one or more vehicle systems of the vehicle based on the scene prediction. The scene classifier may classify one or more image frames of the third series of image frames with a weather classification including clear, sunny, snowy, rainy, overcast, or foggy. The controller may activate or deactivate one or more sensors or one or more of the vehicle systems of the vehicle based on the weather classification. The scene classifier may classify one or more image frames of the third series of image frames with a road surface classification including dry, wet, or snow. The controller may activate or deactivate one or more of the sensors or one or more of the vehicle systems of the vehicle based on the road surface classification. The scene classifier may classify one or more image frames of the third series of image frames with an environment classification including urban, ramp, highway, or local. The controller may activate or deactivate one or more of the sensors or one or more of the vehicle systems of the vehicle based on the environment classification. The controller may prioritize searching for traffic lights, stop signs, or stop lines based on the scene prediction being an intersection.

According to one aspect, a system for scene classification and prediction may include a forward-facing image capture device, an image segmentation module, an image masker, a temporal classifier, and a scene classifier. The forward-facing image capture device may capture a first series of image frames of an environment from a moving vehicle. The forward-facing image capture device may be aligned with a direction of travel of the moving vehicle. The image segmentation module may identify one or more traffic participants within the environment based on a first convolutional neural network (CNN). The image masker may generate a second series of image frames by masking one or more of the traffic participants from the environment. The temporal classifier may classify one or more image frames of the second series of image frames with one or more temporal predictions, generate a third series of image frames associated with respective temporal predictions based on a scene classification model, and generate a first feature vector and a second feature vector based on the third series of image frames. The classification, the generation of the first feature vector, and the generation of the second feature vector may be performed based on a second CNN, a long short-term memory (LSTM) network, or a first fully connected layer. The scene classifier may classify one or more image frames of the third series of image frames based on a third CNN, global average pooling, and a second fully connected layer and generate an associated scene prediction based on the scene classification model and by performing data fusion on the first feature vector and the second feature vector.

The performing data fusion may include performing addition or concatenation. One or more of the temporal predictions may include an approaching annotation, an entering annotation, or a passing annotation. The system for scene classification and prediction may be implemented in a vehicle and the vehicle may include a controller activating or deactivating one or more sensors or one or more vehicle systems of the vehicle based on the scene prediction. The scene classifier may classify one or more image frames of the third series of image frames with a weather classification including clear, sunny, snowy, rainy, overcast, or foggy. The controller may activate or deactivate one or more sensors or one or more of the vehicle systems of the vehicle based on the weather classification. The scene classifier may classify one or more image frames of the third series of image frames with a road surface classification including dry, wet, or snow. The controller may activate or deactivate one or more of the sensors or one or more of the vehicle systems of the vehicle based on the road surface classification. The scene classifier may classify one or more image frames of the third series of image frames with an environment classification including urban, ramp, highway, or local. The controller may activate or deactivate one or more of the sensors or one or more of the vehicle systems of the vehicle based on the environment classification.

According to one aspect, a system for scene classification and prediction may include a forward-facing image capture device, a rear-facing image capture device, an image segmentation module, an image masker, a temporal classifier, a scene classifier, a convolutor, a concatenator, and a behavior predictor. The forward-facing image capture device may capture a first series of image frames of an environment from a moving vehicle. The forward-facing image capture device may be aligned with a direction of travel of the moving vehicle. The rear-facing image capture device may capture a second series of image frames of an interior of the moving vehicle. The rear-facing image capture device may face an opposite direction of the forward-facing image capture device. The image segmentation module may identify one or more traffic participants within the environment based on a first convolutional neural network (CNN). The image masker may generate a third series of image frames by masking one or more of the traffic participants from the environment based on the first series of image frames. The temporal classifier may classify one or more image frames of the third series of image frames with one or more temporal predictions and generate a fourth series of image frames associated with respective temporal predictions based on a scene classification model. The classification may be performed based on a second CNN, a long short-term memory (LSTM) network, and a first fully connected layer. The scene classifier may classify one or more image frames of the fourth series of image frames based on a third CNN, global average pooling, and a second fully connected layer and generate an associated scene prediction based on the scene classification model and respective temporal predictions. The convolutor may generate a first feature vector based on the first series of image frames, a second feature vector based on the second series of image frames, and a third feature vector based on the fourth series of image frames. The concatenator may generate a fusion feature by performing data fusion based on the first feature vector, the second feature vector, and the third feature vector. The behavior predictor may generate a predicted driver behavior based on the fusion feature.

The performing data fusion may include performing addition or concatenation. One or more of the temporal predictions may include an approaching annotation, an entering annotation, or a passing annotation. The system for scene classification and prediction may be implemented in a vehicle and the vehicle may include a controller activating or deactivating one or more sensors or one or more vehicle systems of the vehicle based on the scene prediction. The scene classifier may classify one or more image frames of the fourth series of image frames with a weather classification including clear, sunny, snowy, rainy, overcast, or foggy. The controller may activate or deactivate one or more sensors or one or more of the vehicle systems of the vehicle based on the weather classification. The scene classifier may classify one or more image frames of the fourth series of image frames with a road surface classification including dry, wet, or snow. The controller may activate or deactivate one or more of the sensors or one or more of the vehicle systems of the vehicle based on the road surface classification.

BRIEF DESCRIPTION OF THE DRAWINGS

FIG. 3 is an exemplary architecture which may be implemented according to the system for driver behavior recognition of FIG. 1.

FIG. 4 is an exemplary architecture which may be implemented according to the system for driver behavior recognition of FIG. 1.

DETAILED DESCRIPTION

Figure 1:
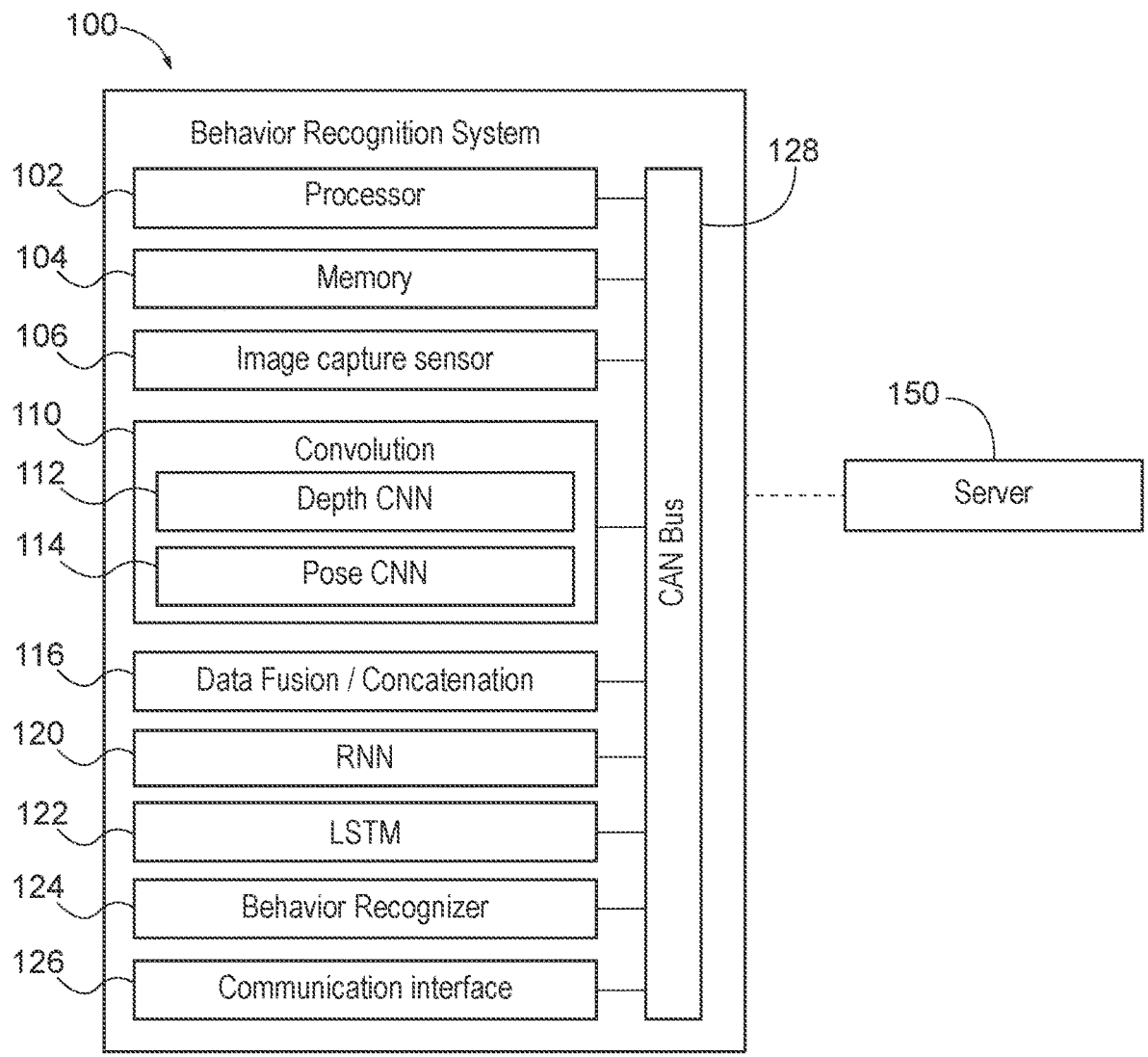
FIG. 1 is an exemplary block diagram of a system for driver behavior recognition, according to one aspect.

The following terms are used throughout the disclosure, the definitions of which are provided herein to assist in understanding one or more aspects of the disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

A unified representation framework is proposed to enable the application of learning driving behavior or driver behavior recognition. This learning or behavior recognition may be based on three-dimensional (3D) semantic scene representations and multimodal data fusion of data from vehicle sensors, such as cameras or other sensors connected to a controller area network (CAN) bus of the vehicle, to detect tactical driver behaviors. For example, the semantic scene representations may include structure from motion or semantic context. 3D scene analysis (e.g., depth estimation), situation understanding or analysis, intention prediction, decision planning, and decision making may be contemplated.

Different types of driver behavior may be considered or modeled. For example, driver behavior may include a goal oriented behavior, a stimulus driven behavior, cause, and attention. Examples of each of the different types of driver behavior may be as follows. A vehicle turning left while yielding to another vehicle crossing an intersection. The left turn behavior in this example may be the goal oriented behavior or tactical driving behavior. As used herein, tactical driving behavior may mean or include goal oriented driving behavior or vice versa. The yielding to the other vehicle crossing the intersection may be the stimulus driven behavior. The crossing vehicle may be the cause of the yielding behavior. The driver of the vehicle may also pay attention to other items or objects in the driving scenario, such as a pedestrian, for example. However, this attention does not necessarily affect the driver behavior. The techniques and systems for driver behavior recognition described herein provide for receiving an input of an image sequence, such as a video feed, and a corresponding vehicle data signal sequence and outputting each frame with a corresponding tactical driver behavior, goal oriented behavior, or background class.

One of the advantages or benefits provided by this unified representation framework or the techniques and systems for driver behavior recognition described herein is that the issues of data scarcity for supervised learning algorithms may be alleviated or mitigated. In this regard, the systems and methods for driver behavior recognition have been shown to outperform baseline models, as will be described herein.

FIG. 1 is an exemplary block diagram of a system 100 for driver behavior recognition, according to one aspect. The system 100 for driver behavior recognition may include a processor 102, a memory 104, an image capture device 106, a convolutor 110 which may include a convolution neural network (CNN), such as a depth CNN unit 112 (which may be utilized to provide a depth estimation) or a pose CNN unit 114 implementing a pose CNN. The system 100 for driver behavior recognition may include a data fuser 116 or concatenator, a recurrent neural network (RNN) unit 120, which may include a long short term memory (LSTM) unit 122. The system 100 for driver behavior recognition may include a behavior recognizer 124, a communication interface 126, and a controller area network (CAN) bus 128. The communication interface 126 may perform computer communication or be communicatively coupled with a server 150.

According to one aspect, data from the image capture device 106 and other vehicle sensors obtained through the CAN bus 128 may be utilized to determine or infer tactical driver behaviors. Examples of information received from the other vehicle sensors may include a steering angle, yaw angle, accelerator information, velocity, brake pedal pressure, etc. The unified representation framework of the system 100 for driver behavior recognition may incorporate two or more modalities to capture visual appearances and vehicle dynamics of the associated vehicle. These cues or features may be sent through the LSTM unit 122 to encode temporal information.

In this way, the system 100 for driver behavior recognition may utilize 3D semantic scene cues for tactical driver behavior detection for the following reasons. Tactical driver behaviors may be defined by driver actions, which may be inferred based on 3D world road structures (e.g., a road divider, a shape of an intersection). Additionally, driving scenes may be defined by a road topology (e.g., road markings for stopping, turning, and lane changes) and traffic rules (e.g., traffic signs and traffic lights) as a regulation for human drivers.

Therefore, the system 100 for driver behavior recognition may generate 3D semantic scene representations based on the fusion of semantic context obtained from semantic segmentation (e.g., each pixel may be assigned a value, and pixels having the same value may be considered to be part of the same class, such as a road, a vehicle, the sky, a building, etc.) and a 3D scene structure extracted by an unsupervised learning based structure from a motion algorithm as one or more visual features. The 3D semantic scene representations may be fused with vehicle sensor features (e.g., vehicle dynamics or sensory features) to determine one or more tactical driver behaviors. In this way, the 3D semantic scene context and temporal dynamics may be formulated in a unified representation learning framework that is used to generate tactical driver behaviors for corresponding frames of an image sequence.

According to one aspect, image capture device 106 may capture an image sequence of an operating environment through which a vehicle is travelling. The image sequence may include a first image frame, a second image frame, a third image frame, etc. Concurrently, the CAN bus 128 of the vehicle may capture or gather corresponding vehicle data signals organized as a corresponding vehicle data signal sequence. The vehicle data signal sequence may correspond to the image sequence in that the vehicle data signal sequence may include vehicle data associated with the first image frame, vehicle data associated with the second image frame, vehicle data associated with the third image frame, etc. These sequences may be sent or transmitted to the memory 104. In other words, the memory 104 may receive the image sequence and the corresponding vehicle data signal sequence.

The convolutor 110, the data fuser 116, the RNN unit 120, and the behavior recognizer 124 may be implemented via the processor 102 and the memory 104. In this regard, the convolutor 110 may generate, on a frame by frame basis, a first feature vector based on the image sequence and a first neural network, which may include a feature pyramid network. Stated another way, for each image frame of the image sequence, the convolutor 110 may generate a first feature vector for that frame based on the current frame of the image sequence and the first neural network. The CNN of the convolutor 110 may include an input layer, an output layer, and one or more hidden layers, which may be convolutional filters.

The processor 102 may generate, on a frame by frame basis, a second feature vector based on a fully connected layer and the vehicle data signal sequence. Stated another way, the processor 102 may feed frames of the vehicle data signal sequence (CAN bus sequence) through the fully connected layer to obtain the second feature vector, where each image frame may be associated with its own set of first, second, third, etc. feature vectors and vehicle data. In this way, the processor 102 may generate the first feature vector, the second feature vector, the third feature vector, etc. for each frame of the respective sequences (i.e., image sequence and vehicle data signal sequence, which are associated with a number of frames).

According to one aspect, a three-stream architecture may be implemented, and the depth CNN unit 112 may generate the third feature vector based on the image sequence and a depth CNN. After an image frame is passed through the depth CNN by the processor 102, each pixel in the image frame may be assigned or associated with a value which is indicative of a depth estimation.

The system 100 for driver behavior recognition may receive or derive 3D scene structure information, semantic context information, and vehicle dynamics information, and fuse this information together to determine the tactical driver behavior. Different types of data fusion may be utilized. For example, the data fuser 116 may perform data fusion by performing addition or concatenation. According to one aspect, feature vectors may be concatenated by the data fuser 116, and batch normalized (via the processor 102). According to one aspect, the 3D scene structure and semantic context features may be added prior to concatenation with the vehicle data or CAN bus features. According to one aspect, the semantic context features (e.g., from the CNN or a feature pyramid network) and the 3D scene structure features may be separately convolved by 1×1 convolution kernels, followed by an addition operation. According to one aspect, the sum operation may be the data fusion technique utilized by the data fuser 116. The sum operation may transfer the discriminated power from the depth features while further enhancing the performance by using semantic segmentation features.

Regardless of the fusion technique utilized, the data fuser 116 may generate the fusion feature by performing data fusion based on the first feature vector and the second feature vector. According to one aspect where the three-stream architecture is implemented, the data fuser 116 may generate the fusion feature by performing data fusion (e.g., addition data fusion or concatenation data fusion) based on the first feature vector, the second feature vector, and the third feature vector.

According to one aspect, the CNN unit may process the fusion feature based on a second fully connected layer. According to another aspect, the RNN unit 120 may process the fusion feature using a LSTM layer via the LSTM unit 122. After processing or after fusion, the fusion feature or processed fusion feature may be stored by the behavior recognizer 124 to the memory 104, as a recognized driver behavior associated with each corresponding frame.

As will be seen below, the first neural network may be a CNN (e.g., FIGS. 3-4) or an RNN (e.g., FIGS. 5-7). Regardless of how the neural network (e.g., first neural network, second, third, pose, depth, etc.) is implemented (i.e., as the CNN, depth CNN, pose CNN, or as the RNN), the neural network may include an input layer, an output layer, one or more hidden layers, one or more filter layers (e.g., convolutional filters or other filter, etc.).

Additionally, as will be discussed in greater detail below and with regard to the early data fusion, the aforementioned feature vectors (e.g., the first feature vector, the second feature vector, the third feature vector, etc.) may be generated based on an intermediate step or phase of the neural network (e.g., first neural network, etc.). In other words, a neural network, such as the CNN, may include or comprise the input layer, the additional or hidden layers, and the output layer. According to one aspect, the feature vector (e.g., the first feature vector, the second feature vector, the third feature vector, etc.) may be generated in a manner where the feature vector is not passed through or is not calculated based on the output layer of the neural network. For example, the first feature vector may not be passed through or calculated based on the output layer of the first neural network. As another example, the third feature vector may not be passed through or calculated based on the output layer of the depth CNN.

Stated another way, the processor 102 or the convolutor 110 may generate the first feature vector based on the image sequence and only the input layer and one or more of the hidden layers of the first neural network (and not the output layer of the first neural network). Explained yet again, one or more of the feature vectors generated herein (e.g., the first feature vector, the second feature vector, the third feature vector, the semantic feature vector, the vehicle signal feature vector, the depth feature vector, etc.) may be generated merely from one or more intermediate layers of a neural network (e.g., CNN, RNN, depth CNN, etc.) rather than allowing the neural network to process the feature vector using the output layer. In this way, unique data fusion is provided herein to enable tactical driver behavior recognition to be determined.

The features from the aforementioned cues or information are utilized, rather than features trained based on direct supervision of tactical driver behavior labels, thereby mitigating the need for labelled data. According to one aspect, features for semantic context may be derived using auxiliary supervised semantic segmentation. Features for the 3D scene structure may be derived using unsupervised structure from motion or (e.g., motion video, which may be a sequence of if image frames). Structure from motion (SFM) may be implemented to understand how the vehicle moved by taking the motion video as an input and generating a depth of an object around the vehicle. In this way, the input motion video or image frames thereof may be fed to a SFM algorithm, which may determine the depth of the object accordingly. If the vehicle moves forward by one meter, a tree on the left may be determined to be a farther distance away, such as by one meter, and the depth of the tree may be determined accordingly.

For example, the input may be untrimmed, egocentric sequences of video from the image capture device 106 and CAN signals from the CAN bus 128, while the output may be the tactical driver behavior label of each corresponding image frame. Examples of tactical driver behavior labels may include intersection passing, turning right, turning left, right lane change, left lane change, U turn, left branch, right branch, crosswalk passing, railroad passing, merge, intersection passing, etc.

The recognized driver behavior associated with each corresponding frame may be passed on or transmitted via the communication interface 126 of the system 100 for driver behavior recognition to the server 150, and stored as a driver behavior recognition database indicative of recognized driver behavior, given the input of the image frame from the image sequence and CAN bus signal data.

Figure 2:
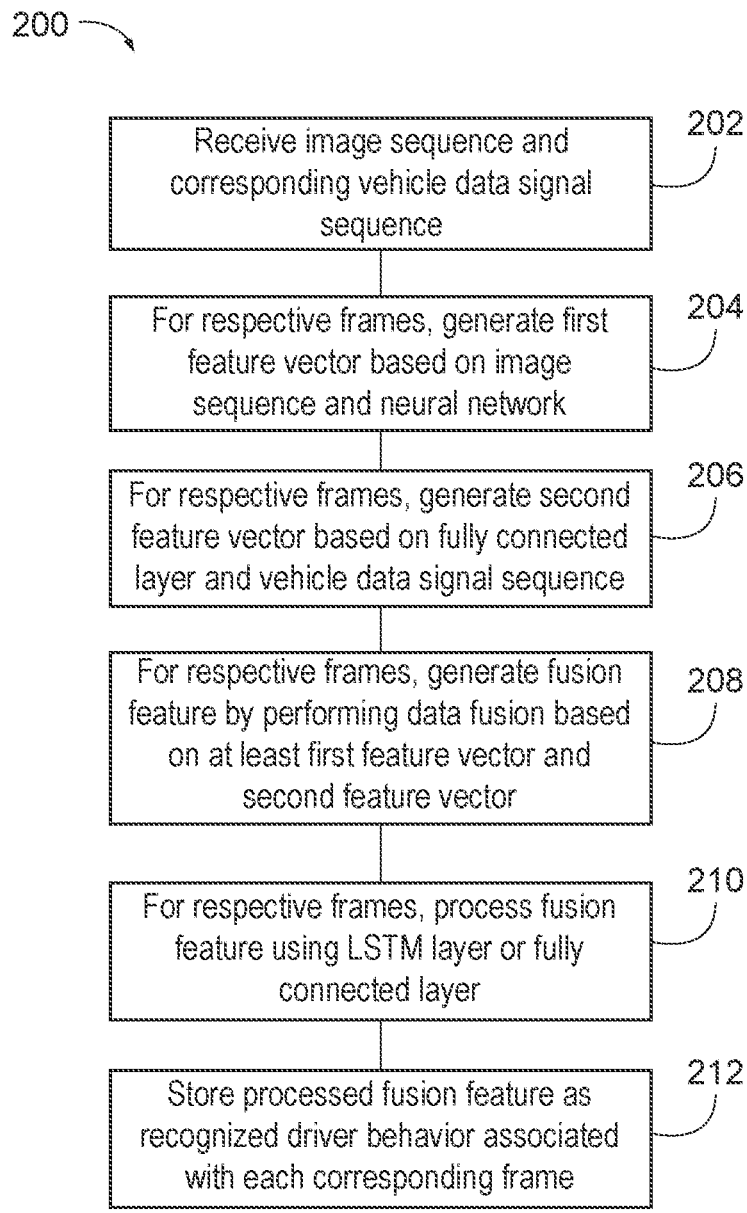
FIG. 2 is an exemplary flow diagram of a method for driver behavior recognition, according to one aspect.

FIG. 2 is an exemplary flow diagram of a method 200 for driver behavior recognition, according to one aspect. The method 200 may include receiving 202 an image sequence and a corresponding vehicle data signal sequence. The image sequence may include at least a first image frame and a second image frame. The vehicle data signal sequence may include vehicle data associated with the first image frame and vehicle data associated with the second image frame. The method 200 may include, for each frame of the respective sequences, generating a first feature vector 204 based on the image sequence and a first neural network, generating a second feature vector 206 based on a fully connected layer and the vehicle data signal sequence, generating a fusion feature 208 by performing data fusion based on the first feature vector and the second feature vector, processing the fusion feature 210 using a LSTM layer or a fully connected layer, and storing 212 the processed fusion feature as a recognized driver behavior associated with each corresponding frame.

Figure 5:
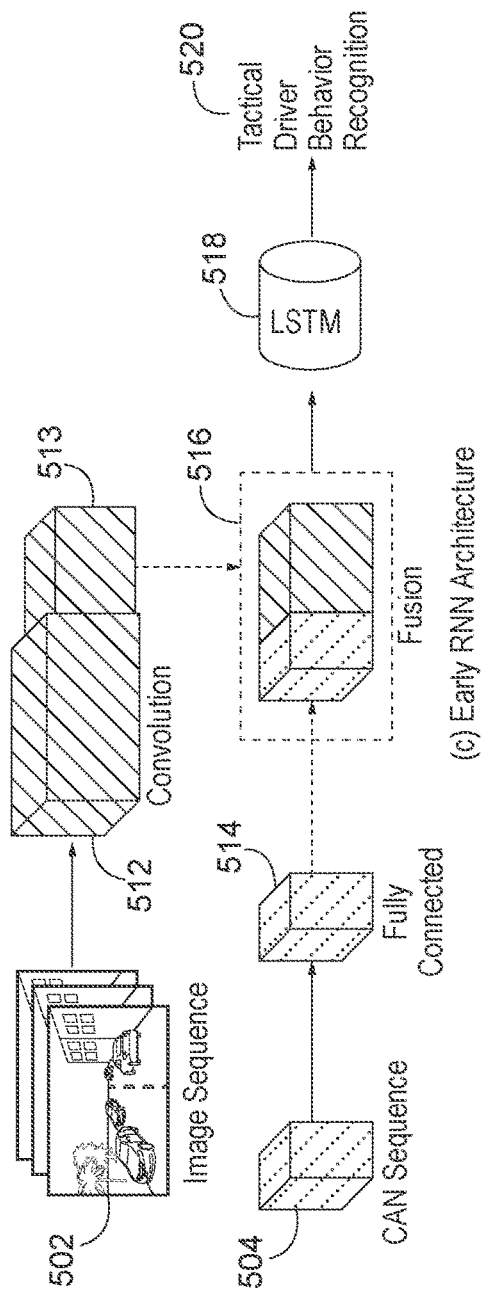
FIG. 5 is an exemplary architecture which may be implemented according to the system for driver behavior recognition of FIG. 1.
Figure 6:
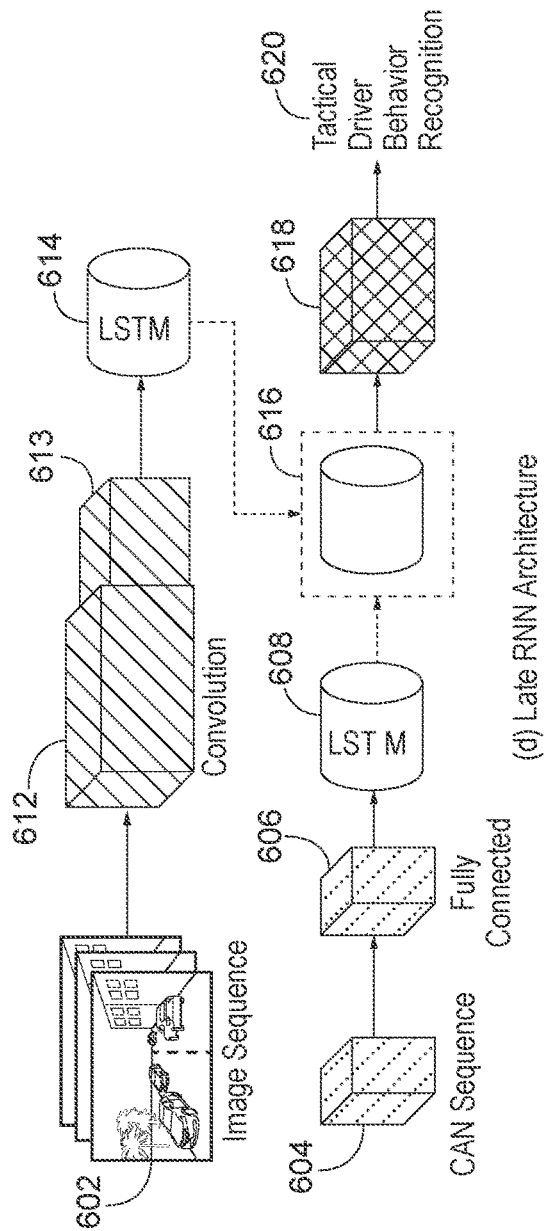
FIG. 6 is an exemplary architecture which may be implemented according to the system for driver behavior recognition of FIG. 1.
Figure 7:
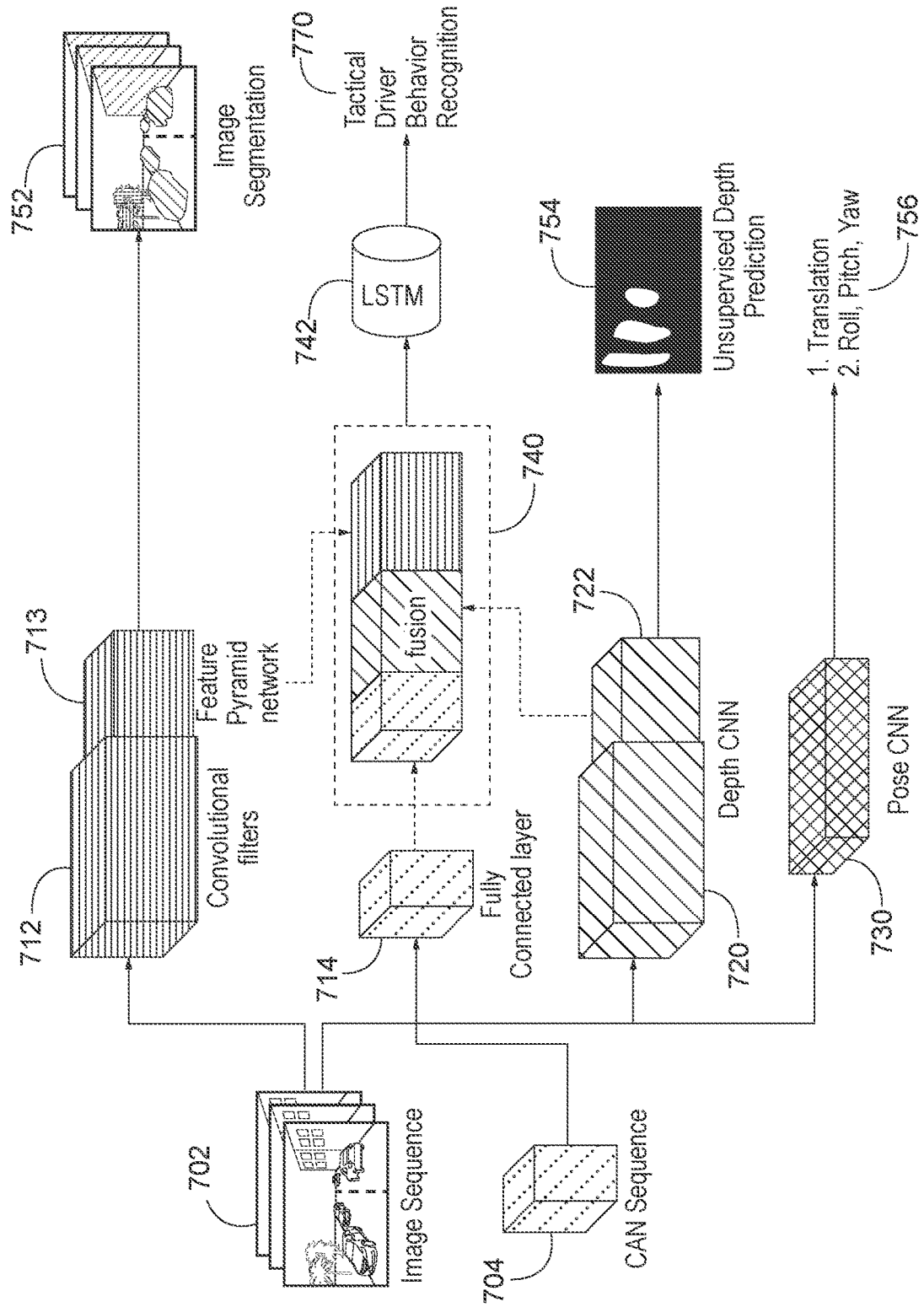
FIG. 7 is an exemplary architecture which may be implemented according to the system for driver behavior recognition of FIG. 1.

FIGS. 3-7 are exemplary architectures which may be implemented according to the system 100 for driver behavior recognition of FIG. 1. According to one aspect, different multimodal fusion architectures may be implemented using the image capture device 106 or camera and vehicle sensor data from the CAN bus 128 for tactical driver behavior detection. FIGS. 3-4 illustrate exemplary architectures based on CNN (e.g., using 2D convolutions and a fully connected layer) while FIGS. 5-6 illustrate exemplary architectures based on RNN. FIGS. 3 and 5 illustrate exemplary architectures based on early data fusion (e.g., generating a feature vector from the convolutor 110 based on not using an output layer of the CNN) while FIGS. 4 and 6 illustrate exemplary architectures based on late data fusion (e.g., generating a feature vector from the convolutor 110 based on the output layer and a fully connected layer or an LSTM layer). FIGS. 3-6 are two-stream architectures which fuse two feature vectors to form a fusion feature, while FIG. 7 is a three-stream architecture which fuses three feature vectors to form the fusion feature. An increase of the overall performance by 8% over a baseline model was observed during experimentation when the semantic context features were incorporated into the framework.

FIG. 3 is an exemplary architecture which may be implemented according to the system 100 for driver behavior recognition of FIG. 1. An image sequence 302 and a CAN sequence 304 are received as inputs to this architecture, via the memory 104, for example. The image sequence 302 may be fed into a CNN including a first portion 312 and a second portion 313. The first feature vector may be generated based on an intermediate representation or processing of the CNN from 313, rather than having an output layer of the CNN process the first feature vector. The CAN sequence 304 may be fed through a fully connected layer 314 (e.g., a first fully connected layer) to generate a second feature vector. The data fuser 116 may perform data fusion and generate a fusion feature 316. The fusion feature may be fed through a second fully connected layer 318, which may result in the tactical driver behavior recognition data 320, which may be utilized to build the database, as previously discussed. In FIG. 3, the second fully connected layer 318 provided after the data fusion of the fusion feature 316 results in no temporal information being considered in generating the recognized driver behavior. In this regard, the architecture of FIG. 3 may be a per frame action classification network that takes the image frame and CAN bus vehicle data of a current time step as inputs. The second fully connected layer 318 of FIG. 3 may output a same number of features as the LSTM layer of FIG. 5 to facilitate a comparison against the baseline model.

FIG. 4 is an exemplary architecture which may be implemented according to the system 100 for driver behavior recognition of FIG. 1. The vehicle data signal 404 sequence may be passed through the first fully connected layer 406 and a second fully connected layer 408 to generate the second feature vector. As seen in FIG. 4, the first feature vector may be generated based on the image sequence 402, the first neural network, which may be a CNN, including a first portion 412 and a second portion 413, and a third fully connected layer 414 through which the output of the CNN unit is passed (e.g., thereby using the output layer of the CNN first portion 412, second portion 413 rather than merely the intermediary layers or first portion 412), prior to data fusion 416. In FIG. 4, the processor 102 may process the fusion feature using a fourth fully connected layer 418, which may result in the tactical driver behavior recognition data 420, which may be utilized to build the database, as previously discussed. Conversely, in FIG. 5, which is based on RNN architecture, the processor 102 may process the fusion feature using the LSTM layer.

FIG. 5 is an exemplary architecture which may be implemented according to the system 100 for driver behavior recognition of FIG. 1. In FIG. 5, the memory 104 may receive the image sequence 502. The vehicle data signal sequence 504 may be received from the CAN bus 128 and stored to the memory 104. In this example, the image sequence 502 may represent the 3D scene structure information and the vehicle data signal sequence 504 may represent the vehicle dynamics information. The semantic context information may be derived by the convolutor 110, which may be implemented by the processor 102, resulting in semantic context features (e.g., a feature vector or the first feature vector). The vehicle data signal sequence 504 may be fed, by the processor 102, through a fully connected layer 514, which generates the second feature vector. The data fuser 116 may perform data fusion or data concatenation to fuse 516 or concatenate the first feature vector and the second feature vector. As previously described, different types of data fusion may be performed. The data fuser 116 may thus generate the fusion feature by performing data fusion based on the first feature vector and the second feature vector. The fusion feature may be passed through, via the processor 102, an LSTM layer 518, thereby generating the tactical driver behavior recognition result 520, which may be a recognized driver behavior associated with a corresponding image sequence frame. In this way, the architecture of FIG. 5 fuses an image feature vector with a vehicle data vector by concatenation, and passes the fusion feature through the LSTM layer (via the LSTM unit 122) for classification. As seen in FIG. 5, the first feature vector may not necessarily be generated by passing the image frames of the image sequence 502 completely through the CNN, including a first portion 512 and a second portion 513. Rather, merely an intermediate product of the CNN first portion 512 may be utilized to generate the first feature vector so as to not utilize the output layer of the CNN first portion 512, second portion 513.

According to one aspect, the image sequence 502 includes a set of synchronized images and the vehicle data signal sequence 504 may be received from the CAN bus 128 and include CAN sensor signals corresponding to the synchronized images captured by the image capture device 106. The processor 102 may sample image frames from the image sequence and corresponding vehicle data from the vehicle data signal sequence 504 at a number of frames per second (fps), such as 3 fps. The vehicle data signal sequence 504 may be sampled or downsampled at a corresponding rate. In other words, the vehicle data signal sequence 504 may be downsampled from 100 Hz to 3 Hz to match the sampling rate from the image sequence 502. From the sampled image frames, the processor 102 may extract an image representation from the Conv2d_7b_1×1 layer (e.g., a layer or hidden layer of a CNN of the convolutor 110) of InceptionResnetV2 pre-trained on ImageNet (e.g., a pre-trained CNN). In this example, the features may be convolved with a 1×1 convolution to reduce the dimensionality from 8×8×1536 to 8×8×20. Raw sensor signals or the vehicle data signals from the vehicle data signal sequence 504 may be passed through the fully connected layer 514 to obtain a one dimensional feature vector which may be further concatenated at 516 with the image feature vector.

The concatenated features may be fed, by the LSTM unit 122, into the LSTM layer 518 to encode a history of past measurements. Batches of sequence segments may be formed by sequentially iterating over multiple driving sessions during a training phase. In this regard, the last LSTM hidden state from a previous batch may be utilized to initialize a LSTM hidden state on a next or subsequent step. The training may be performed based on truncated back propagation through time. To account for a class imbalance between foreground classes and background classes, techniques for training object proposal networks where positive and negative proposals are highly imbalanced may be implemented.

According to one aspect, the LSTM layer 518 may use batches of size 40 with each sequence length set to 90 samples. The dropout keep probability on the input and output of the LSTM may be set to 0.9. Experiments may be performed by changing one aspect of the architecture at a time to demonstrate efficiencies of each architecture from FIGS. 3-6. Two sets of experiments were performed. One experiment explores the benefit of late fusion versus early fusion. Another experiment explores the benefit of CNN versus RNN. Based on these experiments, the architecture of FIG. 7 was derived, and the image features were further enhanced with rich structural and contextual information.

FIG. 6 is an exemplary architecture which may be implemented according to the system 100 for driver behavior recognition of FIG. 1. In FIG. 6, two LSTM layers are utilized. A first LSTM layer 641 may be utilized to capture temporal features of image frames from the image sequence 602 while a fully connected layer 606 and a second LSTM layer 608 may be utilized to capture temporal features of the CAN sequence or the vehicle data signal sequence 604. In this regard, the first feature vector may be generated based on the image sequence 602, the first neural network including a first portion 612 and a second portion 613, and the second LSTM layer 614. After these temporal features of the image frames and the vehicle data are captured, these feature vectors may be fused 616 on a per image frame basis and passed through a fully connected layer 618 for behavior classification 620. The framework or architecture of FIG. 6 may result in the capturing of motion cues of each modality rather than encoding temporal features after the multi-modal fusion layer. As seen, FIG. 4 was similarly structured, except using the additional fully connected layers rather than LSTM layers, resulting in the CNN architecture. According to one aspect, one or more of the fully connected layers of FIGS. 3-6 may be interchanged with one or more convolutional filter layers and/or vice versa.

FIG. 7 is an exemplary architecture which may be implemented according to the system 100 for driver behavior recognition of FIG. 1. In FIG. 7, the exemplary architecture introduces a unified representation learning framework that incorporates 3D semantic scene context and multi-modal cues for tactical driver behavior detection. Unsupervised learning may be implemented from motion features, such as from the image sequence from a video feed, for example. Depth and camera motion may be estimated. A two-stream convolution network including depth (e.g., Depth CNN) and pose (e.g., Pose CNN) may be trained via supervision from a synthesis objective.

In FIG. 7, a proposed unified representation learning framework combines a semantic context, 3D scene structure, and vehicle dynamics for tactical driver behavior detection. Additionally, different fusion schemes may be implemented. According to one aspect, one or more penultimate features of the Depth CNN stream are used as the input to the proposed fusion framework. The features may be of size 23×40×256 and may be concatenated with the CAN bus features and may be sent downstream for processing by a LSTM layer. For semantic context, a Feature Pyramid Network may be incorporated to enrich features at a higher resolution. Features from one of the feature pyramids may be selected to match the dimension of the depth features.

An image sequence 702 and a CAN sequence 704 are received as inputs to this architecture, via the memory 104, for example. The image sequence 702 may be fed into a CNN, including a first portion 712 and a second portion 713 which may be a feature pyramid network. The output of the CNN first portion 712, second portion 713 as a whole may result in image segmentation 752, while an intermediate result of the CNN first portion 712, second portion 713 may be utilized as the first feature vector. In this regard, the first feature vector may be generated based on an intermediate representation or processing of the CNN from 713, rather than having an output layer of the CNN process the first feature vector. The image sequence 702 may be fed through a depth CNN 720, 722, resulting in an unsupervised depth prediction 754. The CAN sequence 704 may be fed through a fully connected layer 714 to generate a second feature vector. According to one aspect, 714 may be a convolutional filter layer rather than the fully connected layer. An intermediate result of this depth CNN 720, 722 may be used to generate the third feature vector. Additionally, the image sequence 702 may be fed through a pose CNN 730, resulting in pose data 756.

The data fuser 116 may perform data fusion and generate a fusion feature 740. The fusion feature 740 may be fed through a LSTM layer 742, which may result in the tactical driver behavior recognition data 770, which may be utilized to build the database, as previously discussed.

According to one aspect, the data fusion may include concatenating ImageNet features along with features of semantic segmentation, and the vehicle data CAN bus signals. According to another aspect, the ImageNet features may be removed and excluded because most of the contextual scene information may already be embedded by the semantic segmentation features.

Figure 8:
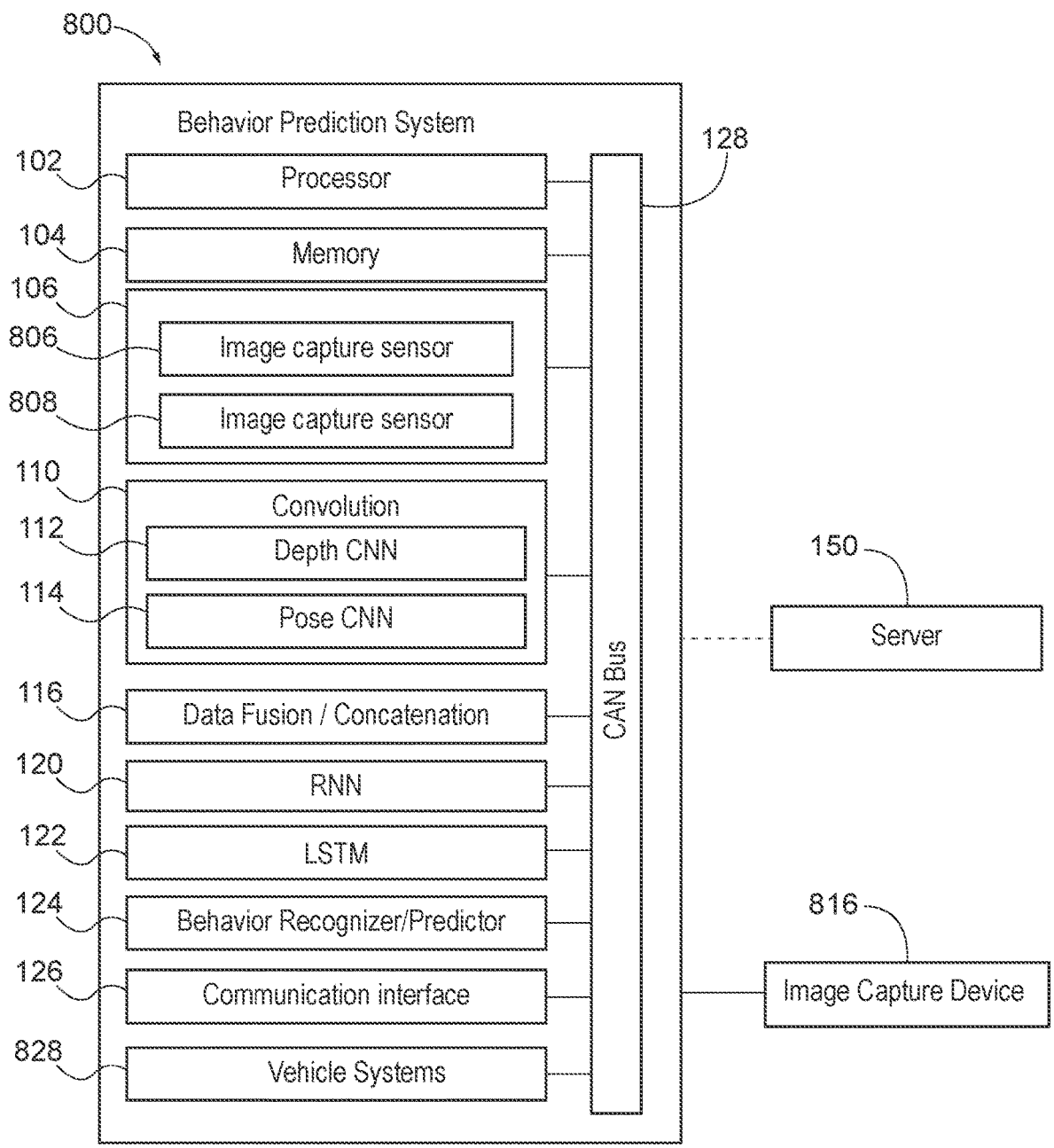
FIG. 8 is an exemplary block diagram of a system for driver behavior recognition and/or driver behavior prediction, according to one aspect.

FIG. 8 is an exemplary block diagram of a system 800 for driver behavior recognition and/or driver behavior prediction, which may be equipped on a vehicle, according to one aspect. The system 800 for driver behavior recognition/prediction may include a processor 102, a memory 104, and an image capture device 106, which may include multiple image capture sensors 806, 808 according to one aspect. According to another aspect, an external image capture device 816 may be communicatively coupled to the system 800 for driver behavior recognition/prediction. The system 800 for driver behavior recognition/prediction may include a convolutor 110 or CNN unit. The convolutor 110 may include one or more processing layers, one or more convolution layers, one or more fully connected layers, one or more hidden layers, etc. The convolutor 110 may include a depth CNN unit 112 implementing a depth CNN, a pose CNN unit 114 implementing a pose CNN, among other types of CNNs. The system 800 for driver behavior recognition/prediction may include a data fuser 116 or a concatenator, an RNN unit 120, an LSTM unit 122, a behavior recognizer/predictor 124, a communication interface 126, and one or more vehicle systems 828. The CAN bus 128 may be communicatively coupled to the above described components and facilitate computer communication therebetween.

As described above, the external image capture device 816 may be communicatively coupled to the system 800 for driver behavior recognition/prediction. Additionally, a server 150 may also be communicatively coupled to the system 800 for driver behavior recognition/prediction via the communication interface 126 or CAN bus 128.

According to one aspect, the image capture device 106 may be a dual dash-cam device including the first image capture sensor 806 and the second image capture sensor 808. The first image capture sensor 806 may be a forward-facing camera of the vehicle capturing a first image sequence of the operating environment through which the vehicle is travelling. The second image capture sensor 808 may be a rear-facing camera of the vehicle capturing a second image sequence of a driver or operator of the vehicle, thereby capturing operator actions, reactions, operator gaze locations, operator head pose, facial expressions, etc.

According to another aspect, the image capture device 106 of the system 800 for driver behavior recognition/prediction may merely include a single image capture sensor 806 or 808 capturing either the first image sequence or the second image sequence and the external image capture device 816 may capture the other, missing image sequence. For example, if a vehicle is merely equipped with a forward-facing dash-cam, the forward-facing dash-cam may be utilized to receive the first image sequence of the operating environment while the external image capture device 816 may be utilized to receive the second image sequence of the driver or operator of the vehicle. Alternatively, if the vehicle is merely equipped with a rear-facing driver-cam, the rear-facing driver-cam may be utilized to receive the second image sequence of the driver or operator of the vehicle, while the external image capture device 816 may be utilized to receive or capture the first image sequence of the operating environment through which the vehicle is travelling.

The external image capture device 816 may be a separate device, such as a mobile device or smartphone interfaced to be in computer communication with the system 800 for driver behavior recognition/prediction via the communication interface 126, for example. Ultimately, regardless of how the first image sequence and the second image sequence are captured or received, both may be utilized as inputs to the system 800 for driver behavior recognition/prediction in either a two-stream architecture or a three-stream architecture, as will be described with reference to FIGS. 10-14. Additionally, as described above, the processor 102 may sample frames from respective sequences to have a matching sampling rate or down sample frames from one or more of the streams so that different streams have matching frames numbers for analysis and/or processing.

In this regard, the processor 102 may generate one or more feature vectors based on one or more of the input sequences. Stated another way, the processor 102 may generate a first feature vector, a second feature vector, a third feature vector, a fourth feature vector, etc. A feature vector, as used herein, may include one or more processed frames of the respective sequence utilized to generate the corresponding feature vector. In other words, because each sequence includes a set of frames, and because a sequence is utilized to generate the feature vector, the resultant feature vector may include a set of processed frames. The processor 102 may generate these respective feature vectors based on one or more of the input sequences (e.g., the first image sequence, the second image sequence, and/or the CAN data or vehicle data signal sequence) and one or more neural network layers or one or more processing layers. Examples of neural network layers or processing layers may include a convolution filter layer, a fully connected layer, a LSTM layer, a hidden layer, a feature pyramid network layer, a depth CNN layer, a pose CNN layer, etc.

As described above, the first image sequence may include at least a first image frame and a second image frame (e.g., and further, a third image frame, a fourth image frame, etc.). The second image sequence may include at least a first image frame and a second image frame (e.g., and further, a third image frame, a fourth image frame, etc.). The vehicle data signal sequence may include vehicle data associated with the first image frame of the first image sequence and vehicle data associated with the second image frame of the first image sequence or otherwise vehicle data associated with each image frame of the first image sequence. The memory 104 may receive (from the image capture device 106 and/or the external image capture device 816) one or more of the first image sequence, the second image sequence, and the corresponding vehicle data signal sequence (which may correspond to either the first image sequence, the second image sequence, or both the first image sequence and the second image sequence).

According to one aspect, the convolutor 110, implemented via the processor 102, may generate the first feature vector based on the first image sequence and a first neural network, which may be a CNN or a RNN. Further, the convolutor 110 may generate the first feature vector such that the first image sequence is passed through one or more neural network layers or one or more processing layers (e.g., a convolution filter layer, a fully connected layer, a LSTM layer, a hidden layer, a feature pyramid network layer, a depth CNN layer, a pose CNN layer, an input layer, an output layer, etc.) prior to and/or after passing through the first neural network.

According to one aspect, the processor 102 may generate the second feature vector based on the vehicle data signal sequence and one or more processing layers, such as a fully connected layer or a convolutional filter layer.

According to one aspect, the depth CNN unit 112, implemented via the processor 102, may generate the third feature vector based on the first image sequence and a depth CNN. Further, the depth CNN unit 112 may generate the first feature vector such that the first image sequence is passed through one or more neural network layers or one or more processing layers (e.g., a convolution filter layer, a fully connected layer, a LSTM layer, a hidden layer, a feature pyramid network layer, a depth CNN layer, a pose CNN layer) prior to and/or after passing through the depth CNN.

According to one aspect, the convolutor 110, implemented via the processor 102, may generate the fourth feature vector based on the second image sequence and a second neural network, which may be a CNN or a RNN. Further, although not shown in FIGS. 10-14, the convolutor 110 may generate the fourth feature vector such that the second image sequence is passed through one or more neural network layers or one or more processing layers (e.g., a convolution filter layer, a fully connected layer, a LSTM layer, a hidden layer, a feature pyramid network layer, a depth CNN layer, a pose CNN layer) prior to and/or after passing through the second neural network.

The data fuser 116 may be implemented via the above described two-stream architecture or three-stream architecture by performing data fusion (e.g., addition or concatenation) on two or more feature vectors. For example, when the first image sequence and the second image sequence are utilized as inputs to the system 800 for driver behavior recognition/prediction, the data fuser 116 may generate the fusion feature by performing data fusion based on the first feature vector (e.g., the feature vector associated with the first image sequence) and the second feature vector (e.g., the feature vector associated with the second image sequence), thereby resulting in the two-stream architecture implementation of the system 800 for driver behavior recognition/prediction. As another example, when the first image sequence, the corresponding vehicle data signal sequence, and the second image sequence are utilized as inputs to the system 800 for driver behavior recognition/prediction, the data fuser 116 may generate the fusion feature by performing data fusion based on the first feature vector (e.g., associated with the first image sequence), the second feature vector (e.g., associated with the vehicle data signal sequence), the third feature vector (e.g., associated with the first image sequence and the depth CNN), and the fourth feature vector (e.g., associated with the second image sequence), thereby resulting in the three-stream architecture implementation of the system 800 for driver behavior recognition/prediction.

For example, if the first image sequence depicts the vehicle drifting left, and heading into a lane to the left of a current lane, the second image sequence includes the driver turning the steering wheel to the left, and the vehicle data signal sequence includes a change in the steering angle, the processor 102 may determine a left lane change as the driver behavior recognition action. Other examples of the driver behavior recognition action may include a lane change, lane branching, a merging action, cross-walk passing, etc.

According to one aspect, the fusion feature may be processed via the behavior recognizer 124 of the processor 102, which may pass the fusion feature through one or more neural network layers or one or more processing layers (e.g., a convolution filter layer, a fully connected layer, a LSTM layer, etc.). In this regard, the processed fusion feature may be stored in the memory 104 as a recognized driver behavior associated with each corresponding frame. For example, the first image sequence may include n image frames. In this example, the behavior recognizer 124 of the processor 102 may generate n resultant frames of the recognized driver behavior based on the n image frames of the first image sequence.

According to one aspect, the behavior recognizer 124 may be a behavior predictor 124 implemented via the processor 102 and may generate a predicted driver behavior. The behavior predictor 124 may generate the predicted driver behavior by processing the fusion feature using a LSTM layer to generate more resultant frame than the n input image frames. Stated again, the LSTM layer provided by the LSTM unit 122 enables the behavior predictor 124 to take any number of inputs and produce any number of outputs. Explained another way, the first image sequence is the one of the inputs to the system 800 for driver behavior prediction, and may include n image frames. However, the LSTM layer of the LSTM unit 122 may enable the behavior predictor 124 to generate the predicted driver behavior by generating n+x resultant frames for the predicted driver behavior based on the n image frames of the first image sequence. In this example, x may be a number of prediction frames for the predicted driver behavior while the first n resultant frames may be the recognized driver behavior of the n input image frames. The x prediction frames may be indicative of a predicted driver behavior generated based on the two or three input streams, as described above.

According to one aspect, the vehicle system 828 may operate, or perform an action based on the predicted driver behavior associated with the x corresponding prediction frames. For example, the vehicle system 828 may be an advanced driver-assistance systems (ADAS) which may implement an automated steering or deceleration action to mitigate an anticipated collision, alert the driver of a potential collision, provide warnings, automatically engage an autonomous driving mode for the vehicle, automate lighting, provide or engage an adaptive cruise control, engaged in a collision avoidance action, generate a traffic notification, connect a smartphone, contact an emergency contact, engage in a lane departure warning mode or action, provide automatic lane centering, highlight an obstacle on a display or a HUD, etc.

As another example, when the predicted driver behavior is a lane change, (e.g., the inferred "intention" of the driver is the lane change), if, using a rear facing camera, it is determined that the blind spot has not been checked by the driver yet or that the driver is inattentive of vehicles in an adjacent lane, the vehicle system 828 may initiate ADAS control by taking control and performing an evasive maneuver or activating a warning system regarding a risk associated with the lane change which is inferred as about to be performed by the driver. Therefore, the system 800 for driver behavior recognition and/or driver behavior prediction may include an "action specific" warning/mitigation system, which may be enabled based on an attention of the driver with regard to a specific monitored area, a risk, a risk threshold, the predicted action, a predicted result associated with the predicted action, etc. In other words, the warning or evasive maneuvering aspect may not necessarily always be active or present to the driver.

Further, the information displayed on the HUD vehicle system may be masked or filtered according to the predicted driver behavior. For example, if the driver is predicted to maintain his or her current lane by the behavior predictor 124, the processor 102 may remove displayed information from the HUD relating to blind spot indicators, for example.

Figure 9:
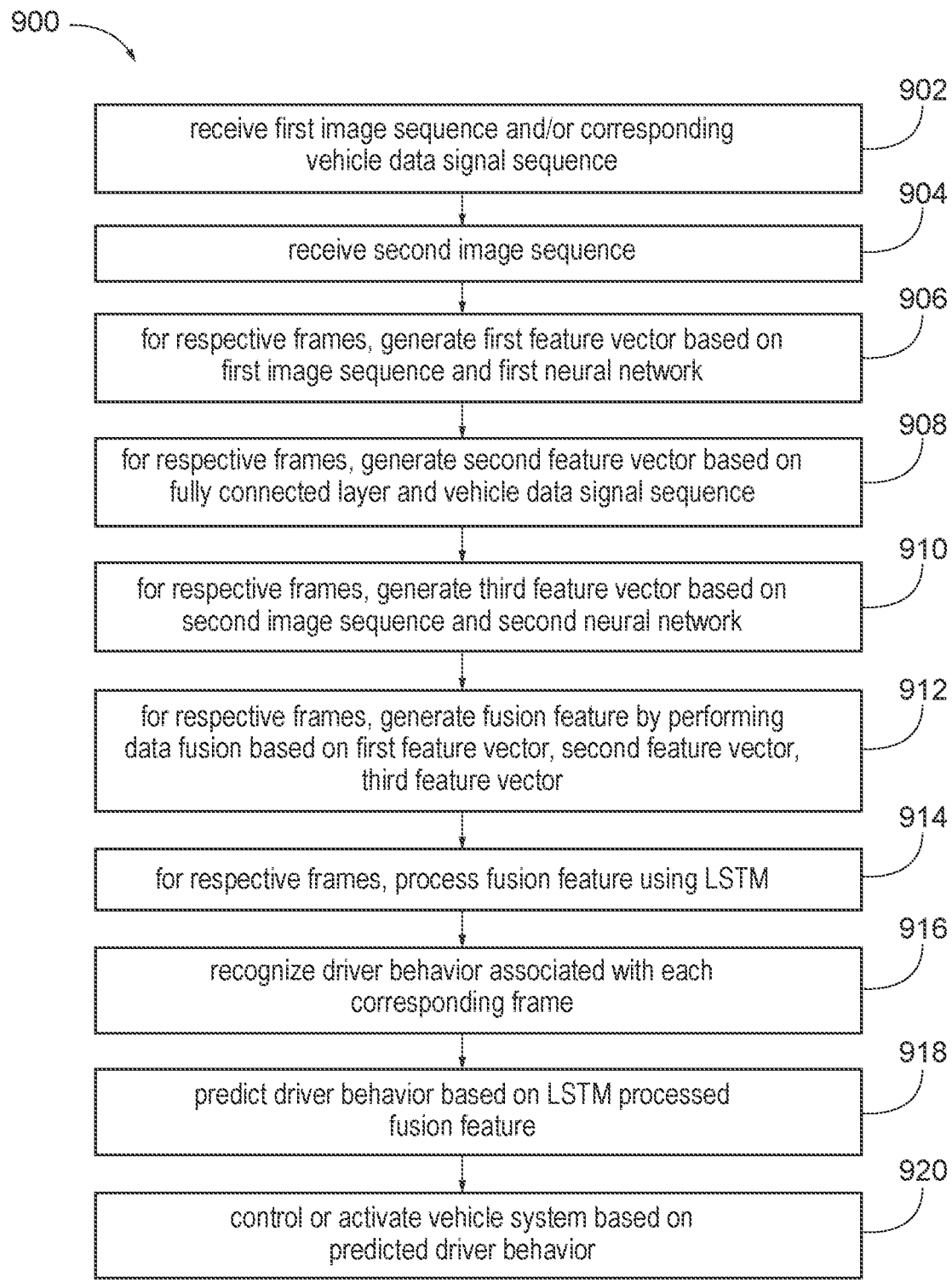
FIG. 9 is an exemplary flow diagram of a method for driver behavior recognition and/or driver behavior prediction, according to one aspect.

FIG. 9 is an exemplary flow diagram of a method 900 for driver behavior recognition and/or driver behavior prediction, according to one aspect. The method 900 for driver behavior recognition and/or driver behavior prediction may include receiving a first image sequence and/or a corresponding vehicle data signal sequence at 902. According to one aspect, the corresponding vehicle data signal sequence is received, while according to another aspect, the corresponding vehicle data signal sequence is not received or utilized. At 904, the method 900 for driver behavior recognition and/or driver behavior prediction may include receiving a second image sequence. The first image sequence may be from a forward-facing image capture device 806 of a vehicle and may include image frames of an operating environment through which the vehicle is travelling. The second image sequence may be received from a rear-facing image capture device 808 within a vehicle and may include image frames of a driver of the vehicle.

The method 900 for driver behavior recognition and/or driver behavior prediction may include performing, for respective frames of respective sequences, generating a first feature vector 906 based on the first image sequence and a first neural network, generating a second feature vector 908 based on a fully connected layer and the vehicle data signal sequence, generating a third feature vector 910 based on the second image sequence and a second neural network, generating a fusion feature 912 by performing data fusion based on the first feature vector, the second feature vector, and the third feature vector. This fusion feature may be processed 914 using an LSTM. At 916, the method 900 for driver behavior recognition and/or driver behavior prediction may include recognizing a driver behavior associated with each corresponding frame. At 918, the method 900 may include predicting a driver behavior based on LSTM processed fusion feature. This may be achieved by processing the fusion feature using the LSTM layer to generate n+x resultant frames of a predicted driver behavior based on n image frames of the first image sequence. In this example, x may be a number of prediction frames. The method 900 for driver behavior recognition and/or driver behavior prediction may include controlling, activating, or operating a vehicle system 920 based on the predicted driver behavior. Examples of controlling, activating, or operating the vehicle system 828 may include activating a lane change vehicle system, providing a notification on a heads-up-display (HUD), or providing an automated or corrective driving or steering action, etc.

FIGS. 10-14 are exemplary three-stream architectures (e.g., receiving a first image sequence 1004 from the forward-facing image capture device 806, a second image sequence 1002 from the rear, driver-facing image capture device 808, and the CAN sequence 1006) which may be implemented according to the system 800 for driver behavior recognition/prediction of FIG. 8. It will be appreciated that, according to some aspects, fusion may be achieved without the data from the CAN sequence 1006, which results in a two-stream architecture (e.g., receiving a first image sequence 1004 from the forward-facing image capture device 806 and a second image sequence 1002 from the rear, driver-facing image capture device 808) rather than the three-stream architecture. As described herein, feeding or processing of image sequences or CAN sequence 1006s through neural networks or processing layers (e.g., convolution layers, fully connected layers, LSTM layers, etc.) may be performed by the processor 102 of the system 800 for driver behavior recognition/prediction of FIG. 8. Further, the early versus late fusion may be denoted by whether the feature vector is generated based on the processing layer is implemented after an image sequence is fed through a neural network.

Figure 10:
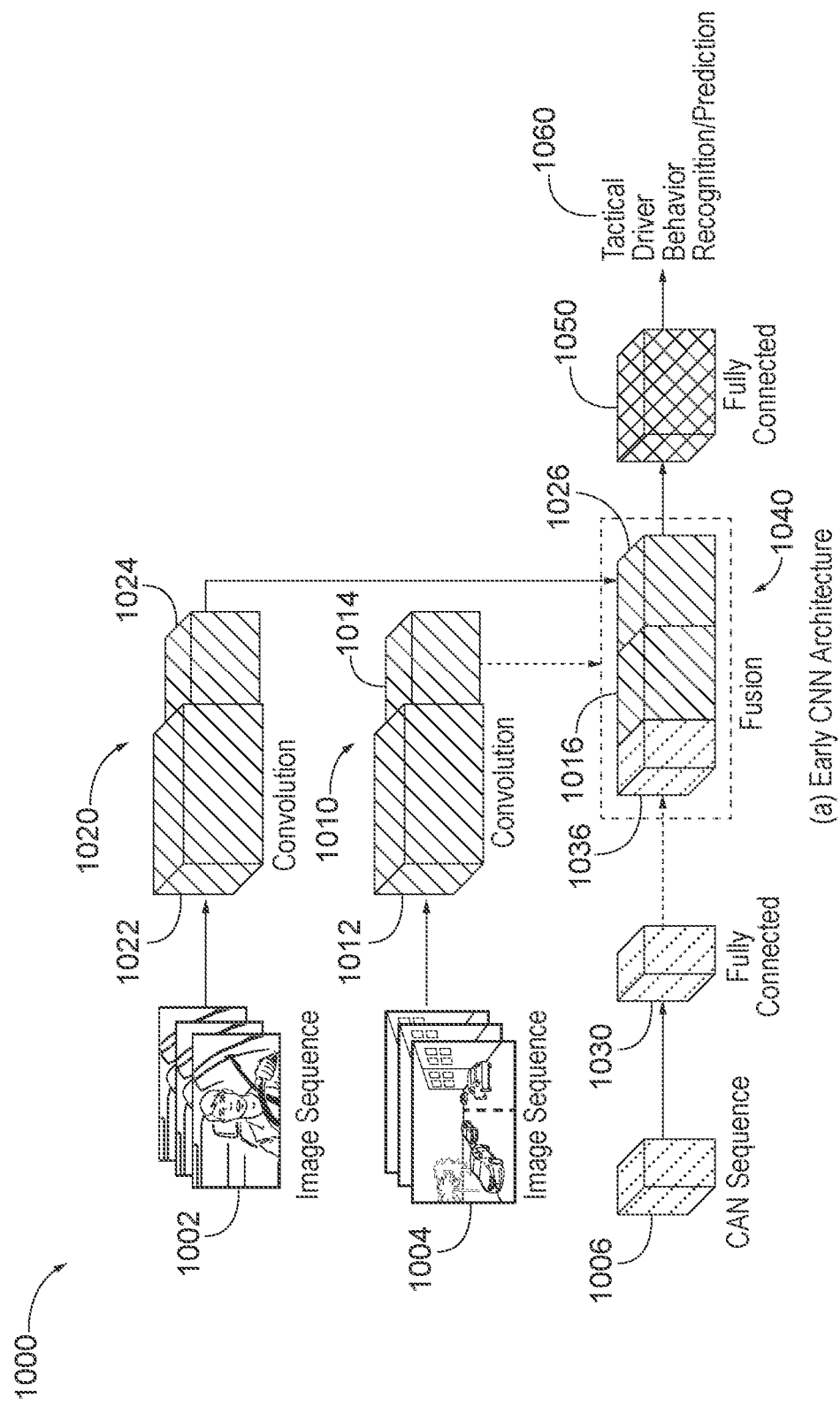
FIG. 10 is an exemplary architecture which may be implemented according to the system for driver behavior recognition/prediction of FIG. 9.

In this regard, FIG. 10 is an exemplary architecture 1000 which may be implemented according to the system 800 for driver behavior recognition/prediction of FIG. 8. In FIG. 10, a first image sequence 1004 may be received by the memory 104 from the first image capture sensor 806. In other words, the first image capture sensor 806 may capture the first image sequence 1004 and pass this first image sequence 1004 on to the memory 104. Similarly, the second image capture sensor 808 may capture a second image sequence 1002 and pass this second image sequence 1002 on to the memory 104. The CAN bus 128 may capture or receive the CAN sequence 1006 from one or more of the vehicle systems 828, such as a brake vehicle system, a steering vehicle system, an acceleration vehicle system, etc.

The first image sequence 1004 may be fed, one frame at a time, through a first CNN 1010, including a first portion 1012 of layers and a second portion 1014 of layers to produce or generate a first feature vector 1016. According to one aspect the first feature vector 1016 may be generated or derived in a manner such that the first feature vector 1016 is an intermediate product of the first CNN. Stated another way, the first CNN may include one or more neural network layers or one or more processing layers (e.g., an input layer, one or more intermediate layers, a convolution filter layer, a fully connected layer, a hidden layer, a feature pyramid network layer, an output layer, etc.) and the first feature vector 1016 may be generated based merely on one or more of the intermediate layers of the first CNN rather than all layers of the first CNN. Explained yet another way, the first feature vector 1016 may be generated based on the first portion 1012, but not based on the second portion 1014, for example. In this way, the first feature vector 1016 may not necessarily be passed through or calculated based on the output layer of the first CNN. Because the first feature vector 1016 is generated in this way, the architecture 1000 of FIG. 10 is considered an early CNN architecture.

The second image sequence 1002 may be fed, one frame at a time, through a second CNN 1020, including a first portion 1022 of layers and a second portion 1024 of layers to produce or generate a second feature vector 1026. As previously discussed, the second image sequence may include operator actions, reactions, operator gaze locations, the operator head pose, facial expressions, etc. The CAN sequence 1006 may be fed, one frame at a time, through a fully connected layer 1030 to produce or generate a third feature vector 1036. The data fuser 116 or concatenator may perform data fusion on two or more of the first feature vector 1016, the second feature vector 1026, and the third feature vector 1036. This may result in a fusion feature vector 1040. The fusion feature vector 1040 may be passed through a fully connected layer 1050, thereby generating a tactical driver behavior recognition/prediction result 1060 for respective frames.

Figure 11:
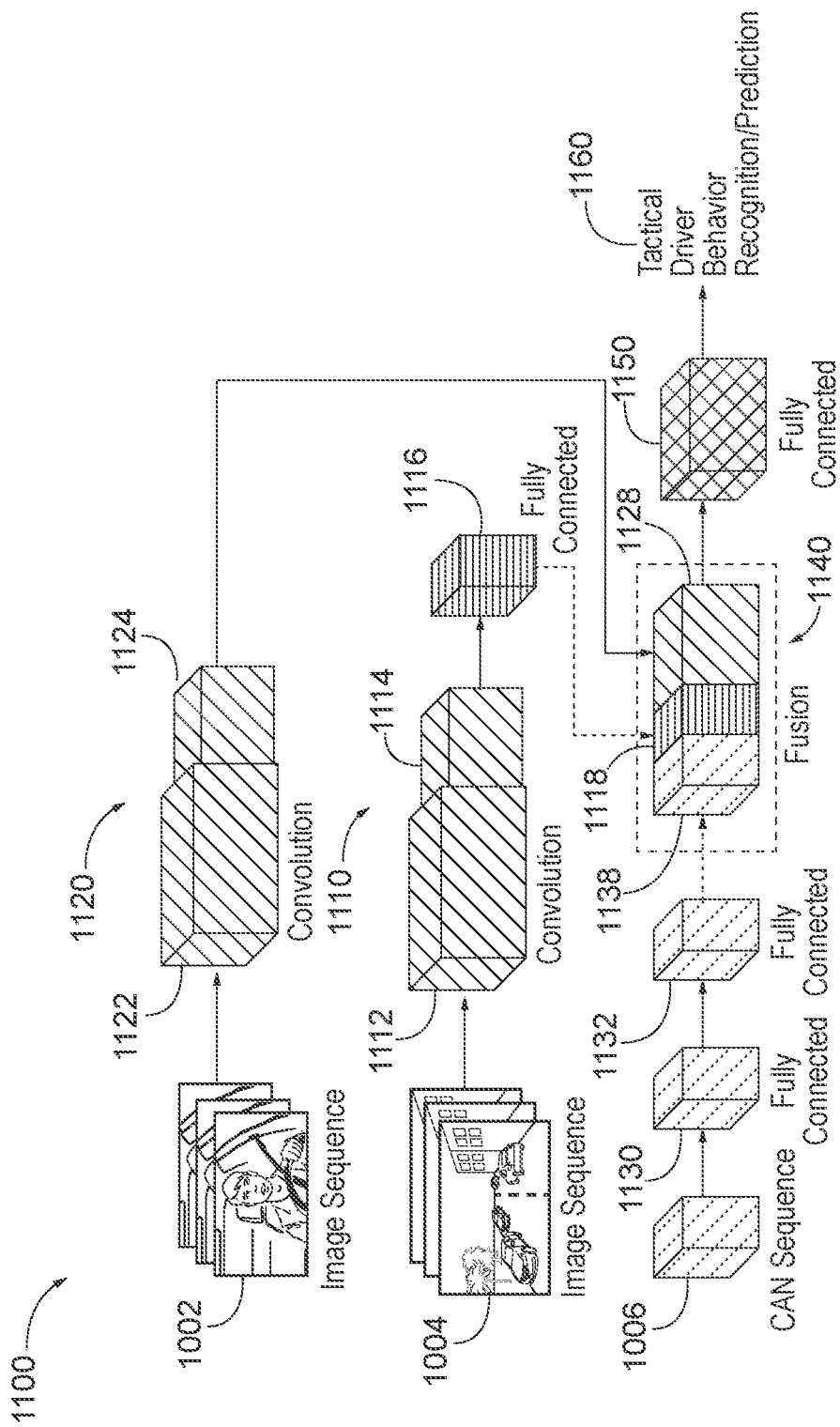
FIG. 11 is an exemplary architecture which may be implemented according to the system for driver behavior recognition/prediction of FIG. 9.

FIG. 11 is an exemplary architecture 1100 which may be implemented according to the system 800 for driver behavior recognition/prediction of FIG. 8. In FIG. 11, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, fully through a first CNN 1110, including a first portion 1112 of layers, a second portion 1114 of layers, and a fully connected layer 1116 to produce or generate a first feature vector 1118. Because the first feature vector 1118 is generated in this way according to this aspect, the architecture 1100 of FIG. 11 is considered a late CNN architecture.

The second image sequence 1002 may be fed, one frame at a time, through a second CNN 1120, including a first portion 1122 of layers and a second portion 1124 of layers to produce or generate a second feature vector 1128. The CAN sequence 1006 may be fed, one frame at a time, through one or more fully connected layers 1130, 1132, etc. to produce or generate a third feature vector 1138. The data fuser 116 or concatenator may perform data fusion on two or more of the first feature vector 1118, the second feature vector 1128, and the third feature vector 1138. This may result in a fusion feature vector 1140. The fusion feature vector 1140 may be passed through a fully connected layer 1150, thereby generating a tactical driver behavior recognition/prediction result 1160 for respective frames.

Figure 12:
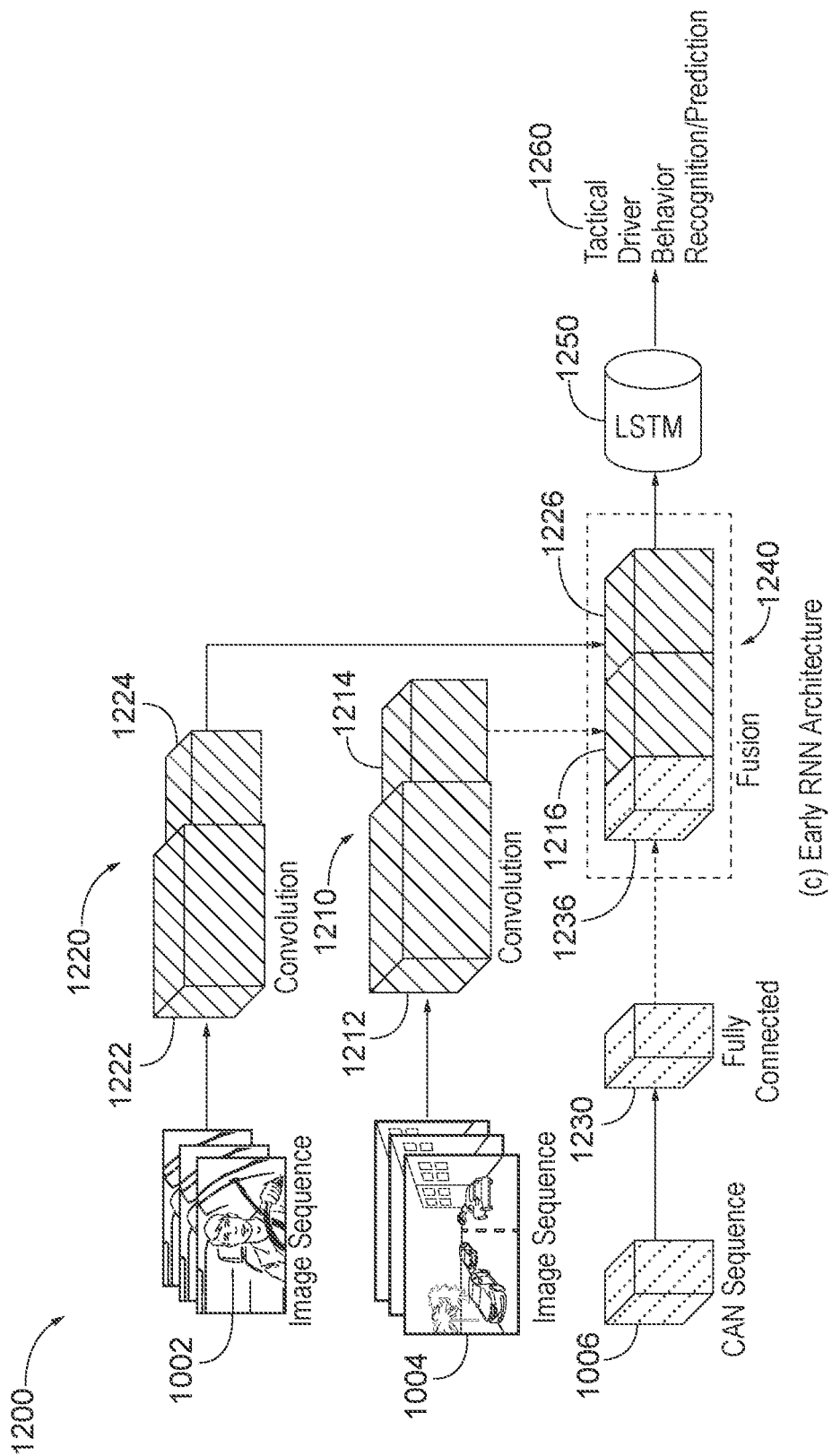
FIG. 12 is an exemplary architecture which may be implemented according to the system for driver behavior recognition/prediction of FIG. 9.

FIG. 12 is an exemplary architecture 1200 which may be implemented according to the system 800 for driver behavior recognition/prediction of FIG. 8. In FIG. 12, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, through a first CNN 1210, including a first portion 1212 of layers and a second portion 1214 of layers to produce or generate a first feature vector 1216. Similarly to FIG. 10, the first feature vector 1216 may be generated in an intermediate fashion (e.g., the first feature vector 1216 may not necessarily be passed through or calculated based on the output layer of the first CNN 1210 or the first feature vector 1216 may be generated based on the first portion 1212, but not based on the second portion 1214 of the first CNN 1210). Because the first feature vector 1216 is generated in this way and utilizes LSTM 1250, the architecture 1200 of FIG. 12 is considered an early RNN architecture.

The second image sequence 1002 may be fed, one frame at a time, through a second CNN 1220, including a first portion 1222 of layers and a second portion 1224 of layers to produce or generate a second feature vector 1226. The CAN sequence 1006 may be fed, one frame at a time, through a fully connected layer 1230 to produce or generate a third feature vector 1236. The data fuser 116 or concatenator may perform data fusion on two or more of the first feature vector 1216, the second feature vector 1226, and the third feature vector 1236. This may result in a fusion feature vector 1240. The fusion feature vector 1240 may be passed through a LSTM 1250 or LSTM layer, thereby generating a tactical driver behavior recognition/prediction result 1260 for respective frames.

Figure 13:
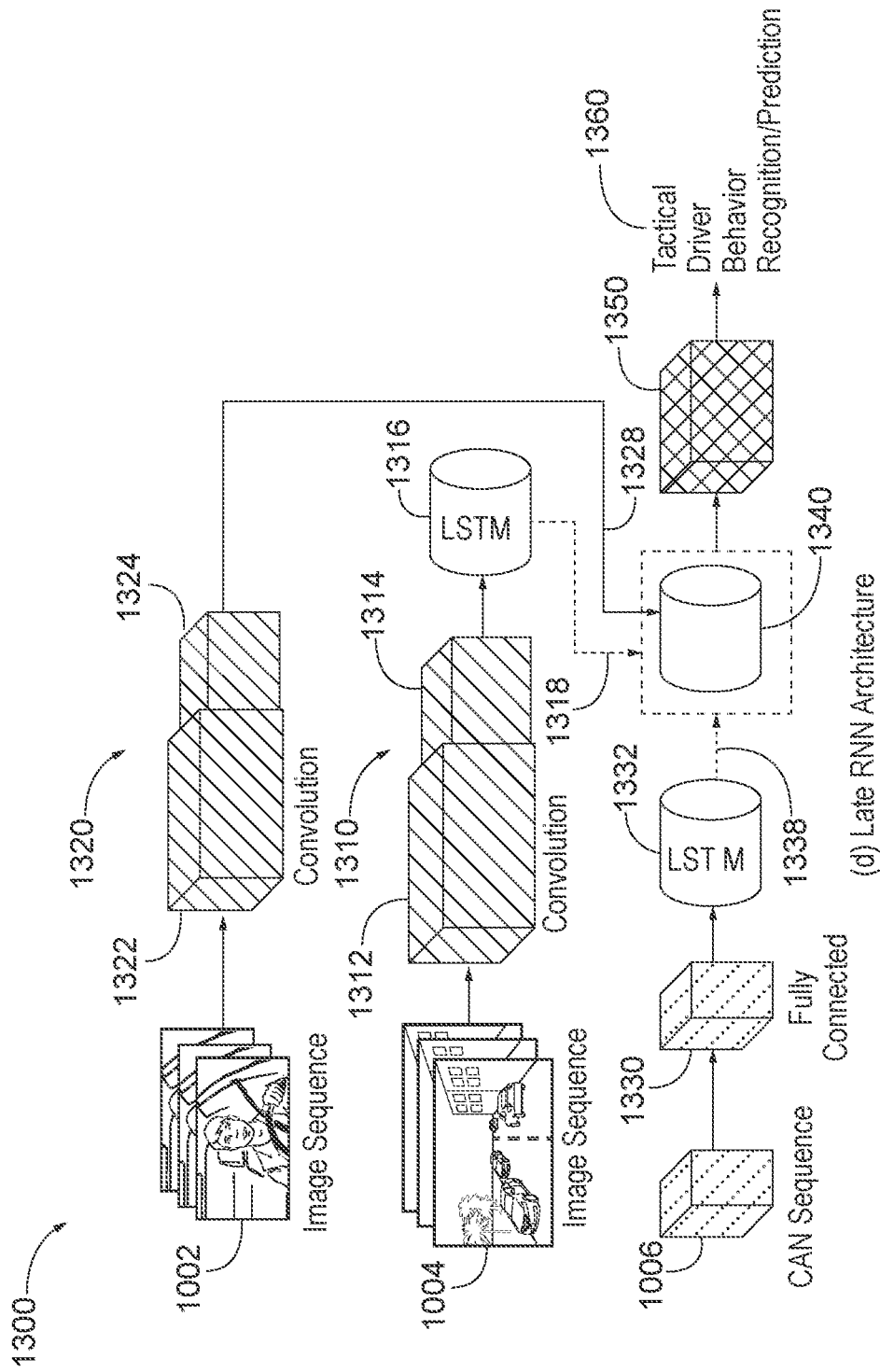
FIG. 13 is an exemplary architecture which may be implemented according to the system for driver behavior recognition/prediction of FIG. 9.

FIG. 13 is an exemplary architecture 1300 which may be implemented according to the system 800 for driver behavior recognition/prediction of FIG. 8. In FIG. 13, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, fully through a first CNN 1310, including a first portion 1312 of layers, a second portion 1314 of layers, and a LSTM layer 1316 to produce or generate a first feature vector 1318. Because the first feature vector 1318 is generated in this way, the architecture 1300 of FIG. 13 is considered a late RNN architecture.

The second image sequence 1002 may be fed, one frame at a time, through a second CNN 1320, including a first portion 1322 of layers and a second portion 1324 of layers to produce or generate a second feature vector 1328. The CAN sequence 1006 may be fed, one frame at a time, through a fully connected layer 1330, a LSTM layer 1332 to produce or generate a third feature vector 1338. The data fuser 116 or concatenator may perform data fusion on two or more of the first feature vector 1318, the second feature vector 1328, and the third feature vector 1338. This may result in a fusion feature vector 1340. The fusion feature vector 1340 may be passed through an additional layer 1350, such as a LSTM layer and/or a fully connected layer, thereby generating a tactical driver behavior recognition/prediction result 1360 for respective frames.

Figure 14:
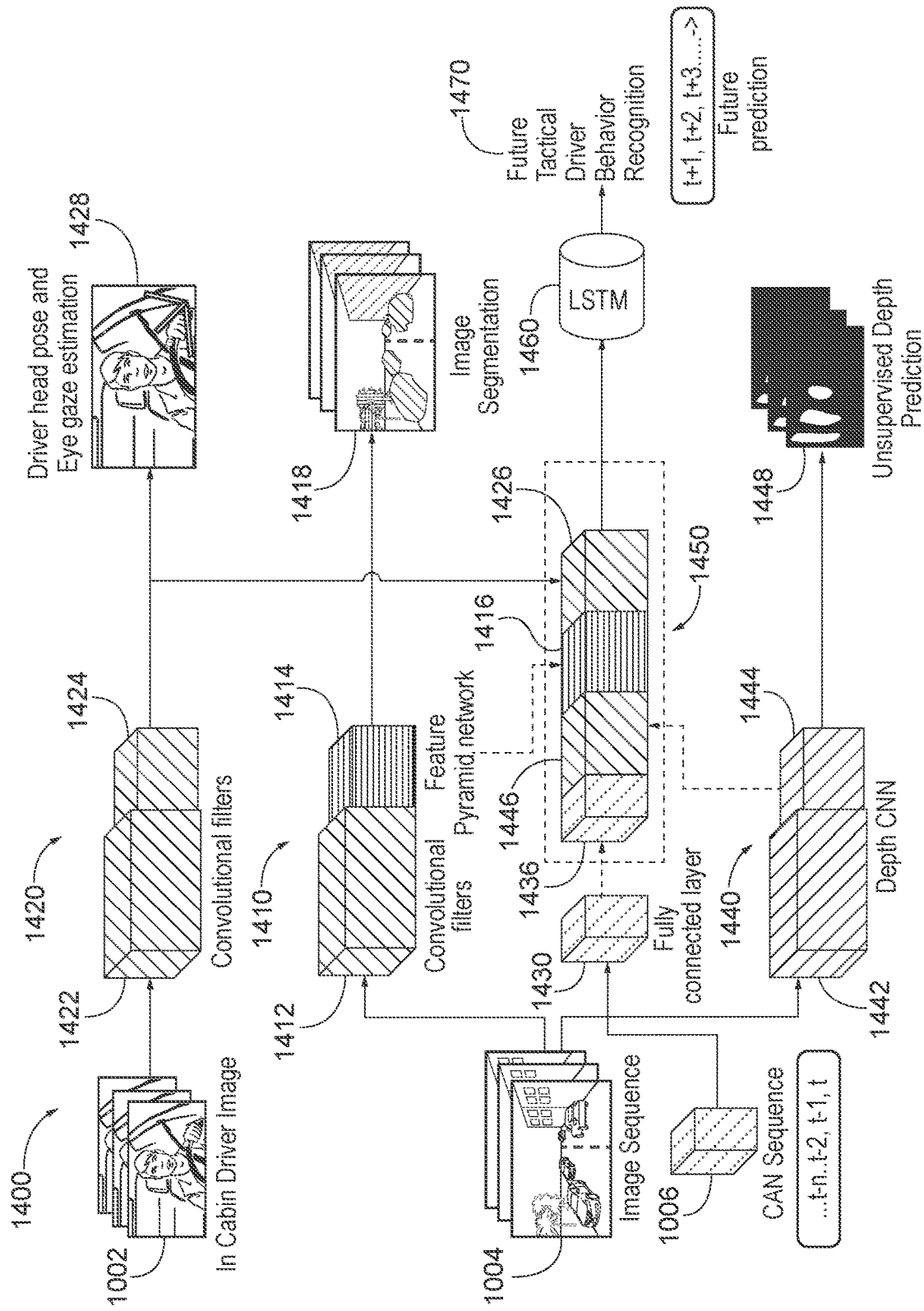
FIG. 14 is an exemplary architecture which may be implemented according to the system for driver behavior recognition/prediction of FIG. 9.

FIG. 14 is an exemplary architecture 1400 which may be implemented according to the system 800 for driver behavior recognition/prediction of FIG. 8. In FIG. 14, the first image capture sensor 806 may capture the first image sequence 1004 and pass this first image sequence 1004 on to the memory 104, the second image capture sensor 808 may capture the second image sequence 1002 and pass this second image sequence 1002 on to the memory 104, and the CAN bus 128 may capture or receive the CAN sequence 1006 from one or more of the vehicle systems 828. The first image sequence 1004 may be fed, one frame at a time, through a first CNN 1410, such as by the convolutor 110, the depth CNN unit 112, or the pose CNN unit 114, including a first portion 1412 of layers and a second portion 1414 of layers to produce or generate a first feature vector 1416 associated with image segmentation 1418. The second image sequence 1002 may be fed, one frame at a time, through a second CNN 1420, including a first portion 1422 of layers and a second portion 1424 of layers to produce or generate a second feature vector 1426 associated with driver pose 1428, such as by the convolutor 110, the depth CNN unit 112, or the pose CNN unit 114. The CAN sequence 1006 may be fed, one frame at a time, through a fully connected layer 1430 to produce or generate a third feature vector 1436. The second image sequence 1002 may be fed, one frame at a time, through a depth CNN 1440, including a first portion 1442 of layers and a second portion 1444 of layers to produce or generate a fourth feature vector 1446 associated with unsupervised depth prediction 1448. The data fuser 116 or concatenator may perform data fusion on two or more of the first feature vector 1416, the second feature vector 1426, the third feature vector 1436, and the fourth feature vector 1446. This may result in a fusion feature vector 1450. The fusion feature vector 1450 may be passed through a LSTM layer 1460, thereby generating a tactical driver behavior recognition/prediction result 1470 for respective frames. Any of the CNNs or neural networks discussed herein may include a pyramid feature network. Further, any of the inputs and/or outputs to any of the CNNs, RNNs, LSTM layers, and/or neural networks may be modified by the addition of one or more processing layers, such as a fully connected layer, a convolutional filter layer, a LSTM layer, etc.

Figure 15:
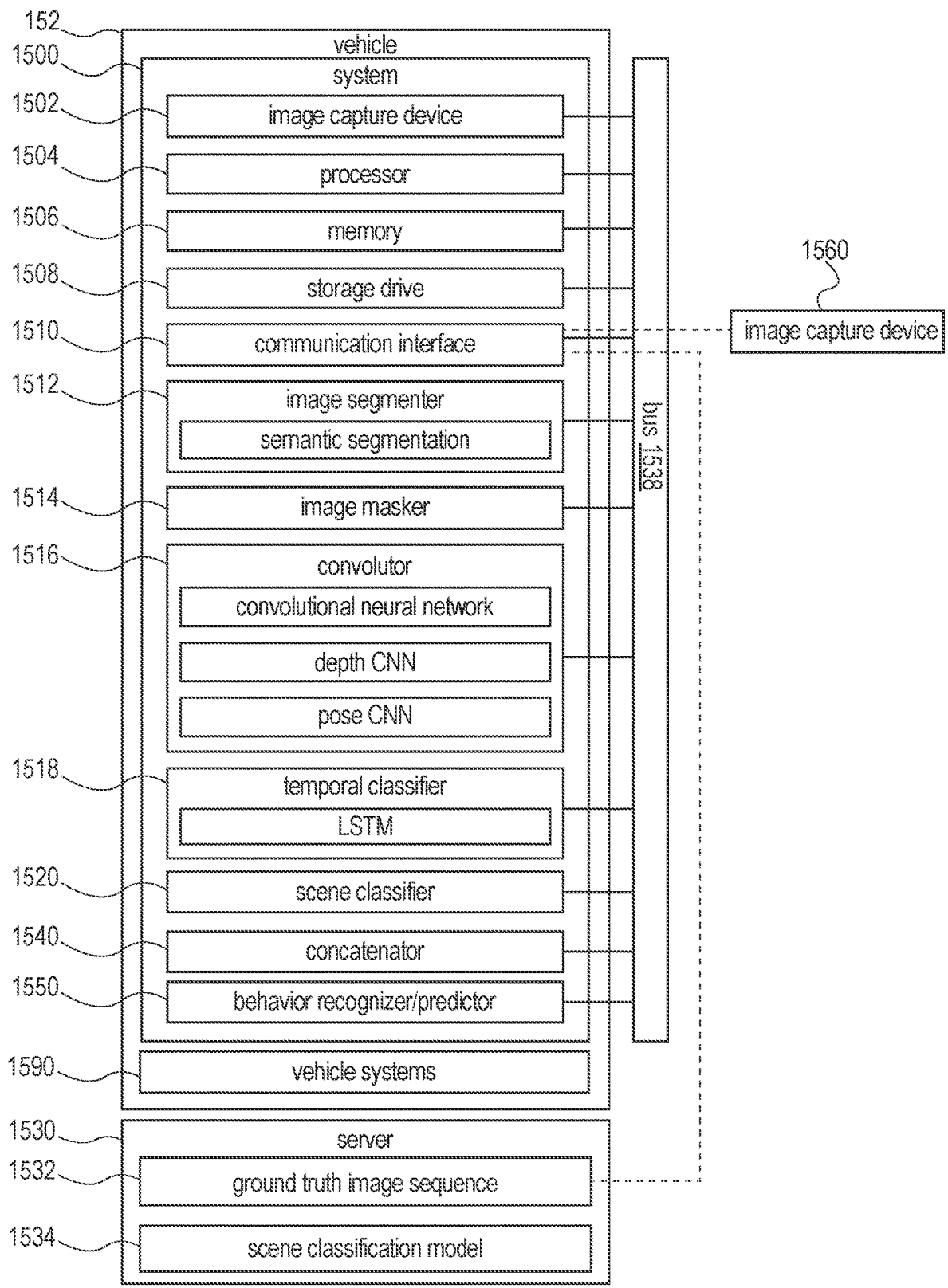
FIG. 15 is a component diagram of a system for scene classification, according to one aspect.

FIG. 15 is a component diagram of a system 1500 for scene classification and/or driver behavior prediction, according to one aspect. A vehicle 152 may be equipped with a system 1500 for scene classification. The system 1500 for scene classification may include an image capture device 1502, a processor 1504, a memory 1506, a storage drive 1508, a communication interface 1510, an image segmentation module 1512, an image masker 1514, a convolutor 1516, a temporal classifier 1518, and a scene classifier 1520. The vehicle 152 may include a controller, one or more vehicle sensors, and one or more vehicle systems 1590. The communication interface 1510 may be in communication with a server 1530. The server 1530 may include a scene classification database which may include a ground truth image sequence 1532 and a scene classification model 1534 or scene classification policy network. According to one aspect, one or more of the image segmentation module 1512, the image masker 1514, the convolutor 1516, the temporal classifier 1518, and/or the scene classifier 1520 may be implemented via the processor 1504, the memory 1506, the storage drive 1508, etc.

According to one aspect, a bus 1538 may communicatively couple one or more of the components of the system 1500 for scene classification. For example, the bus 1538 may be in computer communication with the image capture device 1502, the processor 1504, the memory 1506, the storage drive 1508, the communication interface 1510, the image segmentation module 1512, the image masker 1514, the convolutor 1516, the temporal classifier 1518, the scene classifier 1520, etc. The system 1500 for scene classification, similarly to the system 800 for driver behavior recognition and/or driver behavior prediction, may further include a concatenator 1540 and a behavior recognizer/predictor 1550. Additionally, the communication interface 1510 of the system 1500 for scene classification may receive information or data from an external image capture device 1560 (e.g., a mobile device mounted to vehicle 152 and transmitting captured images or image sequences to the system 1500 for scene classification via the communication interface 1510, etc.).

The system 1500 for scene classification may be implemented, according to one aspect, to include features of the system 800 for driver behavior recognition and/or driver behavior prediction. In other words, the system 1500 for scene classification may perform functions or methods associated or described above with respect to the system 800 for driver behavior recognition and/or driver behavior prediction. Therefore, the image capture device 1502 of the system 1500 for scene classification may be, may include, or otherwise perform features of the image capture sensors 806, 808 of the system 800 for driver behavior recognition and/or driver behavior prediction. Similarly, the processor 1504, the memory 1506, the communication interface 1510 of the system 1500 for scene classification may be, include, or otherwise perform features of the processor 102, the memory 104, the communication interface 126 of the system 800 for driver behavior recognition and/or driver behavior prediction.

The convolutor 1516 of the system 1500 for scene classification may be implemented to be, include, or otherwise perform features of the convolutor 110 of the system 800 for driver behavior recognition and/or driver behavior prediction, as both the convolutor 1516 and the convolutor 110 include CNNs, CNN layers (e.g., fully connected layers, convolutional layers), depth CNNs, pose CNNs, etc. Similarly, the temporal classifier 1518 of the system 1500 for scene classification may be implemented to be, include, or otherwise perform features of the LSTM unit 122 of the system 800 for driver behavior recognition and/or driver behavior prediction, as both the LSTM of the temporal classifier 1518 and the LSTM unit 122 may include LSTM layers or elements. The concatenator 1540 and the behavior recognizer/predictor 1550 of the system 1500 for scene classification may be the data fuser 116 or concatenator and the behavior recognizer/predictor 124 of the system 800 for driver behavior recognition and/or driver behavior prediction. According to one aspect, the scene classifier 1520 may be implemented as a combined unit or module with the behavior recognizer/predictor 1550.

Ground Truth

According to one aspect, the ground truth image sequence 1532 may include a series of one or more image frames which are associated with a moving vehicle and may be collected during a training phase. It will be appreciated that some scenes may be static, while other scenes or places may be dynamic. For example, an intersection may be a static scene or place, while a construction zone may be dynamic in that the construction zone may be defined by traffic cones, which may change size, shape, appearance, and/or location between construction zones and between different days or times.

Each one of the one or more image frames of the ground truth image sequence 1532 may be annotated (e.g., manually annotated and be indicative of the ground truth) with one or more labels, such as a temporal classification label, a weather classification label, a road surface classification label, an environment classification label, and a scene classification label. Examples of temporal classification labels may include background, approaching, entering, passing, etc. In other words, the image frames are annotated temporally with fine grained labels such as Approaching (A), Entering (E), and Passing (P), depending on vantage point and/or the position of the training vehicle relative position to the place of interest or scene. The classification labels may be organized in a hierarchical and in a causal manner. For example, at the top, environment may be annotated, followed by the scene classes at the mid-level, and the fine grained annotations such as approaching, entering, and passing at bottom level.

Examples of weather classification labels may include clear, sunny, snowy, rainy, overcast, cloudy, foggy, light, dark, etc. Examples of road surface classification labels may include dry, wet, snow, obscured (e.g., some traffic markings not visible), mud, etc. Examples of environment classification labels may include environment types, such as urban, country, suburban, ramp, highway, local (e.g., neighborhood, residential, school), etc. Ramps, for example, may be a connector between two highways or between a highway and another road type. Examples of scene classification labels may include road places, a construction zone, an intersection (e.g., an x-way intersection, such as a three-way, four-way, five-way, etc.), a bridge, an overhead bridge, a railroad crossing, a tunnel, lane merge, lane branch, zebra crossing, etc. Some scene classifications may merely be associated with approaching and passing temporal classification labels, while others may be associated with approaching, entering, and passing labels. The road surface classification and the weather classifications may be mutually exclusive from one another. In other words, it may be wet on the road, but the weather may be sunny, for example.

This annotated ground truth image sequence 1532 may be utilized to train a model, which may be stored in the scene classification database as a scene classification model 1534 or a scene classification policy network, for example. Because the ground truth image sequence 1532 is annotated as desired (e.g., this may be performed manually, by humans), the scene classification model 1534 may be trained via machine learning, reinforcement learning, deep learning, or other type of artificial intelligence technique. In this regard, the system 1500 for scene classification may be trained (e.g., via the processor 1504) to mimic results from the ground truth image sequence 1532 by minimizing losses and by backpropagation.

Image Capture

The image capture device 1502 may capture a first series of image frames (e.g., video) of an environment (e.g., operating environment) from the perspective of a moving vehicle. According to one aspect, this first series of image frames or video of the environment may be taken as an input to the system 1500 for scene classification.

Segmentation

The image segmentation module 1512 may identify one or more traffic participants within the environment from the image frames based on a first convolutional neural network (CNN) and the first series of image frames. According to one aspect, the image segmentation module 1512 may implement a deeplab CNN. Regardless of the implementation, the image segmentation module 1512 may provide semantics segmentation as an output when the input of the series of image frames is provided. The image segmentation module 1512 may classify objects within each image frame of the first series of image frames. For example, the image segmentation module 1512 may identify one or more pedestrians, one or more vehicles (e.g., in traffic), one or more motorists, one or more bystanders, one or more bicyclists, one or more moving objects, etc.

Masking

The image masker 1514 may generate a second series of image frames by masking one or more of the traffic participants from the environment. Because traffic participants generally have no bearing on how a scene is defined (e.g., whether the environment is an intersection, a highway, etc.), the image masker 1514 may mask one or more or all of the traffic participants from the environment from the second series of image frames. According to one aspect, the image masker 1514 may utilize semantic segmentation to mask one or more of the traffic participants from the image frame sequence. According to one aspect, the image masker 1514 may also mask other unnecessary objects from the environment, such as birds in the sky, etc. In this way, the image masker 1514 may provide the system 1500 for scene classification with greater spatial hard attention by allowing neural networks of the system 1500 for scene classification focus on the unmasked portions of the image frames, thereby providing greater accuracy during classification. Thus, semantic context may be provided via the image masker 1514 and the image segmentation module 1512.

Temporal Classification

The temporal classifier 1518 may classify one or more image frames of the second series of image frames (e.g., or from the original set of image frames captured by the image capture device 1502) with one of two or more temporal predictions and generate a third series of image frames associated with respective temporal predictions based on a scene classification model 1534. Examples of temporal predictions may include, background, approaching, entering, passing of a scene or a place, etc. The temporal classifier 1518 may learn that approaching is generally followed by entering, and then by passing.

According to one aspect, the temporal classifier 1518 may perform classification based on a second CNN, a long short-term memory (LSTM) network, and a first fully connected layer on an input set of image frames, which may be the original input image frames (RGB), image frames concatenated with semantic segmentation (RGBS), image frames with traffic participants masked using semantic segmentation (RGB-masked), or merely using a one channel semantic segmentation image (S). In this way, the temporal classifier 1518 may be utilized to determine where within a scene, the vehicle 152 is located (e.g., on a frame by frame basis). According to one aspect, the second CNN may be implemented as ResNet 50, for example. The temporal classifier 1518 may determine and assign one or more of the temporal predictions to one or more corresponding image frames of the first series of image frames or one or more corresponding image frames of the second series of image frames prior to any determination by the scene classifier 1520 regarding the type of scene or place.

The temporal classifier 1518, when performing classification based on any CNN, may implement the convolutor 1516, and pass an input through one or more of the CNNs of the convolutor, such as a CNN, a depth CNN, a pose CNN, etc. to generate an output.

In other words, the temporal classifier 1518 may determine the beginning, middle, and/or end of a scene before determining what type of scene the scene actually is or prior to determining the associated scene prediction for the scene. Stated yet another way, the temporal classifier 1518 may enable the system 1500 for scene classification to distinguish between different stages of an event, such as when the vehicle 152 passes through an intersection or a construction zone. Specifically, the temporal classifier 1518 may label, assign, or annotate one or more image frames of one or more of the series of images with a temporal prediction from a set of temporal predictions. As previously discussed, examples of these temporal predictions may include background, approaching, entering, or passing of a scene or a place. In this way, fine grain or fine-tuned temporal classification may be provided by the temporal classifier 1518 (e.g., to localize the vehicle 152 within a specific, unknown scene or place). It will be appreciated that other temporal predictions may be utilized according to other aspects. For example, the temporal prediction may be numerical and be indicative of progress through a scene (e.g., which may yet to be defined by the scene classifier 1520). Regardless, the ground truth image sequence 1532 may be utilized to train a classifier, such as the temporal classifier 1518, to detect when the vehicle 152 is approaching, entering, or passing a scene, regardless of whether the type of scene is known.

Weather Classification

The scene classifier 1520 may utilize the scene classification model 1534, which may be trained on a CNN of the convolutor 1516, such as ResNet 50 or a deepnet CNN, to determine the weather classification for the vehicle 152. Similarly to scene classification, weather, road surface, and environment, may be classified using an input where the traffic participants are masked (e.g., using the image masker 1514 generated series of image frames which mask one or more of the traffic participants from the environment). However, other inputs may be provided, such as the original input image frames (RGB), image frames concatenated with semantic segmentation (RGBS), image frames with traffic participants masked using semantic segmentation (RGB-masked), or merely using a one channel semantic segmentation image (S). The scene classification model 1534 may be trained based on the annotated ground truth image sequence 1532. Examples of weather classification labels may include lighting conditions, visibility conditions, such as clear, sunny, snowy, rainy, overcast, cloudy, foggy, light, dark, etc.

Road Surface Classification

The scene classifier 1520 may utilize the scene classification model 1534, which may have been trained on a CNN, such as ResNet 50, to determine the road surface classification for the vehicle 152. The scene classification model 1534 may be trained based on the ground truth image sequence 1532, which may be annotated with one or more labels for each of the associated image frames, as described above. Examples of road surface classification labels may include dry, wet, snow, obscured (e.g., some traffic markings not visible), mud, etc.

Environment Classification

The scene classifier 1520 may operate similarly to the other types of classifications. Examples of environment classification labels may include environment types, such as urban, country, suburban, ramp, highway, local (e.g., neighborhood, residential, school), etc.

Scene or Place Classification

The scene classifier 1520 may classify one or more image frames of the third series of image frames based on a third CNN, global average pooling, and a second fully connected layer and generate an associated scene prediction based on the scene classification model 1534 and respective temporal predictions. The scene classifier 1520 may generate a fourth series of image frames associated with respective temporal predictions based on the scene classification model 1534 and respective temporal predictions. In this way, the temporal classifier 1518 may be utilized to trim image frames from the video or from the image sequences to enable efficient scene classification to occur. Stated another way, the scene classifier 1520 may merely consider image frames marked as approaching, entering, and passing of a given environment place, while ignoring image frames annotated as background, and thus provide dynamic classification of road scenes, for example. In this way, this two-stage architecture mitigates the unnecessary use of processing power, by excluding background image frames from being examined and/or scene classified. Thus, the temporal classifier 1518 acts as a coarse separator for the scene classifier 1520, mitigating the amount of processing power and resources utilized to classify scenes, and sending merely the candidate frames of approaching, entering, or passing to the scene classifier 1520 as an event window to the prediction network.

The scene classifier 1520, similarly to the temporal classifier 1518, when performing classification based on any CNN, may implement the convolutor 1516, and pass an input through one or more of the CNNs of the convolutor, such as a CNN, a depth CNN, a pose CNN, ResNet 50 CNN, etc. to generate an output.

According to one aspect, the third CNN may be implemented as ResNet 50, for example. Therefore, the scene classifier 1520 may utilize one or more of the temporal predictions from one or more of the corresponding image frames to facilitate determination of what type of scene or place is associated with the approaching, entering, and passing of a scene. For example, the temporal classifier 1518 may have classified one or more image frames of the series of image frames with temporal predictions. Using these temporal predictions, the scene classifier 1520 may determine that a set of image frames associated with approaching, entering, and passing of a scene from the series of image frames is a construction zone, for example. Thus, the temporal classifier 1518 may determine that the vehicle 152 is travelling through a beginning, middle, and end of an unknown type of scene, and the scene classifier 1520 may determine what type of scene the scene is after the temporal classifier 1518 has made or determined its temporal predictions of the image frames.

Examples of scene or place classifications may include road places, such as a construction zone, an intersection (e.g., an x-way intersection, such as a two-way, three-way, four-way, five-way, etc.), a bridge, an overhead bridge, a railroad crossing, a tunnel, lane merge, lane branch, zebra crossing, etc. In this way, the scene prediction may a scene classification indicative of a type of location where the vehicle 152 is approaching, entering, or passing, for example.

According to one aspect, the scene classifier 1520 may generate the scene prediction based on the input of first series of image frames, in real time, and such that a complete series of image frames temporally annotated from background, approaching, entering, passing is not necessarily required to generate the scene prediction. In other words, merely a partial series of image frames may be assigned temporal predictions (e.g., background, approaching, . . . , etc.) prior to the scene classifier 1520 generating the associated scene prediction based on the CNN, the global average pooling, and respective temporal predictions. Thus, development of machine learning that utilizes the semantic context and temporal nature of the ground truth dataset may improve classification results for the system 1500 for scene classification.

For example, the image capture device 1502 may be a forward-facing image capture device capturing a first series of image frames of an environment from a moving vehicle (e.g., vehicle 152). Here, the forward-facing image capture device may be aligned with a direction (e.g., forward direction) of travel of the moving vehicle. As previously discussed, the image segmentation module 1512 may identify one or more traffic participants within the environment based on the first CNN. The image masker 1514 may generate a second series of image frames by masking one or more of the traffic participants from the environment. The temporal classifier 1518 may classify one or more image frames of the second series of image frames with one or more temporal predictions. In this example, one or more of the temporal predictions may be of the approaching annotation type because the system 1500 for scene classification may generate the scene prediction in real time, based on the input of first series of image frames. Therefore, the vehicle 152 may still be physically within an approaching zone of an environment feature (e.g., as will be described with respect to 1712 of FIG. 17 below).

According to one aspect, the system 1500 for scene classification may be a system for scene classification and prediction. According to this aspect, the system may be implemented in a manner similar to the system 1500 for scene classification except that one or more feature vectors (e.g., a first feature vector, a second feature vector, a third feature vector, etc.) may be generated (e.g., via the convolutor 1516 or the temporal classifier 1518) and fused or concatenated by the concatenator 1540. The scene classifier 1520 may classify image frames accordingly and generate an associated scene prediction based on the fusion element produced by the data fusion of the feature vectors.

For example, the image capture device 1502 may be a forward-facing image capture device capturing a first series of image frames of an environment from the moving vehicle. The forward-facing image capture device may be aligned with the forward direction of travel of the moving vehicle. The image segmentation module 1512 may identify one or more traffic participants within the environment based on the first CNN and the image masker 1514 may mask these traffic participants accordingly. In other words, the image masker 1514 may generate the second series of image frames by masking one or more of the traffic participants from the environment. The convolutor 1516 or the temporal classifier 1518 may generate a first feature vector based on the first series of image frames or the second series of image frames.

The temporal classifier may classify one or more image frames of the first or second series of image frames with one or more temporal predictions (e.g., approaching, entering, and passing) and generate the third series of image frames associated with respective temporal predictions based on the previously discussed scene classification model. According to another aspect, the convolutor 1516 or the temporal classifier 1518 may generate the first feature vector based on the third series of image frames. The classification and the generation of any of the feature vectors may be calculated or determined based on any number of CNNs or LSTM networks from the convolutor 1516 or the temporal classifier 1518. In any event, the scene classifier 1520 may classify one or more image frames of the third series of image frames based on global average pooling, among other things, as discussed above. However, the scene classifier 1520 may classify one or more image frames of the third series of image frames or generate the associated scene prediction based on a fusion feature obtained by performing data fusion on the first feature vector and the second feature vector. The data fusion may be performed by the concatenator 1540. In this way, fusion of two or more feature vectors may be utilized to enhance prediction of scene classification.

Behavior Prediction Using Scene Classification

According to one aspect, fusion of two or more feature vectors may be utilized to obtain a driver behavior prediction result or a predicted driver behavior. For example, the image capture device 1502 may include a forward-facing image capture device and a rear-facing image capture device. The forward-facing image capture device may capture the first series of image frames of the environment from the moving vehicle. The forward-facing image capture device may be aligned with a direction of travel of the moving vehicle. The rear-facing image capture device may capture a second series of image frames of an interior of the moving vehicle (e.g., facial expressions associated with the driver, placement of the driver's hands on the steering wheel, eye movement, eye position, time of gaze, etc.). The rear-facing image capture device may face an opposite direction of the forward-facing image capture device.

Similarly to the system 1500 for scene classification, the system for scene classification and prediction may include the image segmentation module 1512 identifying one or more traffic participants within the environment based on the first CNN, the image masker 1514 generating the third series of image frames by masking one or more of the traffic participants from the environment based on the first series of image frames, and the temporal classifier 1518 classifying one or more image frames of the third series of image frames with one or more temporal predictions. The temporal classifier 1518 may generate a fourth series of image frames associated with respective temporal predictions based on the scene classification model.

Because there are two video streams (i.e., the front-facing and the rear-facing), feature vectors may be generated for each video stream. Additionally, a feature vector may be generated for the processed series of image frames. In other words, the convolutor 1516 may generate a first feature vector based on the first series of image frames, a second feature vector based on the second series of image frames, and a third feature vector based on the fourth series of image frames. For example, the temporal classifier 1518 may generate a fourth series of image frames associated with respective temporal predictions based on the scene classification model based on the second CNN, the LSTM network, and the first fully connected layer. The scene classifier 1520 may classify one or more image frames of the fourth series of image frames based on the third CNN, global average pooling, and the second fully connected layer. The scene classifier 1520 may generate an associated scene prediction based on the scene classification model and respective temporal predictions.

The concatenator 1540 may generate a fusion feature by performing data fusion based on the first feature vector, the second feature vector, the third feature vector, etc. In other words, the concatenator 1540 may perform data fusion using any number of the feature vectors generated. The behavior predictor 1550 may generate a predicted driver behavior based on the generated fusion feature.

Vehicle Application

The controller may activate or deactivate one or more sensors or one or more vehicle systems 1590 of the vehicle 152 based on the scene prediction and/or one or more of the classifications, such as the weather classification, the road surface classification, the environment classification, etc. For example, because scene context features may serve as a prior for other down-stream tasks such as recognition of objects, behavior, action, intention, navigation, localization, etc., the controller of the vehicle 152 may react based on the scene prediction determined by the scene classifier 1520, as well as the other classifications, including the weather classification, the road surface classification, and the environment classification.

For example, if the scene classifier 1520 determines the scene prediction to be a crosswalk, the controller of the vehicle 152 may activate additional sensors to detect pedestrians. At other times, such as when the vehicle 152 is on the highway, the pedestrian sensors may be prioritized lower. As another example, if the scene classifier 1520 determines the scene prediction to be an intersection, the controller of the vehicle 152 may activate additional sensors or run specific modules to detect traffic lights, stop signs, stop lines, or other intersection related information. In other words, the controller may reprioritize or highly prioritize searching for traffic lights, stop signs, and stop lines based on the scene prediction being an intersection. Conversely, the controller may deactivate a LIDAR system or a radar system based on the scene prediction being a tunnel.

According to one aspect, the scene classifier 1520 determines the scene prediction to be a construction zone, the controller of the vehicle (e.g., implemented via the processor 1504) may warn or provide notifications and/or disable autonomous driving based on the scene prediction being the construction zone because autonomous vehicles may utilize pre-built, high definition maps of a roadway. If the scene classifier 1520 determines that it is foggy or rainy out, the processor 1504 may disable the LIDAR from one or more of the vehicle systems 1590 to mitigate ghosting effects. When the scene classifier 1520 determines that the vehicle scene prediction is in a tunnel, or that there is an overhead bridge, GPS of the vehicle systems 1590 may be deprioritized because GPS may lose tracking from the tunnel or the overhead bridge. Further, cameras of the vehicle system 1590 may be prepped for extreme exposure when exiting the tunnel or overhead bridge area. Similarly, a lane departure warning system of the vehicle system 1590 may be implemented with wider tolerances or disabled when the scene classifier 1520 determines the scene prediction to be a branch area or near an exit ramp, for example. Therefore, the scene classifier 1520 may be utilized to enhance the use of one or more of the vehicle systems 1590, such as by activating, deactivating, prioritizing, deprioritizing, etc. one or more of the respective vehicle systems 1590. In this way, the scene classifier 1520 may provide contextual cues for other vehicle systems 1590 of the vehicle 152 to operate efficiently.

Figure 16:
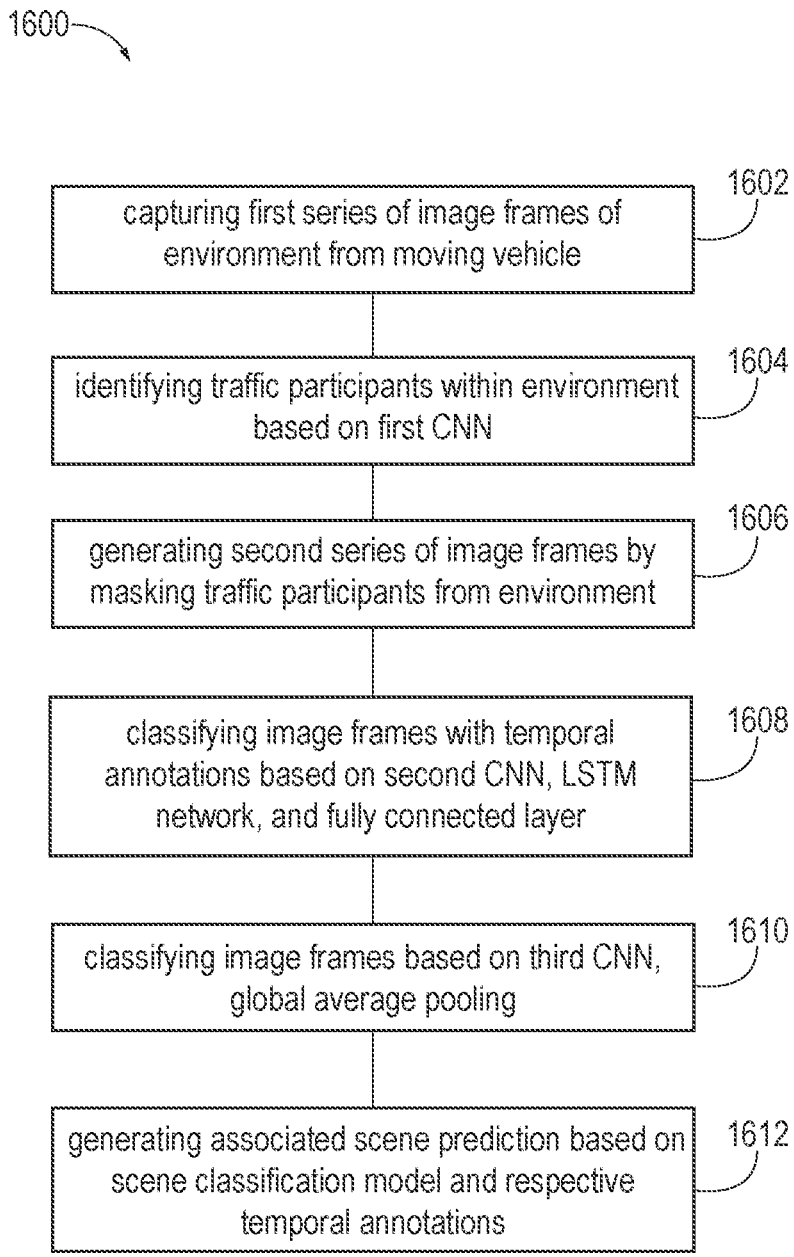
FIG. 16 is a flow diagram of a method for scene classification, according to one aspect.

FIG. 16 is a flow diagram of a method 1600 for scene classification, according to one aspect. The method 1600 for scene classification may include capturing 1602 a first series of image frames of an environment from a moving vehicle, identifying 1604 traffic participants within the environment based on a first CNN, generating 1606 a second series of image frames by masking traffic participants from the environment, classifying 1608 image frames of the second series of image frames with temporal predictions based on a second CNN, a long short-term memory (LSTM) network, and a first fully connected layer, classifying 1610 image frames based on a third CNN, global average pooling, and a second fully connected layer, and generating 1612 an associated scene prediction based on the scene classification model 134 and respective temporal predictions.

Figure 17:
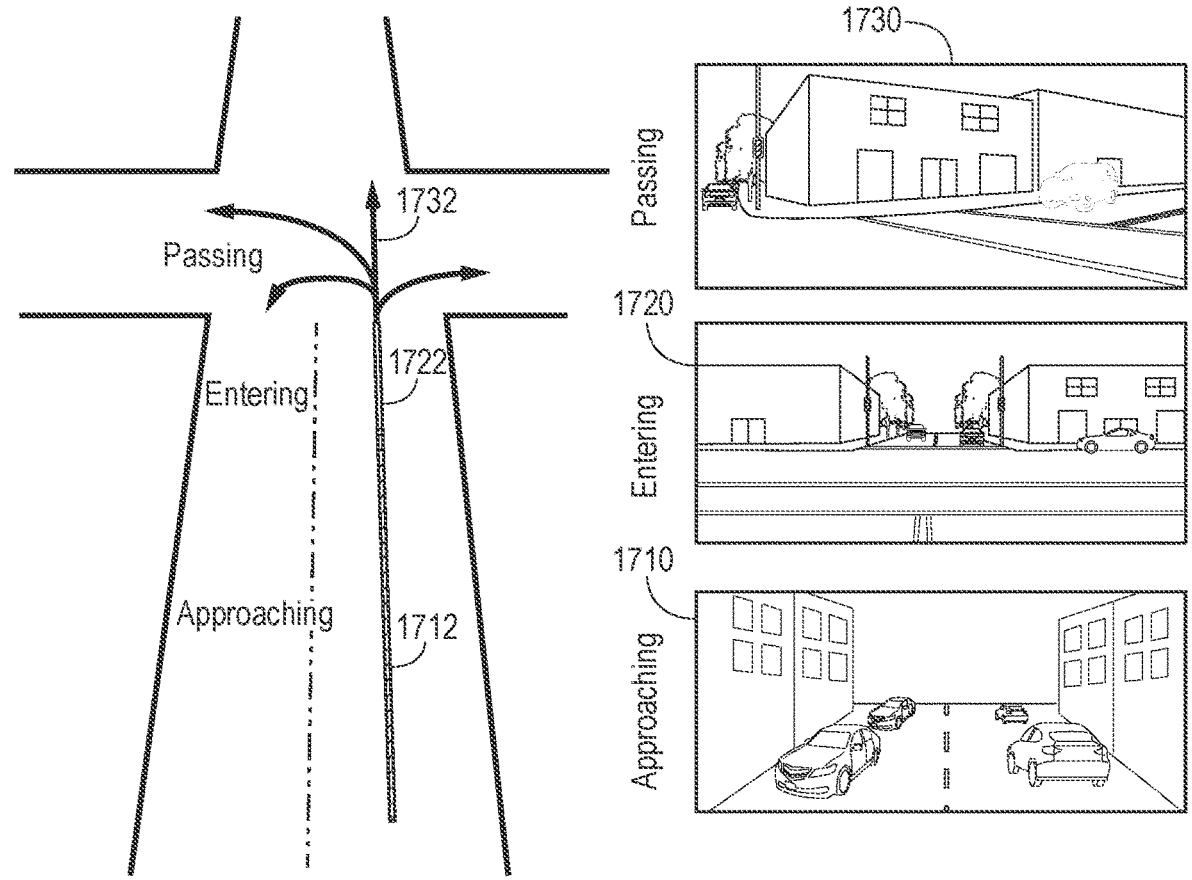
FIG. 17 is an exemplary diagram of temporal predictions or predictions associated with a scene classification, according to one aspect.

FIG. 17 is an exemplary diagram of temporal predictions associated with a scene classification, according to one aspect. In FIG. 17, different image frames captured by the image capture device 1502 may be labelled in association with the ground truth image sequence 1532. For example, a first image frame 1710 may be labelled as an approaching image frame, a second image frame 1720 may be labelled as an entering image frame, and a third image frame 1730 may be labelled as a passing image frame. This approaching, entering, and passing may correspond with the vehicle 152 approaching 1712, entering 1722, and passing 1732 an intersection, as seen in FIG. 17.

While FIG. 17 depicts the approaching, entering, and passing for the intersection scene type, other types of scenes may be annotated in a similar fashion (e.g., including temporal predictions of approaching, entering, and passing and also including other annotations, such as scene type annotations including an intersection, a bridge, a tunnel, etc.). It will be appreciated that the ground truth image sequence 1532 and the captured series of image frames from the image capture device 1502 may be from the perspective of a moving vehicle, and thus, the image frames may not from the perspective of a static or stationary camera. In other words, the ground truth image sequence 1532 and the captured series of image frames may include space-time variations in viewpoint and/or scene appearance. As seen in FIG. 17, view variations may be caused by the changing distance to the intersection as the vehicle 152 approaches the scene of interest (i.e. the intersection at the passing 1732).

Figure 18A:
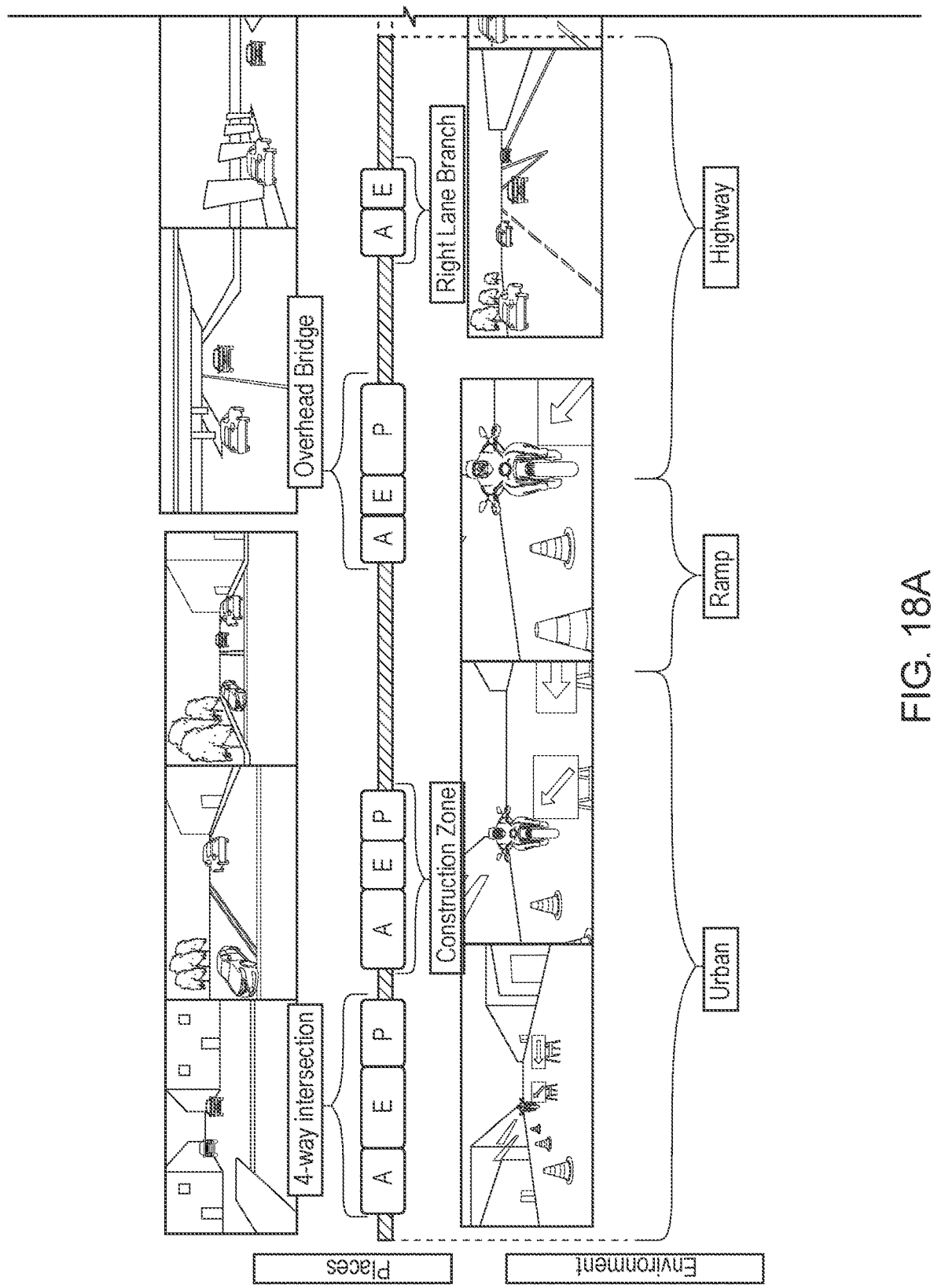
FIGS. 18A-18B are exemplary diagrams of temporal predictions or predictions associated with various scene classifications, according to one aspect.
Figure 18B:
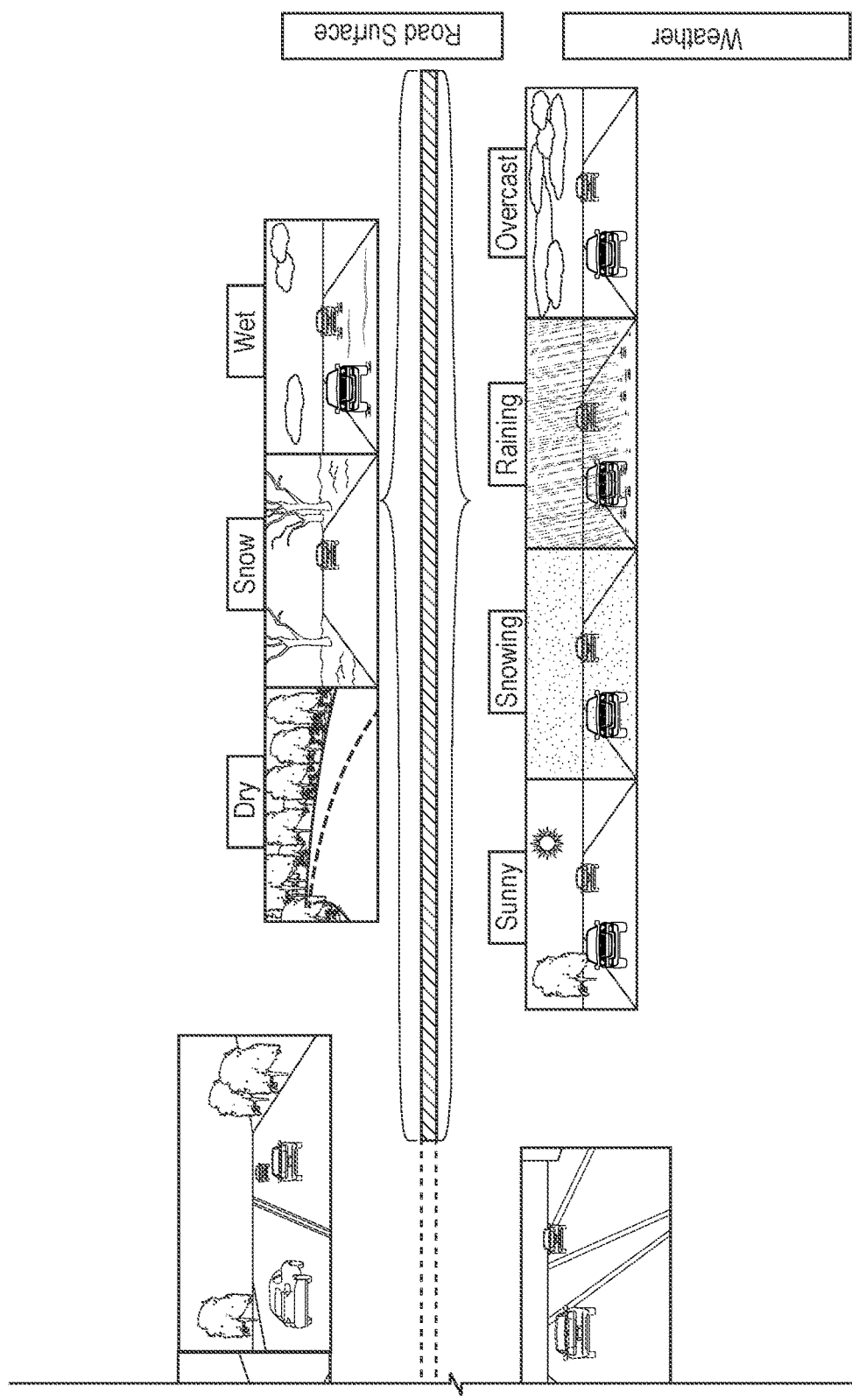

FIGS. 18A-18B are exemplary diagrams of temporal predictions associated with various scene classifications, according to one aspect. In FIGS. 18A-18B, different examples of a variety of annotations are provided. According to one aspect, one or more CNNs or other networks may be implemented to make parameters fed through the architecture of FIGS. 18A-18B tractable.

Figure 19:
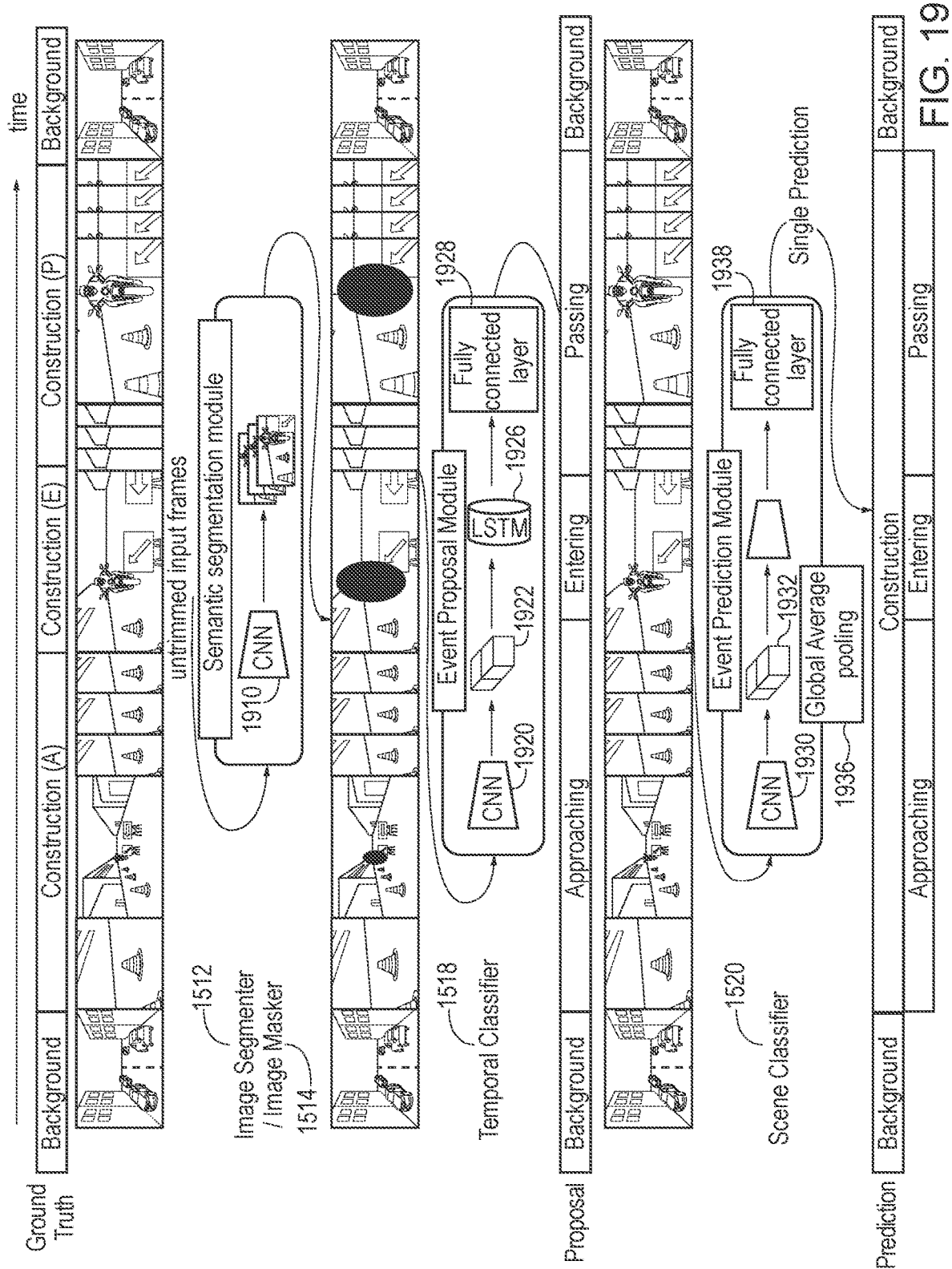
FIG. 19 is an exemplary diagram of an architecture associated with training the system for scene classification of FIG. 15.

FIG. 19 is an exemplary diagram of an architecture associated with training the system 1500 for scene classification of FIG. 15. The ground truth image sequence 1532 may be annotated to include the scene classifications label of 'construction' and each one of the image frames of the input series of image frames of the construction environment may be annotated with temporal predictions indicative of where the moving vehicle is within the construction zone. In other words, the temporal predictions of the ground truth image sequence 1532 may be marked as approaching, entering, or passing, for example.

The image capture device 1502 may capture an input series of image frames. The image segmentation module 1512 may segment or identify one or more traffic participants using semantic segmentation, such as via a CNN 1910 (e.g., a deeplab CNN). The image masker 1514 may mask one or more of the traffic participants from the image frames, thereby enabling the system 1500 for scene classification to focus merely on the surrounding environment and provide more accurate scene classification accordingly.

As seen in FIG. 19, the temporal classifier 1518 may be utilized to trim untrimmed video and aggregate the features to classify the entire trimmed segment. For example, it may be beneficial to analyze or determine a class as a 4-way intersection by looking at or examining a segment (e.g., approaching, entering, and passing) in its entirety rather than on a per frame basis. Here, the temporal classifier 1518 may be fed the series of image frames which have the traffic participants masked (e.g., the RGB-masked image frames). According to other aspects or architectures, the temporal classifier 1518 may receive other series of image frames, such as the RGB, RGBS, or S image frames. In any event, the temporal classifier 1518 may receive the input set of image frames and feed this through a CNN 1920, such as the ResNet 50 CNN, extract a set of features 1922, feed this set of features through an LSTM 1926 and a fully connected layer 1928, thereby producing a series of image frames, each annotated with temporal predictions.

The series of image frames annotated with temporal predictions may be fed to the scene classifier 1520, which may include one or more CNNs 1930, such as the ResNet 50 CNN, extract a set of features 1932, perform global average pooling 1936, and feed the results through a fully connected layer 1938 to generate a scene prediction for the scene (e.g., which may be unknown up to this point) including image frames annotated as approaching, entering, and passing. This model may be trained based on the ground truth image sequence 1532. In other words, the temporal classifier 1518 and the scene classifier 1520 may be trained using machine learning or deep learning to replicate or mimic the annotations of the ground truth image sequence 1532, such as when a similar unannotated series of image frames is provided to the system 1500 for scene classification, thereby building a scene classification model 1534 or scene classification policy network stored within the scene classification database on the server 1530.

The scene classifier 1520 may aggregate frames within this window through global average pooling and produce a singular class label for the entire event, place, or scene. According to one aspect, one or more of the CNNs described herein may be pre-trained on the ground truth image sequence 1532 or another database from the scene classification database. Data augmentation may be performed to reduce over-fitting. Random flips, random resize, and random crop may be employed. As indicated, the processor 1504 or the controller of the vehicle 152 may make adjustments for one or more vehicle systems 1590 based on the generated scene prediction.

Figure 20:
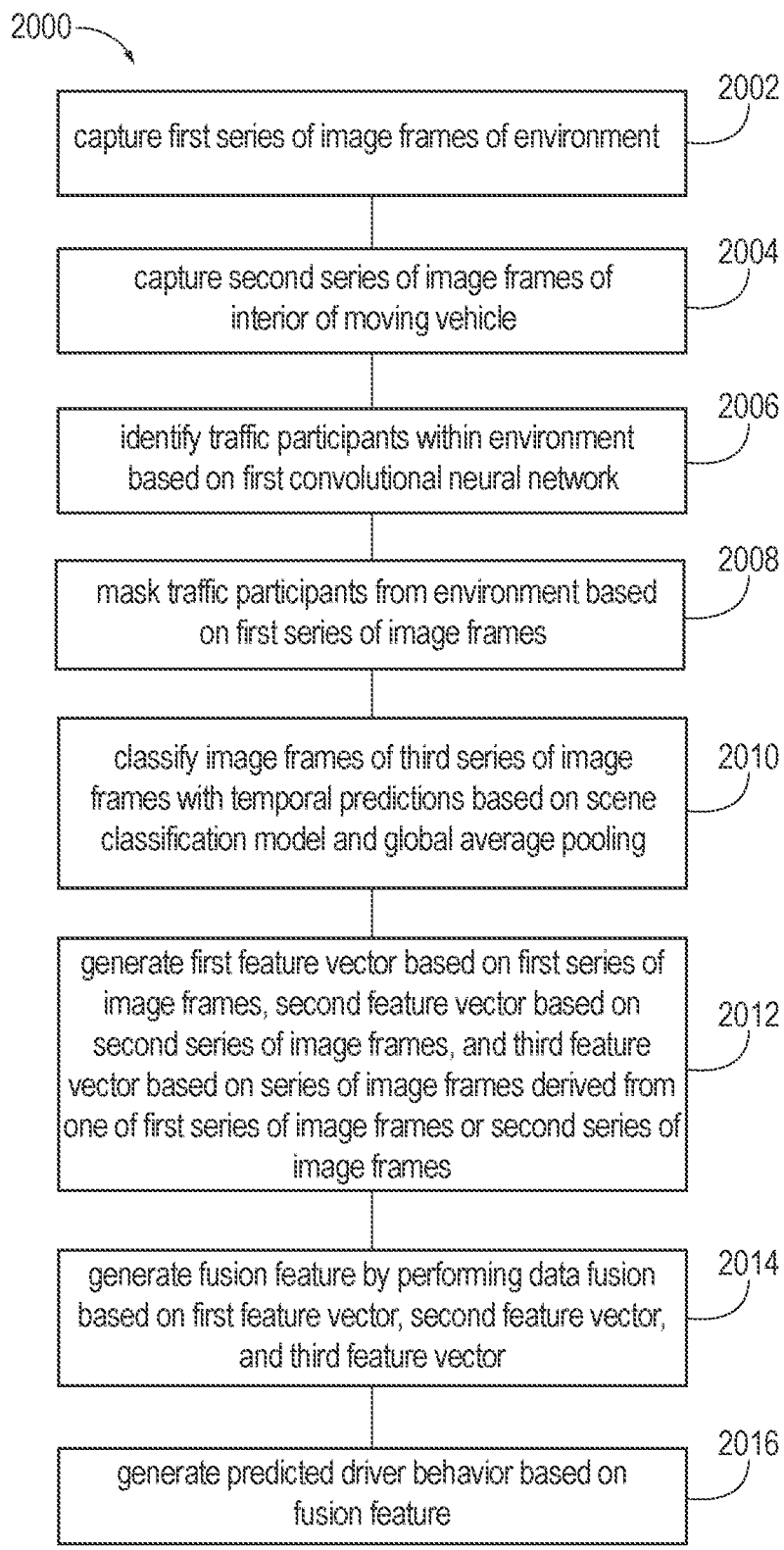
FIG. 20 is a flow diagram of a method for scene classification prediction, according to one aspect.

FIG. 20 is a flow diagram of a method 2000 for scene classification prediction, according to one aspect. The method 2000 may include capturing 2002 a first series of image frames of an environment from a moving vehicle, capturing 2004 a second series of image frames of an interior of the moving vehicle, identifying 2006 one or more traffic participants within the environment based on a first convolutional neural network, masking 2008 one or more of the traffic participants from the environment based on the first series of image frames, classifying 2010 one or more image frames of the third series of image frames with one or more temporal predictions based on a scene classification model and global average pooling, generating 2012 a first feature vector based on the first series of image frames, a second feature vector based on the second series of image frames, and a third feature vector based on a series of image frames derived from one of the first series of image frames or the second series of image frames, generating 2014 a fusion feature by performing data fusion based on the first feature vector, the second feature vector, and the third feature vector, and generating 2016 a predicted driver behavior based on the fusion feature.

Figure 21A:
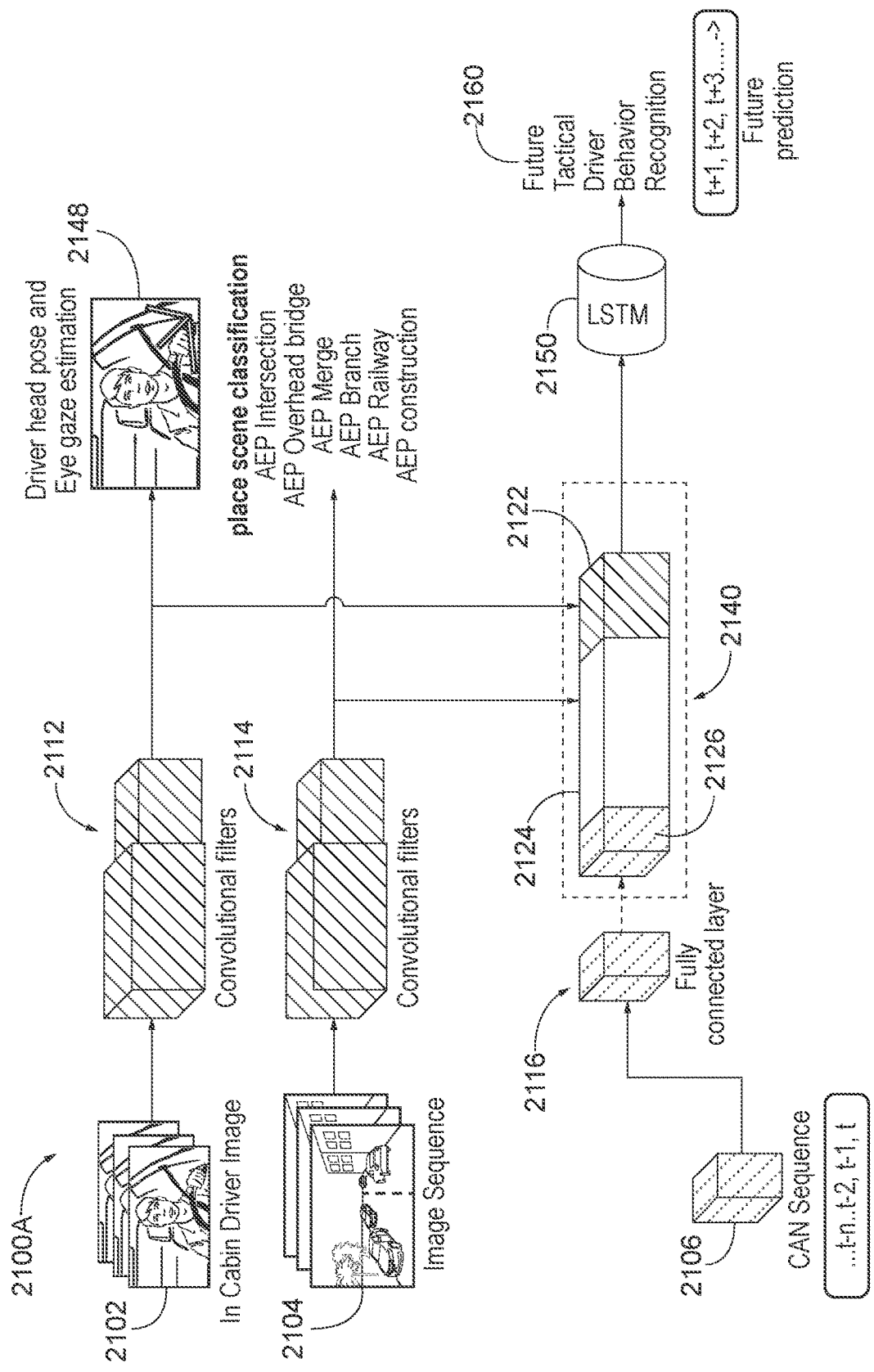
FIGS. 21A-21E are exemplary architectures which may be implemented according to the system for scene classification prediction and/or the system for driver behavior prediction.

FIG. 21A is an exemplary architecture 2100A which may be implemented according to the system 1500 for scene classification prediction and/or the system for driver behavior prediction. In FIG. 21A, the image capture device 1502 (e.g., the first image capture sensor 806) may capture the second image sequence 2104 and pass this second image sequence 2104 on to the memory 1506, the image capture device 1502 (e.g., the second image capture sensor 808) may capture the first image sequence 2102 and pass this first image sequence 2102 on to the memory 1506, and the bus 1538 may capture or receive the CAN sequence 2106 from one or more of the vehicle systems 1590.

The second image sequence 2104 may be fed, one frame at a time, through a first CNN 2114, such as by the convolutor 1516, including one or more convolutional layers or convolutional filters to produce or generate a first feature vector 2122 associated with place scene classification. The first image sequence 2102 may be fed, one frame at a time, through a second CNN 2112, including one or more convolutional layers or convolutional filters to produce or generate a second feature vector 2124 associated with driver pose and/or eye gaze estimation 2148, such as by the convolutor 1516. Similarly, the CAN sequence 2106 may be fed, one frame at a time, through a fully connected layer 2116 to produce or generate a third feature vector 2126.

The concatenator 1540 may perform data fusion on two or more of the first feature vector 2122, the second feature vector 2124, and the third feature vector 2126. This may result in a fusion feature vector 2140. The fusion feature vector 2140 may be passed through a LSTM layer 2150, thereby generating a tactical driver behavior recognition/prediction result 2160 for respective frames. Because the place scene classification may be included in the feature vectors fused or concatenated by the concatenator 1540, the tactical driver behavior recognition/prediction result may be enhanced in that the tactical driver behavior recognition/prediction result may be better predicted based on the estimation of the associated place.

As previously stated, any of the CNNs or neural networks discussed herein may include a pyramid feature network. Further, any of the inputs and/or outputs to any of the CNNs, RNNs, LSTM layers, and/or neural networks may be modified by the addition of one or more processing layers, filters, etc., such as a fully connected layer, a convolutional filter layer, a LSTM layer, etc.

Figure 21B:
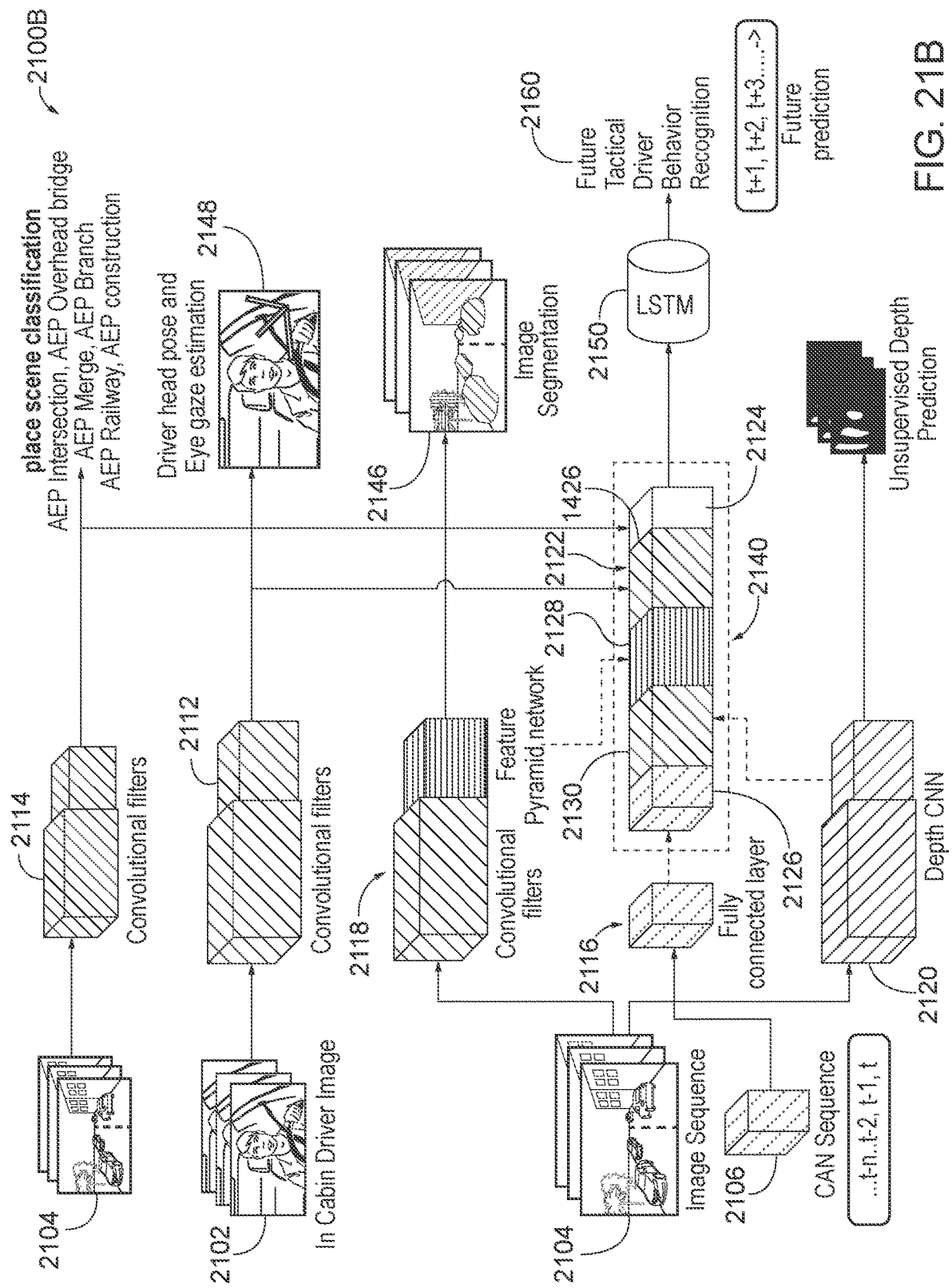

FIG. 21B is an exemplary architecture 2100B which may be implemented according to the system 1500 for scene classification prediction and/or the system for driver behavior prediction. In FIG. 21B, the image capture device 1502 (e.g., the first image capture sensor 806) may capture the second image sequence 2104 and pass this second image sequence 2104 on to the memory 1506, the image capture device 1502 (e.g., the second image capture sensor 808) may capture the first image sequence 2102 and pass this first image sequence 2102 on to the memory 1506, and the bus 1538 may capture or receive the CAN sequence 2106 from one or more of the vehicle systems 1590.

The second image sequence 2104 may be fed, one frame at a time, through a first CNN 2114, such as by the convolutor 1516, including one or more convolutional layers or convolutional filters to produce or generate a second feature vector 2124 associated with place scene classification. The first image sequence 2102 may be fed, one frame at a time, through a second CNN 2112, including one or more convolutional layers or convolutional filters to produce or generate a first feature vector 2122 associated with driver pose and/or eye gaze estimation 2148, such as by the convolutor 1516. Similarly, the CAN sequence 2106 may be fed, one frame at a time, through a fully connected layer 2116 to produce or generate a third feature vector 2126. The second image sequence 2104 may be fed, one frame at a time, through a third CNN 2118, such as by the convolutor 1516, including one or more convolutional layers or convolutional filters and/or a feature pyramid network to produce or generate a fourth feature vector 2128 associated with image segmentation 2146. The second image sequence 2104 may be fed, one frame at a time, through a fourth, depth CNN 2120, such as by the convolutor 1516, including one or more depth convolutional layers or depth convolutional filters to produce or generate a fifth feature vector 2130 associated with unsupervised depth prediction.

The concatenator 1540 may perform data fusion on two or more of the first feature vector 2122, the second feature vector 2124, the third feature vector 2126, the fourth feature vector 2128, and the fifth feature vector 2130. This may result in a fusion feature vector 2140. The fusion feature vector 2140 may be passed through a LSTM layer 2150, thereby generating a tactical driver behavior recognition/prediction result 2160 for respective frames.

Figure 21C:
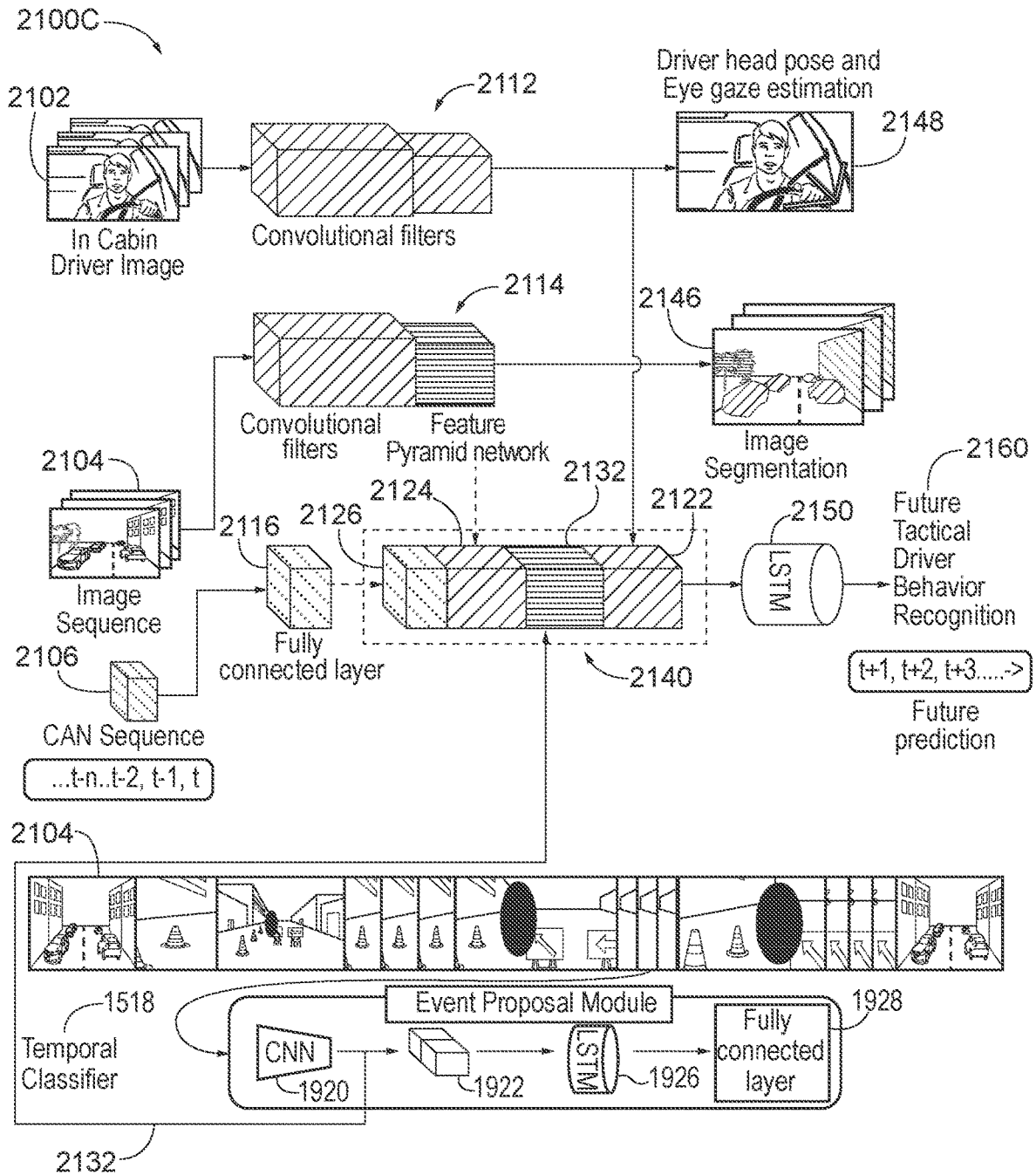
Figure 21D:
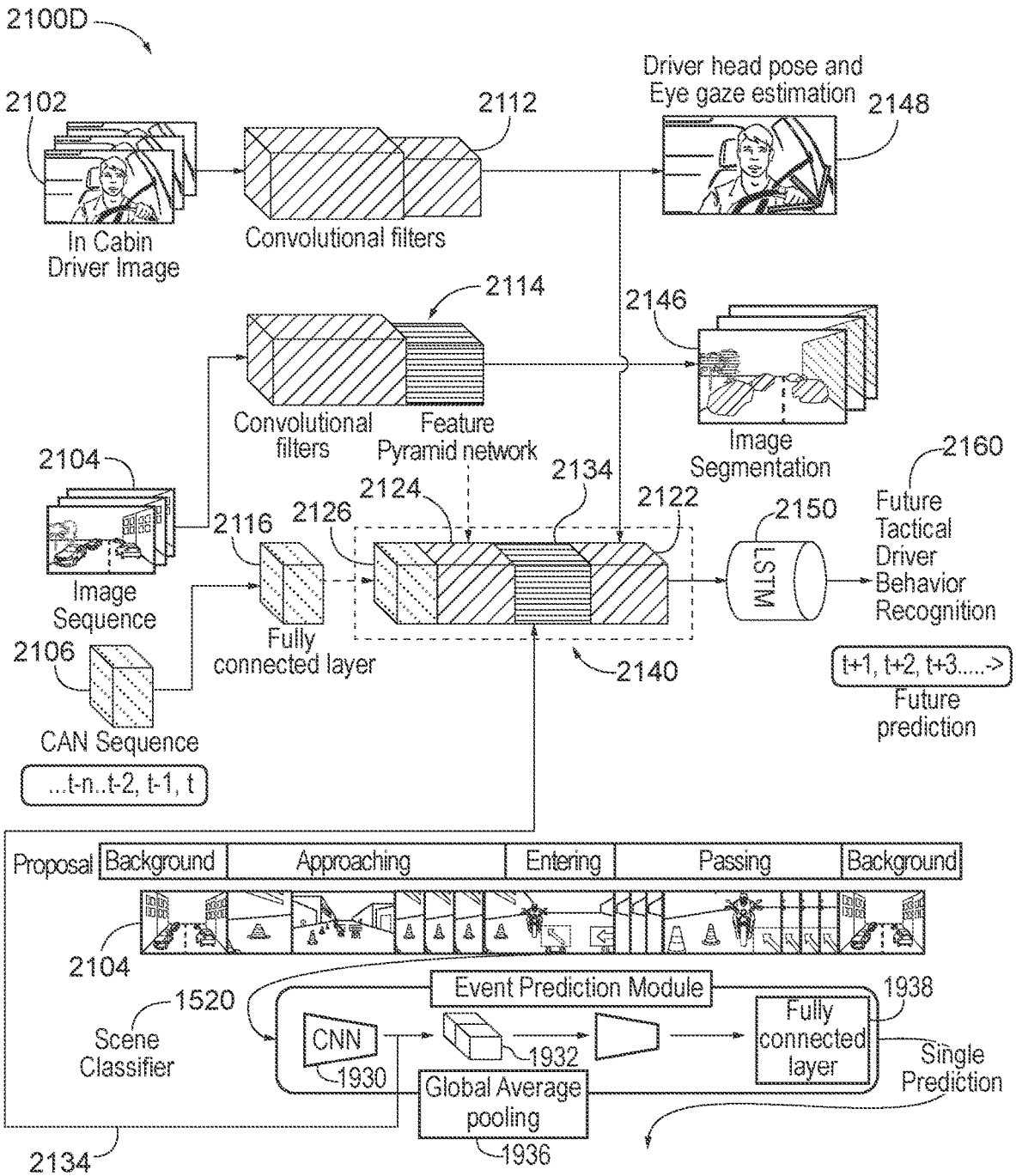
Figure 21E:
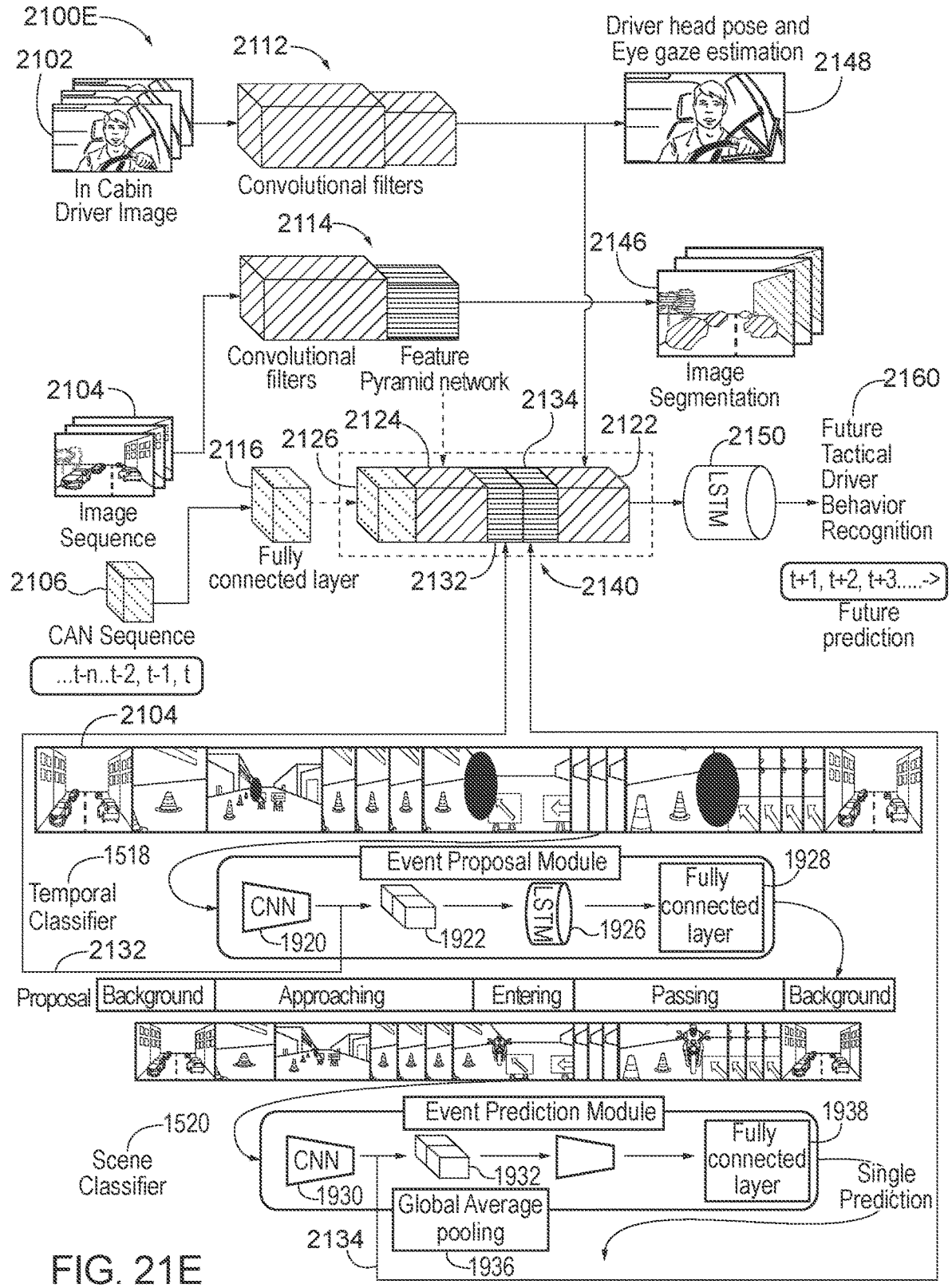

FIGS. 21C-21E are exemplary architectures which may be implemented according to the system 1500 for scene classification prediction and/or the system for driver behavior prediction. In FIGS. 21C-21E, the image capture device 1502 (e.g., the first image capture sensor 806) may capture the second image sequence 2104 (e.g., an input series of image frames) and pass this second image sequence 2104 on to the memory 1506, the image capture device 1502 (e.g., the second image capture sensor 808) may capture the first image sequence 2102 and pass this first image sequence 2102 on to the memory 1506, and the bus 1538 may capture or receive the CAN sequence 2106 from one or more of the vehicle systems 1590.

With reference to FIG. 21C-21E, the first image sequence 2102 may be fed, one frame at a time, through a CNN 2112, including one or more convolutional layers or convolutional filters to produce or generate a feature vector 2122 associated with driver pose and/or eye gaze estimation 2148, such as by the convolutor 1516. Similarly, the CAN sequence 2106 may be fed, one frame at a time, through a fully connected layer 2116 to produce or generate a feature vector 2126.

The image segmentation module 1512 may segment or identify one or more traffic participants from the second image sequence 2104 using semantic segmentation 2146, such as via a CNN 2114. The image masker 1514 may mask one or more of the traffic participants from the image frames, thereby enabling the system 1500 for scene classification to focus merely on the surrounding environment and provide more accurate scene classification accordingly.

The temporal classifier 1518 may be utilized to trim untrimmed video and aggregate the features to classify the entire trimmed segment. The temporal classifier 1518 may be fed the series of image frames which have the traffic participants masked (e.g., the RGB-masked image frames, RGBS, or S image frames). In any event, the temporal classifier 1518 may receive the input set of image frames and feed this through a CNN 1920, such as the ResNet 50 CNN, extract a set of features as a feature vector 2132, feed this set of features 1922 through an LSTM 1926 and a fully connected layer 1928, thereby producing a series of image frames, each annotated with temporal predictions.

With reference to FIG. 21E, the series of image frames annotated with temporal predictions may be fed to the scene classifier 1520, which may include one or more CNNs 1930, such as the ResNet 50 CNN, extract a set of features as a feature vector 2134, perform global average pooling 1936, and feed the results through a fully connected layer 1938 to generate a scene prediction for the scene (e.g., which may be unknown up to this point) including image frames annotated as approaching, entering, and passing. This model may be trained based on the ground truth image sequence 1532.

The concatenator 1540 may perform data fusion on two or more of the first feature vector 2122, the second feature vector 2124, the third feature vector 2126, the fourth feature vector 2132, and/or the fifth feature vector 2134. This may result in a fusion feature vector 2140. The fusion feature vector 2140 may be passed through a LSTM layer 2150, thereby generating a tactical driver behavior recognition/prediction result 2160 for respective frames. Again, for FIGS. 21A-21E, because the place scene classification may be included in the feature vectors fused or concatenated by the concatenator 1540, the tactical driver behavior recognition/prediction result may be enhanced in that the tactical driver behavior recognition/prediction result may be better predicted based on the estimation of the associated place (e.g., the single scene prediction or scene prediction).

According to the architecture 2100C of FIG. 21C, the concatenator 1540 may perform data fusion on two or more of the first feature vector 2122, the second feature vector 2124, the third feature vector 2126, and the feature vector 2132.

According to the architecture 2100D of FIG. 21D, the concatenator 1540 may perform data fusion on two or more of the first feature vector 2122, the second feature vector 2124, the third feature vector 2126, and the feature vector 2134.

According to the architecture 2100E of FIG. 21E, the concatenator 1540 may perform data fusion on two or more of the first feature vector 2122, the second feature vector 2124, the third feature vector 2126, the feature vector 2132, and the feature vector 2134. In this way, FIG. 21E may be a combination of the architectures of FIGS. 21D-21E.

Figure 22:
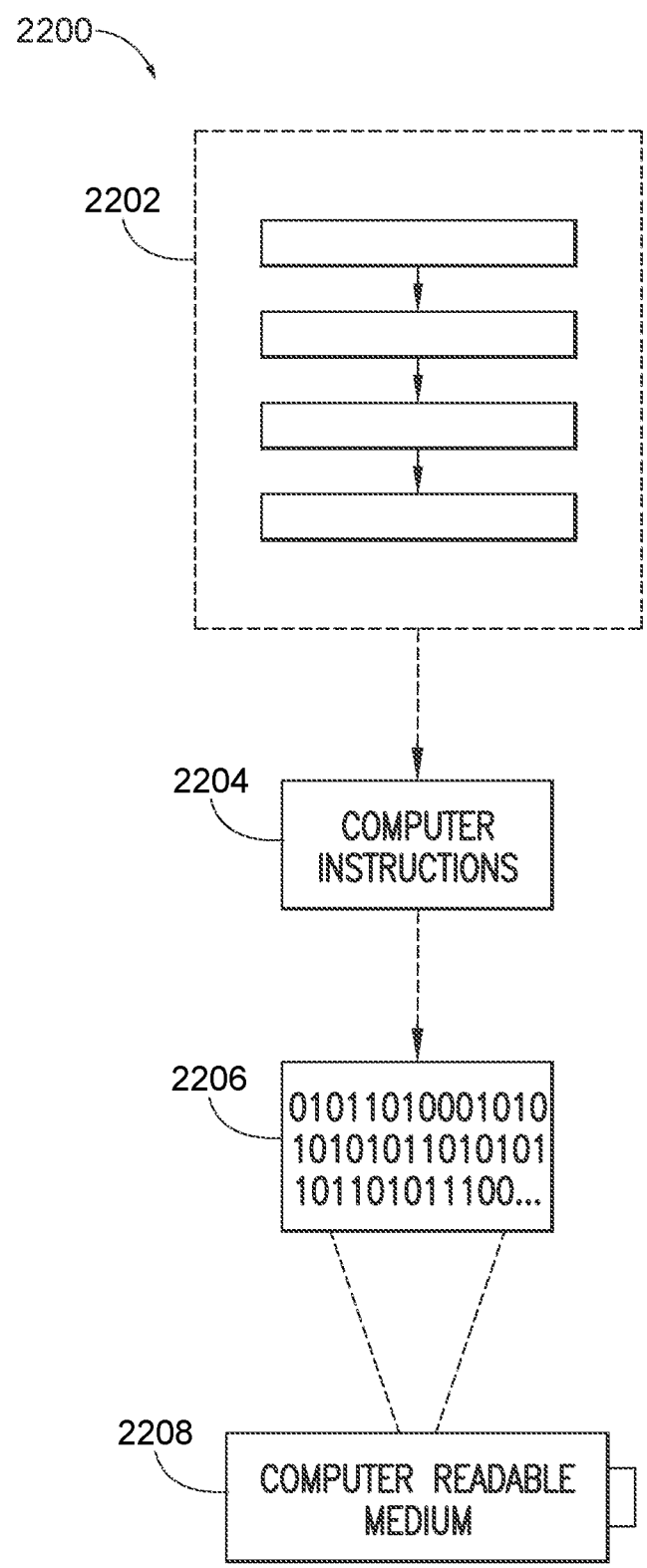
FIG. 22 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 22, wherein an implementation 2200 includes a computer-readable medium 2208, such as a CD-R, DVD-R, flash drive, a platter of a hard disk drive, etc., on which is encoded computer-readable data 2206. This encoded computer-readable data 2206, such as binary data including a plurality of zero's and one's as shown in 2206, in turn includes a set of processor-executable computer instructions 2204 configured to operate according to one or more of the principles set forth herein. In this implementation 2200, the processor-executable computer instructions 2204 may be configured to perform a method 2202, such as the method 200 of FIG. 2, the method 900 of FIG. 9, the method 1600 of FIG. 16, or the method 2000 of FIG. 20. In another aspect, the processor-executable computer instructions 2204 may be configured to implement a system, such as the system 100 of FIG. 1, the system 800 of FIG. 8, any of the architectures or associated systems of FIGS. 10-14, the system 1500 of FIG. 15, the architecture or associated system of FIG. 19, the architecture or associated system of FIG. 21, etc. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 23:
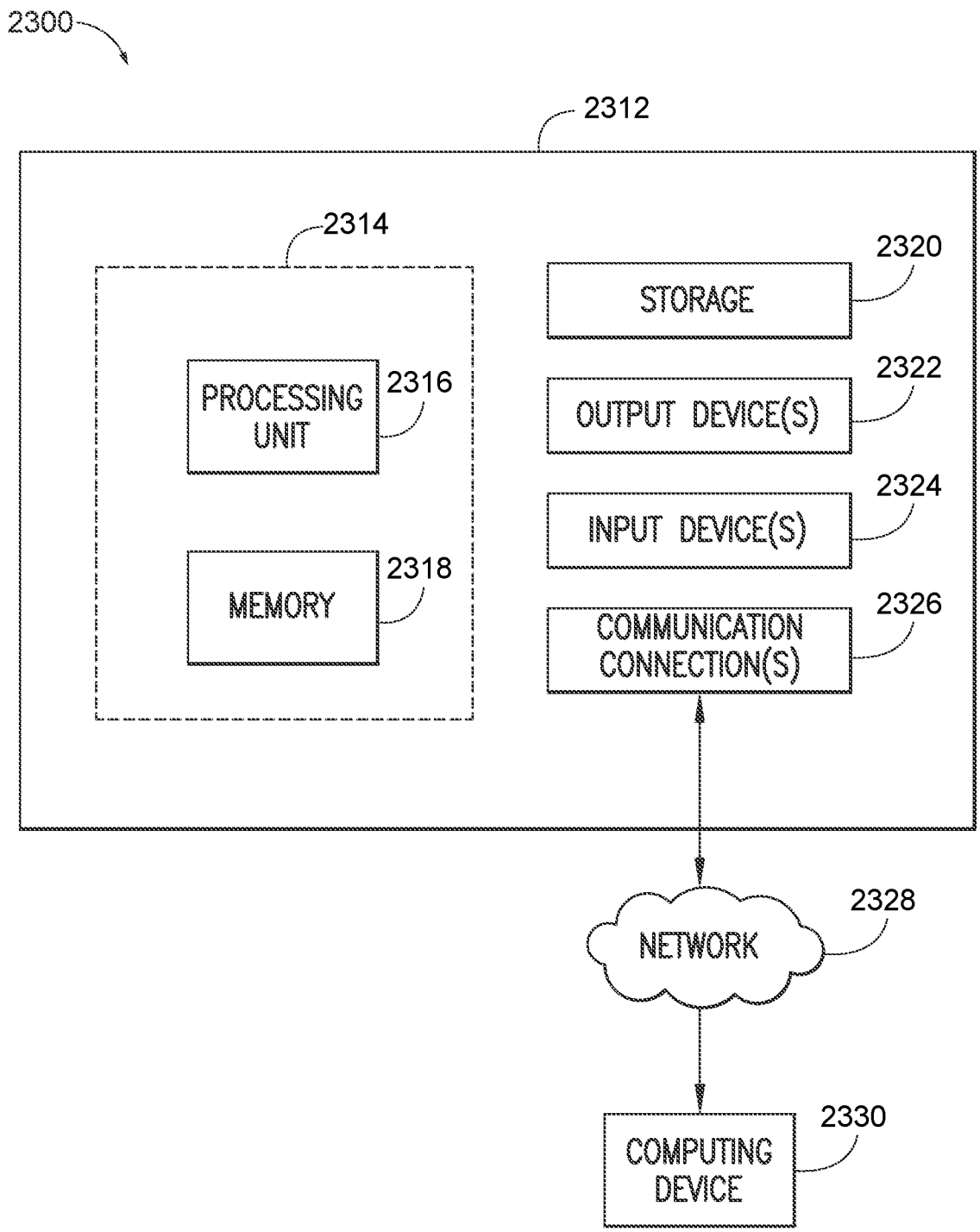
FIG. 23 is an illustration of an example computing environment where one or more of the provisions set forth herein are implemented, according to one aspect.

FIG. 23 and the following discussion provide a description of a suitable computing environment to implement aspects of one or more of the provisions set forth herein. The operating environment of FIG. 23 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 23 illustrates a system 2300 including a computing device 2312 configured to implement one aspect provided herein. In one configuration, the computing device 2312 includes at least one processing unit 2316 and memory 2318. Depending on the exact configuration and type of computing device, memory 2318 may be volatile, such as RAM, non-volatile, such as ROM, flash memory, etc., or a combination of the two. This configuration is illustrated in FIG. 23 by dashed line 2314.

In other aspects, the computing device 2312 includes additional features or functionality. For example, the computing device 2312 may include additional storage such as removable storage or non-removable storage, including, but not limited to, magnetic storage, optical storage, etc. Such additional storage is illustrated in FIG. 23 by storage 2320. In one aspect, computer readable instructions to implement one aspect provided herein are in storage 2320. Storage 2320 may store other computer readable instructions to implement an operating system, an application program, etc. Computer readable instructions may be loaded in memory 2318 for execution by processing unit 2316, for example.

The term "computer readable media" as used herein includes computer storage media. Computer storage media includes volatile and nonvolatile, removable and non-removable media implemented in any method or technology for storage of information such as computer readable instructions or other data. Memory 2318 and storage 2320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 2312. Any such computer storage media is part of the computing device 2312.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 2312 includes input device(s) 2324 such as keyboard, mouse, pen, voice input device, touch input device, infrared cameras, video input devices, or any other input device. Output device(s) 2322 such as one or more displays, speakers, printers, or any other output device may be included with the computing device 2312. Input device(s) 2324 and output device(s) 2322 may be connected to the computing device 2312 via a wired connection, wireless connection, or any combination thereof. In one aspect, an input device or an output device from another computing device may be used as input device(s) 2324 or output device(s) 2322 for the computing device 2312. The computing device 2312 may include communication connection(s) 2326 to facilitate communications with one or more other devices 2330, such as through network 2328, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for scene classification and prediction, comprising:
   a forward-facing image capture device capturing a first series of image frames of an environment from a moving vehicle, the forward-facing image capture device aligned with a direction of travel of the moving vehicle;
   an image segmentation module, implemented via a processor, identifying one or more traffic participants within the environment based on a first convolutional neural network (CNN);
   an image masker, implemented via the processor, generating a second series of image frames by masking one or more of the traffic participants from the environment;
   a temporal classifier, implemented via the processor, classifying one or more image frames of the second series of image frames with one or more temporal predictions and generating a third series of image frames associated with respective temporal predictions based on a scene classification model, wherein the classification of one or more of the image frames of the second series of image frames is based on a second CNN, a long short-term memory (LSTM) network, and a first fully connected layer; and
   a scene classifier, implemented via the processor, classifying one or more image frames of the third series of image frames based on a third CNN, global average pooling, and a second fully connected layer and generating an associated scene prediction based on the scene classification model and respective temporal predictions.

2. The system for scene classification and prediction of claim 1, wherein one or more of the temporal predictions include an approaching annotation, an entering annotation, or a passing annotation.

3. The system for scene classification and prediction of claim 1, wherein the system for scene classification and prediction is implemented in a vehicle and the vehicle includes a controller activating or deactivating one or more sensors or one or more vehicle systems of the vehicle based on the scene prediction.

4. The system for scene classification and prediction of claim 3,
   wherein the scene classifier classifies one or more image frames of the third series of image frames with a weather classification including clear, sunny, snowy, rainy, overcast, or foggy; and
   wherein the controller activates or deactivates one or more sensors or one or more of the vehicle systems of the vehicle based on the weather classification.

5. The system for scene classification and prediction of claim 3,
   wherein the scene classifier classifies one or more image frames of the third series of image frames with a road surface classification including dry, wet, or snow; and
   wherein the controller activates or deactivates one or more of the sensors or one or more of the vehicle systems of the vehicle based on the road surface classification.

6. The system for scene classification and prediction of claim 3,
   wherein the scene classifier classifies one or more image frames of the third series of image frames with an environment classification including urban, ramp, highway, or local; and wherein the controller activates or deactivates one or more of the sensors or one or more of the vehicle systems of the vehicle based on the environment classification.

7. The system for scene classification and prediction of claim 3, wherein the controller prioritizes searching for traffic lights, stop signs, or stop lines based on the scene prediction being an intersection.

8. A system for scene classification and prediction, comprising:
a forward-facing image capture device capturing a first series of image frames of an environment from a moving vehicle, the forward-facing image capture device aligned with a direction of travel of the moving vehicle;
an image segmentation module, implemented via a processor, identifying one or more traffic participants within the environment based on a first convolutional neural network (CNN);
an image masker, implemented via the processor, generating a second series of image frames by masking one or more of the traffic participants from the environment;
a temporal classifier, implemented via the processor, classifying one or more image frames of the second series of image frames with one or more temporal predictions, generating a third series of image frames associated with respective temporal predictions based on a scene classification model, and generating a first feature vector and a second feature vector based on the third series of image frames, wherein the classification of one or more of the image frames of the second series of image frames, the generation of the first feature vector, and the generation of the second feature vector is based on a second CNN, a long short-term memory (LSTM) network, or a first fully connected layer; and
a scene classifier, implemented via the processor, classifying one or more image frames of the third series of image frames based on a third CNN, global average pooling, and a second fully connected layer and generating an associated scene prediction based on the scene classification model and by performing data fusion on the first feature vector and the second feature vector.

9. The system for scene classification and prediction of claim 8, wherein the performing data fusion includes performing addition or concatenation.

10. The system for scene classification and prediction of claim 8, wherein one or more of the temporal predictions include an approaching annotation, an entering annotation, or a passing annotation.

11. The system for scene classification and prediction of claim 8, wherein the system for scene classification and prediction is implemented in a vehicle and the vehicle includes a controller activating or deactivating one or more sensors or one or more vehicle systems of the vehicle based on the scene prediction.

12. The system for scene classification and prediction of claim 11,
wherein the scene classifier classifies one or more image frames of the third series of image frames with a weather classification including clear, sunny, snowy, rainy, overcast, or foggy; and
wherein the controller activates or deactivates one or more sensors or one or more of the vehicle systems of the vehicle based on the weather classification.

13. The system for scene classification and prediction of claim 11,
wherein the scene classifier classifies one or more image frames of the third series of image frames with a road surface classification including dry, wet, or snow; and
wherein the controller activates or deactivates one or more of the sensors or one or more of the vehicle systems of the vehicle based on the road surface classification.

14. The system for scene classification and prediction of claim 11,
wherein the scene classifier classifies one or more image frames of the third series of image frames with an environment classification including urban, ramp, highway, or local; and
wherein the controller activates or deactivates one or more of the sensors or one or more of the vehicle systems of the vehicle based on the environment classification.

15. A system for scene classification and prediction, comprising:
a forward-facing image capture device capturing a first series of image frames of an environment from a moving vehicle, the forward-facing image capture device aligned with a direction of travel of the moving vehicle;
a rear-facing image capture device capturing a second series of image frames of an interior of the moving vehicle, the rear-facing image capture device facing an opposite direction of the forward-facing image capture device;
an image segmentation module, implemented via a processor, identifying one or more traffic participants within the environment based on a first convolutional neural network (CNN);
an image masker, implemented via the processor, generating a third series of image frames by masking one or more of the traffic participants from the environment based on the first series of image frames;
a temporal classifier, implemented via the processor, classifying one or more image frames of the third series of image frames with one or more temporal predictions and generating a fourth series of image frames associated with respective temporal predictions based on a scene classification model, wherein the classification of one or more of the image frames of the third series of image frames is based on a second CNN, a long short-term memory (LSTM) network, and a first fully connected layer;
a scene classifier, implemented via the processor, classifying one or more image frames of the fourth series of image frames based on a third CNN, global average pooling, and a second fully connected layer and generating an associated scene prediction based on the scene classification model and respective temporal predictions;
a convolutor, implemented via the processor, generating a first feature vector based on the first series of image frames, a second feature vector based on the second series of image frames, and a third feature vector based on the fourth series of image frames;
a concatenator, implemented via the processor, generating a fusion feature by performing data fusion based on the first feature vector, the second feature vector, and the third feature vector; and a behavior predictor, implemented via the processor, generating a predicted driver behavior based on the fusion feature.

16. The system for scene classification and prediction of claim 15, wherein the performing data fusion includes performing addition or concatenation.

17. The system for scene classification and prediction of claim 15, wherein one or more of the temporal predictions include an approaching annotation, an entering annotation, or a passing annotation.

18. The system for scene classification and prediction of claim 15, wherein the system for scene classification and prediction is implemented in a vehicle and the vehicle includes a controller activating or deactivating one or more sensors or one or more vehicle systems of the vehicle based on the scene prediction.

19. The system for scene classification and prediction of claim 18,
wherein the scene classifier classifies one or more image frames of the fourth series of image frames with a weather classification including clear, sunny, snowy, rainy, overcast, or foggy; and
wherein the controller activates or deactivates one or more sensors or one or more of the vehicle systems of the vehicle based on the weather classification.

20. The system for scene classification and prediction of claim 18,
wherein the scene classifier classifies one or more image frames of the fourth series of image frames with a road surface classification including dry, wet, or snow; and
wherein the controller activates or deactivates one or more of the sensors or one or more of the vehicle systems of the vehicle based on the road surface classification.

* * * * *